US012791833B2

(12) United States Patent
Aoi

(10) Patent No.: US 12,791,833 B2
(45) Date of Patent: Nov. 10, 2026

(54) IMAGING LENS AND IMAGING APPARATUS

(71) Applicant: FUJIFILM Corporation, Tokyo (JP)

(72) Inventor: Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 18/616,094

(22) Filed: Mar. 25, 2024

(65) Prior Publication Data

US 2024/0329363 A1 Oct. 3, 2024

(30) Foreign Application Priority Data

Mar. 27, 2023 (JP) ................................ 2023-050621

(51) Int. Cl.
*G02B 13/00* (2006.01)

(52) U.S. Cl.
CPC ......... *G02B 13/003* (2013.01); *G02B 13/006* (2013.01)

(58) Field of Classification Search
CPC ...... G02B 13/003; G02B 9/04; G02B 15/142; G02B 13/006; G02B 9/64
See application file for complete search history.

(56) References Cited

U.S. PATENT DOCUMENTS

2010/0142062 A1* 6/2010 Asami .................... G02B 13/04 359/793
2015/0002946 A1* 1/2015 Mori ...................... G02B 13/04 359/755
2015/0015966 A1* 1/2015 Ida ....................... G02B 15/177 359/683
2016/0077310 A1* 3/2016 Sudoh .................. G02B 15/142 359/764
2017/0242222 A1 8/2017 Aoi et al.
2018/0224639 A1* 8/2018 Takada ................... G02B 13/04
2019/0094495 A1 3/2019 Amano et al.
2020/0103634 A1 4/2020 Okada et al.
2020/0241248 A1* 7/2020 Chen .................. G02B 13/0045
2020/0333569 A1* 10/2020 Kondo ..................... G02B 9/62

FOREIGN PATENT DOCUMENTS

JP 2017-146518 A 8/2017
JP 2020-052349 A 4/2020
JP 6967924 B2 11/2021

* cited by examiner

*Primary Examiner* — Mustak Choudhury
(74) *Attorney, Agent, or Firm* — Studebaker Brackett PLLC

(57) ABSTRACT

The imaging lens consists of, in order from an object side to an image side, a first lens group that has a refractive power, a stop, and a second lens group that has a positive refractive power. The first lens group includes, successively in order from a position closest to the object side to the image side, a negative meniscus lens and a negative lens. A conditional expression relating to a back focal length Bf, a focal length f of the imaging lens, and a maximum half angle of view ω: $0.3<Bf/(f\times\tan\omega)<1.75$ is satisfied.

29 Claims, 38 Drawing Sheets

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

EXAMPLE 12

EXAMPLE 12

EXAMPLE 13

EXAMPLE 13

EXAMPLE 14

EXAMPLE 14

EXAMPLE 15

EXAMPLE 15

EXAMPLE 16

EXAMPLE 16

EXAMPLE 17

EXAMPLE 17

EXAMPLE 18

EXAMPLE 18

IMAGING LENS AND IMAGING APPARATUS

CROSS-REFERENCE TO RELATED APPLICATIONS

This application claims priority from Japanese Patent Application No. 2023-050621, filed on Mar. 27, 2023, the entire disclosure of which is incorporated herein by reference.

BACKGROUND

Technical Field

A technique of the present disclosure relates to an imaging lens and an imaging apparatus.

Related Art

In the related art, as an imaging lens that can be used in an imaging apparatus such as a factory automation (FA) camera and a machine vision (MV) camera, the lens systems described in JP2020-052349A and JP2017-146518A are known. Further, as an imaging lens usable in an imaging apparatus such as an in-vehicle camera, a lens system described in JP6967924B is known.

SUMMARY

There has been a demand for an imaging lens which is configured to be compact and lightweight and keeps favorable optical performance. The demand level is increasing year by year.

An object of the present disclosure is to provide an imaging lens, which keeps favorable optical performance by achieving reduction in size and weight, and an imaging apparatus comprising the imaging lens.

An imaging lens according to a first aspect of the present disclosure consists of, in order from an object side to an image side: a first lens group that has a refractive power; a stop; and a second lens group that has a positive refractive power. The first lens group includes, successively in order from a position closest to the object side to the image side, a negative meniscus lens and a negative lens. Conditional Expression (1) is satisfied, which is represented by $$0.3 < Bf/(f \times \tan\omega) < 1.75. \quad (1)$$

The symbol of Conditional Expression (1) is defined as follows. It is assumed that a back focal length of a whole system in terms of an air-equivalent distance in a state where an infinite distance object is in focus is Bf. It is assumed that a focal length of the whole system in a state where the infinite distance object is in focus is f. It is assumed that a maximum half angle of view in a state where the infinite distance object is in focus is ω.

Assuming that a unit of f is millimeter, and an F number of the whole system in a state where the infinite distance object is in focus is FNo., it is preferable that the imaging lens according to the above-mentioned aspect satisfies Conditional Expression (2), which is represented by $$0.6 < f/FNo < 4.3. \quad (2)$$

It is preferable that the first lens group includes a cemented lens consisting of one positive lens and one negative lens, the second lens group includes a cemented lens consisting of one positive lens and one negative lens. In such a case, it is preferable that the imaging lens according to the above-mentioned aspect satisfies Conditional Expression (3), which is represented by $$52 < (\nu 2cp - \nu 2cn) - (\nu 1cp - \nu 1cn) < 170. \quad (3)$$

The symbol of Conditional Expression (3) is defined as follows. It is assumed that an Abbe number of the positive lens of the cemented lens of the first lens group based on a d line is ν1cp. It is assumed that an Abbe number of the negative lens of the cemented lens of the first lens group based on the d line is ν1cn. It is assumed that an Abbe number of the positive lens of the cemented lens of the second lens group based on the d line is ν2cp. It is assumed that an Abbe number of the negative lens of the cemented lens of the second lens group based on the d line is ν2cn.

Assuming that a distance on an optical axis between a lens closest to the image side in the first lens group and a lens closest to the object side in the second lens group is DG12, and a sum of the back focal length of the whole system in terms of the air-equivalent distance and a distance on the optical axis from a lens surface closest to the object side in the first lens group to a lens surface closest to the image side in the second lens group in a state where the infinite distance object is in focus is TL, it is preferable that the imaging lens according to the above-mentioned aspect satisfies Conditional Expression (4), which is represented by $$0 < DG12/TL < 0.11. \quad (4)$$

Assuming that a focal length of the first lens group is fG1, it is preferable that the imaging lens according to the above-mentioned aspect satisfies Conditional Expression (5), which is represented by $$-0.8 < f/fG1 < 0.6. \quad (5)$$

Assuming that a focal length of the second lens group is fG2, it is preferable that the imaging lens according to the above-mentioned aspect satisfies Conditional Expression (6), which is represented by $$0.4 < f/fG2 < 1. \quad (6)$$

The second lens group includes a positive lens at a position closest to the image side. In such a configuration, assuming that a focal length of the second lens group is fG2, and a focal length of the positive lens closest to the image side in the second lens group is fzp, it is preferable that the imaging lens according to the above-mentioned aspect satisfies Conditional Expression (7), which is represented by $$0.1 < fG2/fzp < 1. \quad (7)$$

Assuming that an average value of refractive indexes of all negative lenses disposed closer to the object side than a positive lens closest to the object side among positive lenses included in the imaging lens at a d line is N1nave, it is preferable that the imaging lens according to the above-mentioned aspect satisfies Conditional Expression (8), which is represented by $$1.43 < N1nave < 1.9. \quad (8)$$

Assuming that an average value of Abbe numbers of all positive lenses included in the imaging lens based on a d line is νpave, and an average value of Abbe numbers of all negative lenses included in the imaging lens based on the d line is νnave, it is preferable that the imaging lens according to the above-mentioned aspect satisfies Conditional Expression (9), which is represented by $$-16 < \nu pave - \nu nave < 20. \quad (9)$$

Assuming that a sum of the back focal length of the whole system in terms of the air-equivalent distance and a distance on the optical axis from a lens surface closest to the object side in the first lens group to a lens surface closest to the image side in the second lens group in a state where the infinite distance object is in focus is TL, it is preferable that the imaging lens according to the above-mentioned aspect satisfies Conditional Expression (10), which is represented by $$3 < TL/f < 6.5. \quad (10)$$

Assuming that a focal length of the first lens group is denoted by fG1, and a focal length of the second lens group is fG2, it is preferable that the imaging lens according to the above-mentioned aspect satisfies Conditional Expression (11), which is represented by $$-1.3 < fG2/fG1 < 0.9. \quad (11)$$

Assuming that an Abbe number of a lens closest to the image side in the first lens group based on a d line is ν1z, it is preferable that the imaging lens according to the above-mentioned aspect satisfies Conditional Expression (12), which is represented by $$16 < \nu 1z < 45. \quad (12)$$

The first lens group includes a cemented lens consisting of one positive lens and one negative lens. In such a configuration, it is preferable that the imaging lens according to the above-mentioned aspect satisfies Conditional Expressions (13) and (14), which are represented by $$1.7 < N1cp < 2.1, \text{ and} \quad (13)$$

-continued $$-0.5 \times 10^{-6} < dN1cp/dT < 6.5 \times 10^{-6}. \quad (14)$$

The symbols of Conditional Expressions (13) and (14) are defined as follows. It is assumed that a refractive index of the positive lens of the cemented lens of the first lens group at a d line is N1cp. It is assumed that a temperature coefficient of the refractive index of the positive lens of the cemented lens of the first lens group at 50° C. at the d line is dN1cp/dT. It is assumed that a unit of dN1cp/dT is ° C.$^{-1}$.

A lens closest to the image side in the first lens group is a single lens that has a positive refractive power. In such a configuration, assuming that a temperature coefficient of a refractive index of the single lens at a d line at 50° C. is dN1s/dT, and a unit of dN1s/dT is ° C.$^{-1}$, it is preferable that the imaging lens according to the above-mentioned aspect satisfies Conditional Expression (15), which is represented by $$-0.5 \times 10^{-6} < dN1s/dT < 9 \times 10^{-6}. \quad (15)$$

Assuming that a sum of the back focal length of the whole system in terms of the air-equivalent distance and a distance on an optical axis from the stop to a lens surface closest to the image side in the second lens group in a state where the infinite distance object is in focus is Dst, it is preferable that the imaging lens according to the above-mentioned aspect satisfies Conditional Expression (16), which is represented by $$2 < Dst/(f \times \tan\omega) < 3.8. \quad (16)$$

It is preferable that the first lens group consists of three or four negative lenses and two positive lenses.

It is preferable that the second lens group consists of two or three negative lenses and three positive lenses.

It is preferable that an absolute value of a curvature radius of an image side surface of a lens closest to the image side in the first lens group is greater than an absolute value of a curvature radius of an object side surface thereof. It is preferable that a positive lens, which has a larger absolute value of a curvature radius of an object side surface than an absolute value of a curvature radius of an image side surface, is disposed on the image side of the stop to be adjacent to the stop with an air spacing.

Assuming that an angle formed between an axis line parallel to an optical axis and a principal ray incident onto an image plane with a maximum half angle of view is CRA, and a unit of CRA is degrees, it is preferable that the imaging lens according to the above-mentioned aspect satisfies Conditional Expression (17), which is represented by $$0 \leq |CRA| < 12. \quad (17)$$

An imaging lens according to a second aspect of the present disclosure is an imaging lens formed by combining a plurality of lenses, and includes at least one first positive lens that satisfies Conditional Expressions (18), (19), and (20), which are represented by $$1.72 < Np < 1.9, \tag{18}$$

$$30 < \nu p < 42, \text{ and} \tag{19}$$

$$dNp/dT < 4.3\times 10^{-6}. \tag{20}$$

The symbols of Conditional Expressions (18) to (20) are defined as follows. It is assumed that a refractive index of a positive lens, which is included in the imaging lens, at a d line is Np. It is assumed that an Abbe number of the positive lens based on the d line is νp. It is assumed that a temperature coefficient of the refractive index of the positive lens at the d line at 50° C. is dNp/dT. It is assumed that a unit of dNp/dT is ° $C.^{-1}$.

It is preferable that the first positive lens, which satisfies Conditional Expressions (18), (19), and (20), satisfies at least one of Conditional Expressions (20-1), (20-2), (20-3), (20-4), (20-5), (20-6), or (20-7).

$$-3\times 10^{-6} < dNp/dT < 4\times 10^{-6} \tag{20-1}$$

$$-3\times 10^{-6} < dNp/dT < 3\times 10^{-6} \tag{20-2}$$

$$-2\times 10^{-6} < dNp/dT < 2\times 10^{-6} \tag{20-3}$$

$$-2\times 10^{-6} < dNp/dT < 1\times 10^{-6} \tag{20-4}$$

$$-1\times 10^{-6} < dNp/dT < 0\times 10^{-6} \tag{20-5}$$

$$-0.2\times 10^{-6} < dNp/dT < 0\times 10^{-6} \tag{20-6}$$

$$-0.9\times 10^{-6} < dNp/dT < -0.7\times 10^{-6} \tag{20-7}$$

It is preferable that the imaging lens according to the second aspect of the present disclosure includes at least one second positive lens that satisfies Conditional Expressions (21), (22), and (23), which are represented by $$1.6 < Np < 1.8, \tag{21}$$

$$40 < \nu p < 60, \text{ and} \tag{22}$$

$$dNp/dT < 3.5\times 10^{-6}. \tag{23}$$

It is preferable that the imaging lens includes at least one negative lens that satisfies Conditional Expressions (24), (25), and (26), which are represented by $$1.55 < Nn < 1.9, \tag{24}$$

$$35 < \nu n < 65, \text{ and} \tag{25}$$

$$4\times 10^{-6} < dNn/dT. \tag{26}$$

In a case in which the imaging lens includes at least one specific lens that satisfies Conditional Expression (27), which is represented by $$60 < \nu d, \tag{27}$$

it is preferable that at least one of the at least one specific lens satisfies Conditional Expression (28), which is represented by $$0.6 < \theta gF + 0.001618\times \nu d < 0.686. \tag{28}$$

The symbols of Conditional Expressions (24) to (28) are defined as follows. It is assumed that a refractive index of a negative lens, which is included in the imaging lens, at a d line is Nn. It is assumed that an Abbe number of the negative lens based on the d line is νn. It is assumed that a temperature coefficient of the refractive index of the negative lens at 50° C. at the d line is dNn/dT. It is assumed that a unit of dNn/dT is ° $C.^{-1}$. It is assumed that an Abbe number of a lens, which is included in the imaging lens, based on the d line is νd. It is assumed that a partial dispersion ratio of the lens, which is included in the imaging lens, between a g line and an F line is θgF.

An imaging apparatus according to another aspect of the present disclosure comprises at least one of the imaging lens according to the first aspect of the present disclosure or the imaging lens according to the second aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~ group that has a positive refractive power" in the present specification means that the group has a positive refractive power as a whole. Similarly, the term "group which has a negative refractive power" means that the group has a negative refractive power as a whole. The term "a lens which has a positive refractive power" is synonymous with a positive lens.

The "single lens" is one lens that is not cemented. Here, a compound aspherical lens (in which a lens (for example, a spherical lens) and an aspherical film formed on the lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of the paraxial region unless otherwise specified. The sign of the curvature radius of the surface convex toward the object side is positive, and the sign of the curvature radius of the surface convex toward the image side is negative.

The term "the whole system" of the present specification means an imaging lens. The "focal length" used in a conditional expression is a paraxial focal length. Unless otherwise specified, the "distance on the optical axis" used in Conditional Expression is considered as a geometrical distance. The values used in the conditional expressions are values in a case where the d line is used as a reference in a state where the infinite distance object is in focus unless otherwise specified.

The "d line", "C line", "F line", and "g line" described in the present specification are bright lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens which keeps favorable optical performance by achieving reduction in size and weight, and an imaging apparatus comprising the imaging lens.

DESCRIPTION OF EMBODIMENTS

Hereinafter, embodiments of the present disclosure will be described with reference to the accompanying drawings.

Figure 1:
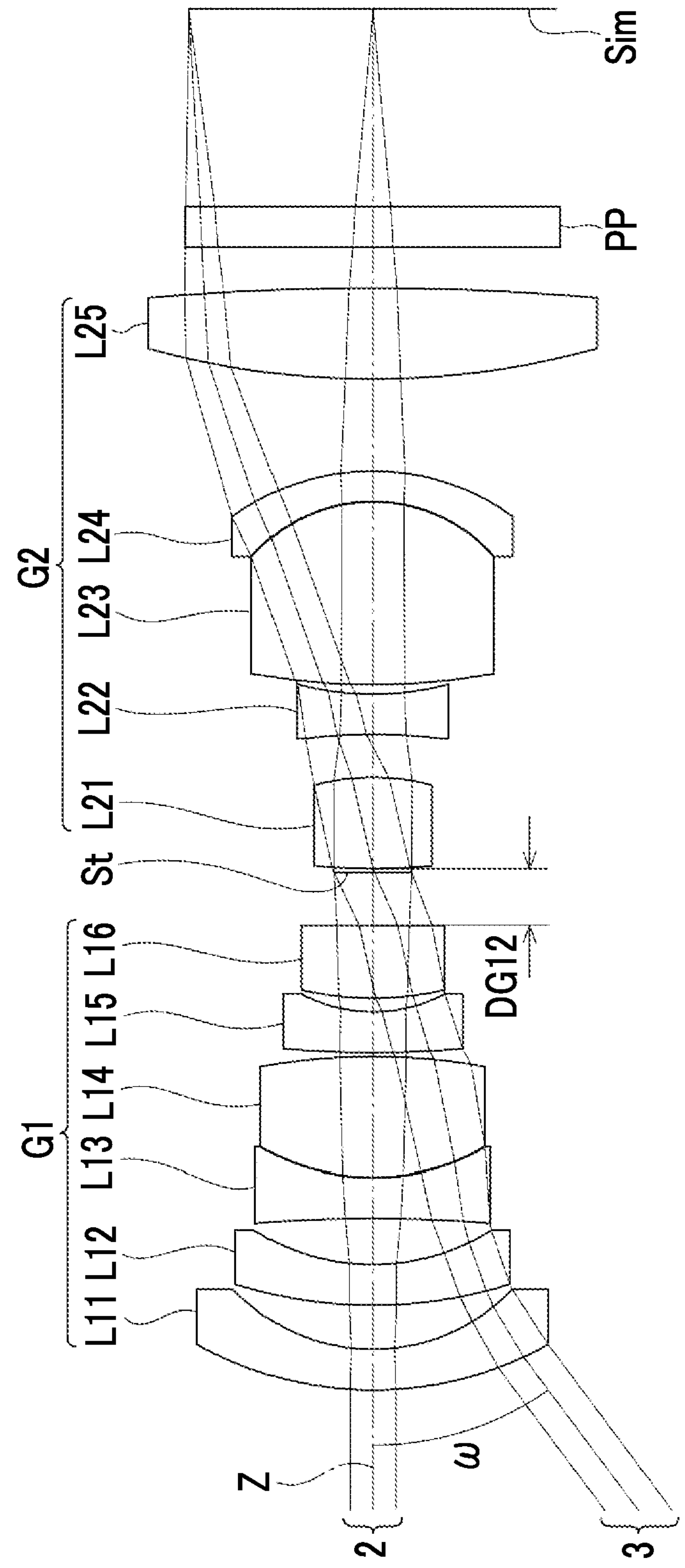
FIG. 1 is a cross-sectional view showing a configuration and luminous flux of an imaging lens according to an embodiment, which corresponds to the imaging lens according to Example 1.

First, an imaging lens according to a first embodiment of the present disclosure will be described. FIG. 1 shows a cross-sectional view of a configuration and luminous flux of the imaging lens according to the first embodiment of the present disclosure. FIG. 1 shows, as the luminous flux, an on-axis luminous flux 2 and an off-axis luminous flux 3 of a maximum half angle of view ω. FIG. 1 shows a state where an infinite distance object is in focus, in which the left side thereof is an object side, and the right side thereof is an image side. The example shown in FIG. 1 corresponds to the imaging lens according to Example 1 to be described later.

FIG. 1 shows an example in which, assuming that an imaging lens is applied to an imaging apparatus, an optical member PP having a parallel plate shape is disposed between the imaging lens and an image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens according to the first embodiment is a single focus optical system, and consists of, in order from the object side to the image side along the optical axis Z, a first lens group G1 that has a refractive power, an aperture stop St, and a second lens group G2 that has a positive refractive power. The first lens group G1 may be a lens group which has a negative refractive power or may be a lens group which has a positive refractive power. By disposing lenses on the object side and the image side of the aperture stop St, it is easy to correct aberrations. Contrary to the imaging lens according to the present embodiment, in a case where the second lens group G2 is a lens group which has a negative refractive power, the in-focus position is inevitably farther due to the action of diverging the luminous flux, and it is difficult to achieve reduction in size. In contrast, in the present embodiment, the second lens group G2 has a positive refractive power. Therefore, it is easy to achieve reduction in size by the convergence action thereof.

For example, the lens groups of the imaging lens of FIG. 1 are configured as follows. The first lens group G1 consists of six lenses L11 to L16 in order from the object side to the image side. The second lens group G2 consists of five lenses L21 to L25, in order from the object side to the image side. It should be noted that the aperture stop St in FIG. 1 does not indicate a size and a shape, but indicates a position in an optical axis direction.

The first lens group G1 includes, successively in order from the position closest to the object side to the image side, a negative meniscus lens and a negative lens. According to this configuration, it is possible to suppress high-order distortion. The first lens group G1 may be configured to include, successively in order from the position closest to the object side to the image side, a negative meniscus lens, a negative lens, and a negative lens. In such a case, it is easier to suppress high-order distortion. It should be noted that, in the present specification, the term "high-order" relating to aberration means a fifth order or higher.

It is preferable that the first lens group G1 includes a cemented lens consisting of one positive lens and one negative lens. In such a case, there are advantages in correcting longitudinal chromatic aberration and lateral chromatic aberration. It is preferable that the second lens group G2 includes a cemented lens consisting of one positive lens and one negative lens. In such a case, there are advantages in correcting longitudinal chromatic aberration and lateral chromatic aberration. The first lens group G1 is configured to include a cemented lens consisting of one positive lens and one negative lens, and the second lens group G2 is configured to include a cemented lens consisting of one positive lens and one negative lens. In such a configuration, there are advantages in correcting longitudinal chromatic aberration and lateral chromatic aberration.

The cemented lens, which is included in the first lens group G1, may be configured such that the negative lens and the positive lens are cemented in order from the object side. The cemented lens, which is included in the first lens group G1, may be configured to have a cemented surface convex toward the object side. In such a case, there is an advantage in suppressing a difference in astigmatism for each wavelength. The cemented lens, which is included in the second lens group G2, may be configured such that the positive lens and the negative lens are cemented in order from the object side. The cemented lens, which is included in the second lens group G2, may be configured to have a cemented surface convex toward the image side. In such a case, there is an advantage in suppressing a difference in astigmatism for each wavelength.

The first lens group G1 may be configured to consist of three negative lenses and two positive lenses. Alternatively, the first lens group G1 may be configured to consist of four negative lenses and two positive lenses. By setting the number of negative lenses to three or more, a configuration in which a ray is not deflected rapidly is easily achieved. Thus, there is an advantage in suppressing occurrence of aberration. By setting the number of positive lenses to two or more, there are advantages in correcting longitudinal chromatic aberration and lateral chromatic aberration. By setting the number of lenses of the entire first lens group G1 to five or six, there is an advantage in achieving reduction in total length of the optical system.

It is preferable that the lens closest to the image side in the first lens group G1 is a single lens which has a positive refractive power. In such a case, it is easy to correct spherical aberration and astigmatism in the tangential direction by utilizing a degree of freedom of the curvature radius of the object side surface of the single lens.

In the lens closest to the image side in the first lens group G1, it is preferable that an absolute value of the curvature radius of the image side surface is greater than an absolute value of the curvature radius of the object side surface. In such a case, it is easy to correct astigmatism and spherical aberration.

The second lens group G2 may be configured to consist of two negative lenses and three positive lenses. Alternatively, the second lens group G2 may be configured to consist of three negative lenses and three positive lenses. By setting the number of negative lenses to be two or more, there are advantages in correcting longitudinal chromatic aberration and lateral chromatic aberration. By setting the number of positive lenses to three or more, it is casy to provide a configuration in which a ray is not rapidly deflected. Therefore, there is an advantage in suppressing occurrence of aberration. By setting the number of lenses of the entire second lens group G2 to five or six, there is an advantage in achieving reduction in total length of the optical system.

It is preferable that the second lens group G2 includes a positive lens at a position closest to the image side. In such a case, there is an advantage in reducing an angle of incidence of the principal ray onto the image plane Sim.

It is preferable that a positive lens, which has a larger absolute value of a curvature radius of an object side surface than an absolute value of a curvature radius of an image side surface, is disposed on the image side of the aperture stop St to be adjacent to the aperture stop St with an air spacing. In such a case, it is casy to correct astigmatism and spherical aberration.

Hereinafter, preferable configurations of the imaging lens according to the present embodiment relating to Conditional Expression will be described. In the following description of conditional expressions, in order to avoid redundancy, the same symbol is used for the same definition, and the duplicate description of the symbol is omitted. Further, in the following description of the conditional expressions, the "imaging lens according to the present embodiment" is simply referred to as an "imaging lens" in order to avoid redundancy.

It is preferable that the imaging lens satisfies Conditional Expression (1). Here, it is assumed that a back focal length of the whole system in terms of the air-equivalent distance in a state where the infinite distance object is in focus is Bf. It is assumed that a focal length of the whole system in a state where the infinite distance object is in focus is f. It is assumed that a maximum half angle of view in a state where the infinite distance object is in focus is ω. The tan is a tangent. It should be noted that, in the present specification, the term "back focal length in terms of the air-equivalent distance of the whole system" refers to the air-equivalent distance on the optical axis from the lens surface closest to the image side in the imaging lens to the image plane Sim. By not allowing the corresponding value of Conditional Expression (1) to be equal to or less than the lower limit thereof, the back focal length is prevented from becoming excessively short with respect to the image circle. As a result, there is an advantage in achieving reduction in diameter of the second lens group G2. Thereby, there is an advantage in achieving reduction in size and weight. By not allowing the corresponding value of Conditional Expression (1) to be equal to or greater than the upper limit thereof, the back focal length is prevented from becoming excessively long with respect to the image circle. As a result, there is an advantage in achieving reduction in total length of the optical system. In order to obtain more favorable characteristics, it is more preferable that the imaging lens satisfies Conditional Expression (1-1), it is yet more preferable that the imaging lens satisfies Conditional Expression (1-2), and it is most preferable that the imaging lens satisfies Conditional Expression (1-3).

$$0.3 < Bf/(f \times \tan\omega) < 1.75 \quad (1)$$

$$04 < Bf/(f \times \tan\omega) < 1.7 \quad (1\text{-}1)$$

$$0.5 < Bf/(f \times \tan\omega) < 1.65 \quad (1\text{-}2)$$

$$0.6 < Bf/(f \times \tan\omega) < 1.6 \quad (1\text{-}3)$$

It is preferable that the imaging lens satisfies Conditional Expression (2). Here, the unit of f is millimeters. It is assumed that an F number of the whole system in a state where the infinite distance object is in focus is FNo. In addition, it is assumed that an opening diameter of the aperture stop St is variable, FNo is set as a value of an open F number. By not allowing the corresponding value of Conditional Expression (2) to be equal to or less than the lower limit thereof, the optical system is prevented from becoming excessively small. Therefore, there is an advantage in correcting aberrations. By not allowing the corresponding value of Conditional Expression (2) to be equal to or greater than the upper limit thereof, the optical system is prevented from becoming excessively large. Therefore, there is an advantage in achieving reduction in weight. In order to obtain more favorable characteristics, it is more preferable that the imaging lens satisfies Conditional Expression (2-1), it is yet more preferable that the imaging lens satisfies Conditional Expression (2-2), it is still more preferable that the imaging lens satisfies Conditional Expression (2-3), and it is most preferable that the imaging lens satisfies Conditional Expression (2-4).

$$0.6 < f/FNo < 4.3 \quad (2)$$

$$0.6 < f/FNo < 4 \quad (2\text{-}1)$$

$$0.7 < f/FNo < 3 \quad (2\text{-}2)$$

$$0.8 < f/FNo < 2.5 \quad (2\text{-}3)$$

$$0.9 < f/FNo < 1.7 \quad (2\text{-}4)$$

The first lens group G1 includes a cemented lens consisting of one positive lens and one negative lens. In addition, the second lens group G2 includes a cemented lens consisting of one positive lens and one negative lens. In such a configuration, it is preferable that the imaging lens satisfies Conditional Expression (3). Here, it is assumed that an Abbe number of the positive lens of the cemented lens of the first lens group G1 based on the d line is ν1cp. It is assumed that an Abbe number of the negative lens of the cemented lens of the first lens group G1 based on the d line is ν1en. It is assumed that an Abbe number of the positive lens of the cemented lens of the second lens group G2 based on the d line is ν2cp. It is assumed that an Abbe number of the negative lens of the cemented lens of the second lens group G2 based on the d line is ν2cn. By satisfying Conditional Expression (3), it is easy to keep a favorable balance between longitudinal chromatic aberration and lateral chromatic aberration generated in the first lens group G1 and the second lens group G2. Therefore, there is an advantage in keeping high performance. In order to obtain more favorable characteristics, it is more preferable that the imaging lens satisfies Conditional Expression (3-1), it is yet more preferable that the imaging lens satisfies Conditional Expression (3-2), and it is most preferable that the imaging lens satisfies Conditional Expression (3-3).

$$52 < (\nu 2cp - \nu 2cn) - (\nu 1cp - \nu 1cn) < 170 \quad (3)$$

$$53 < (\nu 2cp - \nu 2cn) - (\nu 1cp - \nu 1cn) < 155 \quad (3\text{-}1)$$

$$54 < (\nu 2cp - \nu 2cn) - (\nu 1cp - \nu 1cn) < 140 \quad (3\text{-}2)$$

$$55 < (\nu 2cp - \nu 2cn) - (\nu 1cp - \nu 1cn) < 125 \quad (3\text{-}3)$$

It is preferable that the imaging lens satisfies Conditional Expression (4). Here, it is assumed that a distance on the optical axis between the lens closest to the image side in the first lens group G1 and the lens closest to the object side in the second lens group G2 is DG12. It is assumed that a sum of the back focal length of the whole system in terms of the air-equivalent distance and a distance on the optical axis from a lens surface closest to the object side in the first lens group G1 to a lens surface closest to the image side in the second lens group G2 in a state where the infinite distance object is in focus is TL. For example, FIG. 1 shows the distance DG12. Regarding the lower limit of Conditional Expression (4), since DG12 and TL are distances, DG12>0 and TL>0 are established. Thus, DG12/TL>0. By not allowing the corresponding value of Conditional Expression (4) to be equal to or greater than the upper limit thereof, there is an advantage in suppressing an increase in total length of the optical system. In order to obtain more favorable characteristics, it is more preferable that the imaging lens satisfies Conditional Expression (4-1), it is yet more preferable that the imaging lens satisfies Conditional Expression (4-2), and it is most preferable that the imaging lens satisfies Conditional Expression (4-3).

$$0 < DG12/TL < 0.11 \quad (4)$$

$$0 < DG12/TL < 0.09 \quad (4\text{-}1)$$

$$0 < DG12/TL < 0.07 \quad (4\text{-}2)$$

$$0 < DG12/TL < 0.06 \quad (4\text{-}3)$$

Assuming that a focal length of the first lens group G1 is fG1, it is preferable that the imaging lens satisfies Conditional Expression (5). By not allowing the corresponding value of Conditional Expression (5) to be equal to or less than the lower limit thereof, the negative refractive power of the first lens group G1 is prevented from becoming excessively strong. Therefore, the luminous flux which is strongly divergent can be prevented from being incident onto the second lens group G2. If the luminous flux which is strongly divergent is incident onto the second lens group G2, there is a disadvantage in that a large number of lenses are required to converge the divergent luminous flux while keeping favorable performance. By not allowing the corresponding value of Conditional Expression (5) to be equal to or less than the lower limit thereof, such a disadvantage can be avoided. As a result, there is an advantage in achieving reduction in size and weight. By not allowing the corresponding value of Conditional Expression (5) to be equal to or greater than the upper limit thereof, the positive refractive power of the first lens group G1 is prevented from becoming excessively strong. Therefore, luminous flux strongly converged is incident onto the second lens group G2. As a result, it is easy to ensure the back focal length. If the luminous flux, which is strongly converged, is incident onto the second lens group G2, the converged luminous flux is further converged by the positive refractive power of the second lens group G2. Therefore, it is difficult to ensure the back focal length. In order to obtain more favorable characteristics, it is more preferable that the imaging lens satisfies Conditional Expression (5-1).

$$-0.8 < f/fG1 < 0.6 \tag{5}$$

$$-0.7 < f/fG1 < 0.5 \tag{5-1}$$

Assuming that a focal length of the second lens group G2 is fG2, it is preferable that the imaging lens satisfies Conditional Expression (6). By not allowing the corresponding value of Conditional Expression (6) to be equal to or less than the lower limit thereof, the refractive power of the second lens group G2 is prevented from becoming excessively weak. Therefore, the distance for converging the luminous flux on the image plane is prevented from becoming excessively long. Thereby, there is an advantage in achieving reduction in total length of the optical system. By not allowing the corresponding value of Conditional Expression (6) to be equal to or greater than the upper limit thereof, the refractive power of the second lens group G2 is prevented from becoming excessively strong. Therefore, it is easy to ensure the back focal length. In order to obtain more favorable characteristics, it is more preferable that the imaging lens satisfies Conditional Expression (6-1).

$$0.4 < f/fG2 < 1 \tag{6}$$

$$0.5 < f/fG2 < 0.9 \tag{6-1}$$

The second lens group G2 includes a positive lens at a position closest to the image side. In such a configuration, it is preferable that the imaging lens satisfies Conditional Expression (7). Here, it is assumed that a focal length of the second lens group G2 is fG2. It is assumed that a focal length of the positive lens closest to the image side in the second lens group G2 is fzp. By not allowing the corresponding value of Conditional Expression (7) to be equal to or less than the lower limit thereof, there is an advantage in reducing the angle of incidence of the principal ray onto the image plane Sim. By not allowing the corresponding value of Conditional Expression (7) to be equal to or greater than the upper limit thereof, there are advantages in correcting astigmatism and spherical aberration. In order to obtain more favorable characteristics, it is more preferable that the imaging lens satisfies Conditional Expression (7-1).

$$0.1 < fG2/fzp < 1 \tag{7}$$

$$0.2 < fG2/fzp < 0.9 \tag{7-1}$$

It is preferable that the imaging lens satisfies Conditional Expression (8). Here, it is assumed that an average value of refractive indexes of all negative lenses disposed closer to the object side than a positive lens closest to the object side among positive lenses included in the imaging lens at the d line is N1nave. For example, in the example of FIG. 1, the positive lens closest to the object side among the positive lenses included in the imaging lens is a lens 14. Therefore, an average value of refractive indexes of three negative lenses of lenses L11, L12, and L13 at the d line is N1nave. By not allowing the corresponding value of Conditional Expression (8) to be equal to or less than the lower limit thereof, the refractive power of the negative lens disposed on the object side in the first lens group G1 is prevented from becoming excessively weak. As a result, there is an advantage in achieving wide angle. If the corresponding value of Conditional Expression (8) is equal to or less than the lower limit thereof, in order to achieve the wide angle, it is necessary to increase the number of negative lenses, which causes a disadvantage that the total length of the optical system is increased. By not allowing the corresponding value of Conditional Expression (8) to be equal to or less than the lower limit thereof, such a disadvantage can be avoided. As a result, there is an advantage in achieving reduction in size and weight. By not allowing the corresponding value of Conditional Expression (8) to be equal to or greater than the upper limit thereof, the refractive power of the negative lens disposed on the object side in the first lens group G1 is prevented from becoming excessively strong. Therefore, it is possible to suppress occurrence of high-order spherical aberration for each wavelength. Thereby, it is easy to correct chromatic aberration in a wide wavelength region. In order to obtain more favorable characteristics, it is more preferable that the imaging lens satisfies Conditional Expression (8-1).

$$1.43 < N1nave < 1.9 \tag{8}$$

$$1.43 < N1nave < 1.85 \tag{8-1}$$

It is preferable that the imaging lens satisfies Conditional Expression (9). Here, it is assumed that an average value of Abbe numbers of all the positive lenses included in the imaging lens based on the d line is νpave. It is assumed that an average value of Abbe numbers of all the negative lenses included in the imaging lens based on the d line is νnave. Conditional Expression (9) is a conditional expression for satisfactorily correcting chromatic aberration in a wide wavelength region. By satisfying Conditional Expression (9), the primary decolorization correction effect can be satisfactorily obtained. In order to obtain more favorable characteristics, it is more preferable that the imaging lens satisfies Conditional Expression (9-1).

$$-16 < \nu pave - \nu nave < 20 \tag{9}$$

$$-14 < \nu pave - \nu nave < 18 \tag{9-1}$$

It is preferable that the imaging lens satisfies Conditional Expression (10). By not allowing the corresponding value of Conditional Expression (10) to be less than or equal to the lower limit thereof, the refractive power of each lens is prevented from becoming excessively strong. Therefore, it is possible to suppress occurrence of high-order spherical aberration for each wavelength. As a result, it is easy to correct chromatic aberration in the wide wavelength region. By not allowing the corresponding value of Conditional Expression (10) to be equal to or greater than the upper limit thereof, there is an advantage in achieving reduction in total length of the optical system. Therefore, it is easy to deal with reduction in size required in the market. In order to obtain more favorable characteristics, it is more preferable that the imaging lens satisfies Conditional Expression (10-1).

$$3 < TL/f < 6.5 \quad (10)$$

$$3.5 < TL/f < 6 \quad (10\text{-}1)$$

It is preferable that the imaging lens satisfies Conditional Expression (11). By satisfying Conditional Expression (11), the symmetry of the refractive power of each lens group can be kept well. Therefore, it is easy to correct lateral chromatic aberration and distortion. In order to obtain more favorable characteristics, it is more preferable that the imaging lens satisfies Conditional Expression (11-1).

$$-1.3 < fG2/fG1 < 0.9 \quad (11)$$

$$-1.1 < fG2/fG1 < 0.7 \quad (11\text{-}1)$$

Assuming that an Abbe number of the lens closest to the image side in the first lens group G1 based on the d line is ν1z, it is preferable that the imaging lens satisfies Conditional Expression (12). By satisfying Conditional Expression (12), it is easy to correct lateral chromatic aberration and longitudinal chromatic aberration. In order to obtain more favorable characteristics, it is more preferable that the imaging lens satisfies Conditional Expression (12-1).

$$16 < \nu 1z < 45 \quad (12)$$

$$18 < \nu 1z < 43 \quad (12\text{-}1)$$

The first lens group G1 includes a cemented lens consisting of one positive lens and one negative lens. In such a configuration, it is preferable that the imaging lens satisfies Conditional Expression (13). Here, it is assumed that a refractive index of the positive lens of the cemented lens of the first lens group G1 at the d line is N1cp. By not allowing the corresponding value of Conditional Expression (13) to be equal to or less than the lower limit thereof, it is possible to suppress occurrence of large positive astigmatism and negative distortion. By not allowing the corresponding value of Conditional Expression (13) to be equal to or greater than the upper limit thereof, it is possible to suppress occurrence of negative astigmatism and positive distortion. In order to obtain more favorable characteristics, it is more preferable that the imaging lens satisfies Conditional Expression (13-1).

$$1.7 < N1cp < 2.1 \quad (13)$$

$$1.75 < N1cp < 2.05 \quad (13\text{-}1)$$

The first lens group G1 includes a cemented lens consisting of one positive lens and one negative lens. In such a configuration, it is preferable that the imaging lens satisfies Conditional Expression (14). Here, it is assumed that a temperature coefficient of the refractive index of the positive lens of the cemented lens of the first lens group G1 at the d line at 50° C. is dN1cp/dT. It is assumed that a unit of dN1cp/dT is ° C.$^{-1}$. In order to correct spherical aberration and longitudinal chromatic aberration, the central thickness of the positive lens of the cemented lens of the first lens group G1 becomes thick. Thus, it is preferable to use a material having an appropriate temperature coefficient. By satisfying Conditional Expression (14), the amount of movement of the focus (in-focus position) relative to a temperature change can be suppressed. As a result, there is an advantage in keeping high performance. In order to obtain more favorable characteristics, it is more preferable that the imaging lens satisfies Conditional Expression (14-1).

$$-0.5\times10^{-6} < dN1cp/dT < 6.5\times10^{-6} \quad (14)$$

$$-0.2\times10^{-6} < dN1cp/dT < 6\times10^{-6} \quad (14\text{-}1)$$

The first lens group G1 includes a cemented lens consisting of one positive lens and one negative lens. In such a configuration, it is more preferable that the imaging lens satisfies Conditional Expressions (13) and (14). It is more preferable that the imaging lens satisfies Conditional Expressions (13) and (14) and then satisfies at least one of Conditional Expressions (13-1) or (14-1).

The lens closest to the image side in the first lens group G1 is a single lens which has a positive refractive power. In such a configuration, it is preferable that the imaging lens satisfies Conditional Expression (15). Here, a temperature coefficient of the refractive index of the single lens at 50° C. at the d line is dN1s/dT. It is assumed that a unit of dN1s/dT is ° C.$^{-1}$. In a case where astigmatism is to be corrected, the central thickness of the single lens becomes thick. Therefore, it is preferable to use a material having an appropriate temperature coefficient. By satisfying Conditional Expression (15), it is possible to suppress the amount of focus movement relative to the temperature change. As a result, there is an advantage in keeping high performance. In order to obtain more favorable characteristics, it is more preferable that the imaging lens satisfies Conditional Expression (15-1).

$$-0.5\times10^{-6} < dN1s/dT < 9\times10^{-6} \quad (15)$$

$$-0.2\times10^{-6} < dN1s/dT < 8.5\times10^{-6} \quad (15\text{-}1)$$

It is preferable that the imaging lens satisfies Conditional Expression (16). Here, it is assumed that a sum of the back focal length of the whole system in terms of the air-equivalent distance and a distance on the optical axis from the aperture stop St to the lens surface closest to the image side in the second lens group G2 in a state where the infinite distance object is in focus is Dst. By not allowing the corresponding value of Conditional Expression (16) to be equal to or less than the lower limit thereof, the angle of incidence of the principal ray onto the sensor disposed on the image plane Sim can be reduced. Therefore, a decrease in the amount of peripheral light can be suppressed. By not allowing the corresponding value of Conditional Expression (16) to be equal to or greater than the upper limit thereof, there is an advantage in achieving reduction in total length of the optical system. In order to obtain more favorable characteristics, it is more preferable that the imaging lens satisfies Conditional Expression (16-1).

$$2 < Dst/(f \times \tan\omega) < 3.8 \quad (16)$$

$$2.2 < Dst/(f \times \tan\omega) < 3.6 \quad (16\text{-}1)$$

Assuming that an angle, which is formed between a principal ray having a maximum half angle of view ω incident onto the image plane Sim and an axis line parallel to the optical axis Z, is CRA, it is preferable that the imaging lens satisfies Conditional Expression (17). Here, it is assumed that a unit of CRA is degree. Conditional Expression (17) is an expression relating to telecentricity. Regarding the lower limit of Conditional Expression (17), |CRA| is an absolute value, and thus 0≤|CRA|. By not allowing the corresponding value of Conditional Expression (17) to be equal to or greater than the upper limit thereof, the angle of incidence of the principal ray onto the sensor disposed on the image plane Sim can be reduced. Therefore, a decrease in the amount of peripheral light can be suppressed. In order to obtain more favorable characteristics, it is more preferable that the imaging lens satisfies Conditional Expression (17-1).

$$0 \le |CRA| < 12 \quad (17)$$

$$0 \le |CRA| < 10 \quad (17\text{-}1)$$

Figure 2:
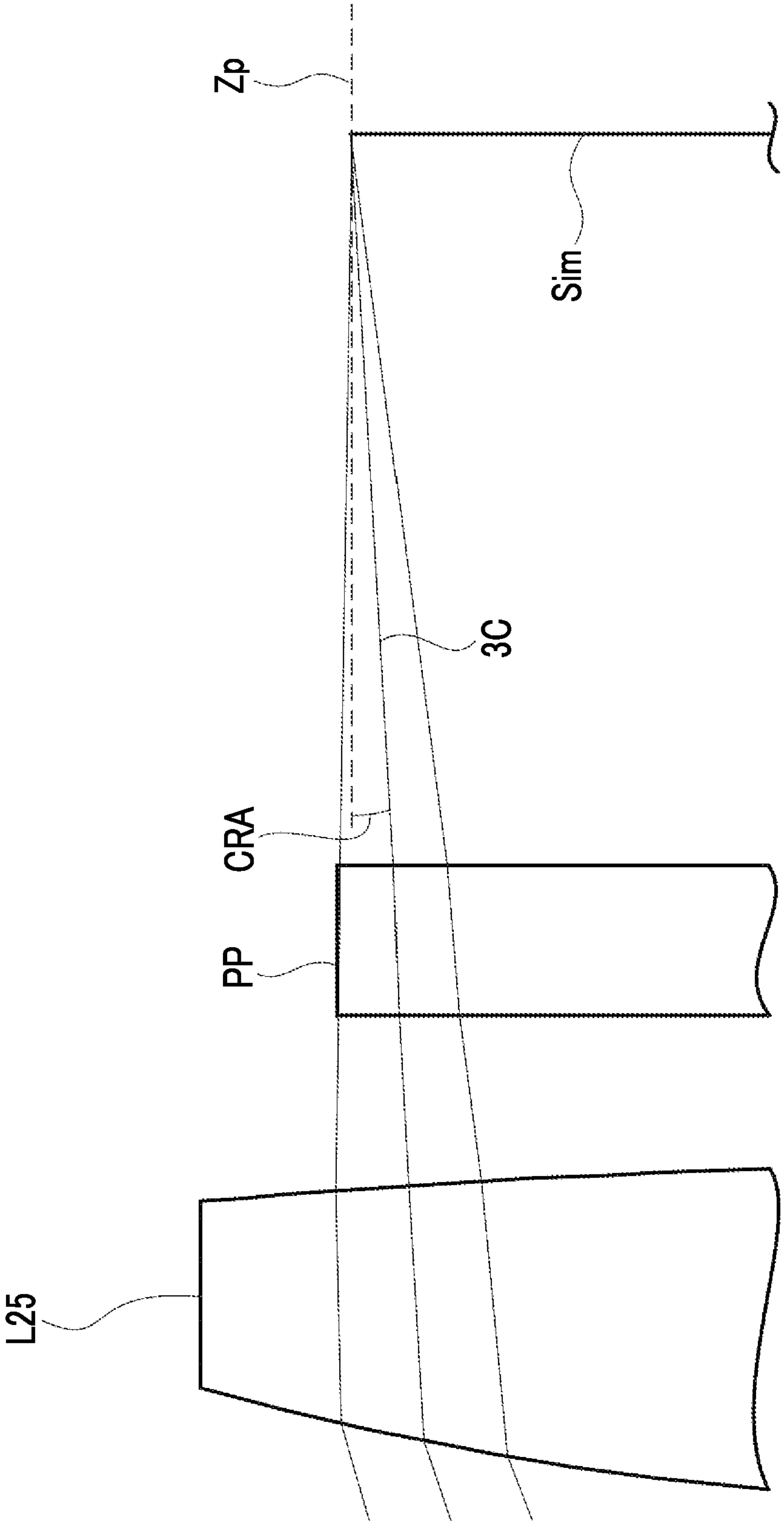
FIG. 2 is a diagram showing CRA.

FIG. 2 is a partially enlarged view including the upper portions of the lens L25, the optical member PP, and the image plane Sim of the imaging lens of FIG. 1. FIG. 2 shows, as an example, the angle CRA. In FIG. 2, a principal ray 3C, which is incident onto the image plane Sim and has the maximum half angle of view ω, is indicated by the solid line. An axis line Zp, which passes through the intersection of the principal ray 3C and the image plane Sim and is parallel to the optical axis Z, is indicated by the broken line.

The above-mentioned preferred configurations and available configurations according to the first embodiment may be optionally combined, and it is preferable to selectively adopt the configurations in accordance with required specifications. The conditional expressions that the imaging lens preferably satisfies are not limited to the conditional expressions described in the form of the expression, and the lower limit and the upper limit are selected from the preferable and more preferably listed conditional expressions. The conditional expressions may include all conditional expressions obtained through optional combinations.

For example, in a preferred aspect of the imaging lens according to the first embodiment, the imaging lens consists of, in order from the object side to the image side: a first lens group G1 that has a refractive power; an aperture stop St; and a second lens group G2 that has a positive refractive power. The first lens group G1 includes, successively in order from the position closest to the object side to the image side, a negative meniscus lens and a negative lens, and satisfies Conditional Expression (1).

Next, an imaging lens according to a second embodiment of the present disclosure will be described. The example shown in FIG. 1 also has a configuration according to the second embodiment of the present disclosure. The imaging lens according to the second embodiment is an imaging lens which is formed by combining a plurality of lenses, and includes at least one positive lens which satisfies Conditional Expressions (18), (19), and (20). Here, a symbol is defined as follows for the positive lens which is included in the imaging lens. It is assumed that a refractive index of the positive lens at the d line is Np. It is assumed that an Abbe number of the positive lens based on the d line is νp. It is assumed that a temperature coefficient of the refractive index of the positive lens at the d line at 50° C. is dNp/dT. It is assumed that a unit of dNp/dT is ° $C.^{-1}$.

$$1.72 < Np < 1.9 \quad (18)$$

$$30 < \nu p < 42 \quad (19)$$

$$dNp/dT < 4.3 \times 10^{-6} \quad (20)$$

By combining a positive lens which satisfies Conditional Expressions (18), (19), and (20) and a lens which is made of another general optical material, chromatic aberration and focus movement during the temperature change can be satisfactorily corrected. Thereby, it is easy to realize an imaging lens which is configured to be compact and lightweight and keeps favorable optical performance. Hereinafter, the positive lens, which satisfies Conditional Expressions (18), (19), and (20), is referred to as a first positive lens.

By not allowing the corresponding value of Conditional Expression (18) to be equal to or less than the lower limit thereof, it is easy to ensure a refractive power sufficient for obtaining an effect of correcting the focus movement in a case where the temperature changes (hereinafter, referred to as a temperature correction effect for convenience of description). The optical material generally tends to decrease an Abbe number as a refractive index increases. By not allowing the corresponding value of Conditional Expression (18) to be equal to or greater than the upper limit thereof, the refractive index is prevented from becoming excessively high. Therefore, it is easy to ensure the Abbe number required for correcting chromatic aberration. In order to obtain more favorable characteristics, it is more preferable that the first positive lens satisfies Conditional Expression (18-1).

$$1.76 < Np < 1.86 \quad (18\text{-}1)$$

By satisfying Conditional Expression (19), there are advantages in correcting lateral chromatic aberration and longitudinal chromatic aberration. In order to obtain more favorable characteristics, it is more preferable that the first positive lens satisfies Conditional Expression (19-1).

$$33 < \nu p < 40 \quad (19\text{-}1)$$

By not allowing the corresponding value of Conditional Expression (20) to be equal to or greater than the upper limit thereof, the temperature correction effect is prevented from becoming excessively weak. Therefore, it is possible to suppress the amount of focus movement relative to the temperature change.

It is preferable that the first positive lens further satisfies Conditional Expression (20-1). By not allowing the corresponding value of Conditional Expression (20-1) to be equal to or less than the lower limit thereof, the amount of focus movement relative to the temperature change is prevented from becoming excessively large. Therefore, it is possible to suppress excessive correction of the focus movement during the temperature change. By not allowing the corresponding value of Conditional Expression (20-1) to be equal to or greater than the upper limit thereof, the effect of Conditional Expression (20) can be made more remarkable. In order to obtain more favorable characteristics, it is more preferable that the first positive lens satisfies any of Conditional Expressions (20-2), (20-3), (20-4), (20-5), (20-6), and (20-7).

$$-3\times10^{-6} < dNp/dT < 4\times10^{-6} \quad (20\text{-}1)$$

$$-3\times10^{-6} < dNp/dT < 3\times10^{-6} \quad (20\text{-}2)$$

$$-2\times10^{-6} < dNp/dT < 2\times10^{-6} \quad (20\text{-}3)$$

$$-2\times10^{-6} < dNp/dT < 1\times10^{-6} \quad (20\text{-}4)$$

$$-1\times10^{-6} < dNp/dT < 0\times10^{-6} \quad (20\text{-}5)$$

$$-0.2\times10^{-6} < dNp/dT < 0\times10^{-6} \quad (20\text{-}6)$$

$$-0.9\times10^{-6} < dNp/dT < -0.7\times10^{-6} \quad (20\text{-}7)$$

It is preferable that the imaging lens according to the second embodiment includes at least one positive lens which satisfies Conditional Expressions (21), (22), and (23). The definitions of the symbols, which are used in Conditional Expressions (21), (22), and (23), are the same as those of the symbols which are used in Conditional Expressions (18), (19), and (20).

$$1.6 < Np < 1.8 \quad (21)$$

$$40 < \nu p < 60 \quad (22)$$

$$dNp/dT < 3.5\times10^{-6} \quad (23)$$

In many cases, a lens, which satisfies Conditional Expressions (21) and (22), in the region having relatively low dispersion and high refractive index has a positive value of the temperature coefficient of the refractive index. By combining a positive lens which satisfies Conditional Expressions (21), (22), and (23) and a lens which is made of another general optical material, chromatic aberration and focus movement during a temperature change can be satisfactorily corrected. Thereby, it is easy to realize an imaging lens which is configured to be compact and lightweight and keeps favorable optical performance. In the following description, the positive lens, which satisfies Conditional Expressions (21), (22), and (23), is referred to as a second positive lens.

By not allowing the corresponding value of Conditional Expression (21) to be equal to or less than the lower limit thereof, it is easy to ensure a refractive power sufficient for obtaining the temperature correction effect. By not allowing the corresponding value of Conditional Expression (21) to be equal to or greater than the upper limit thereof, the refractive index is prevented from becoming excessively high. Therefore, it is easy to ensure the Abbe number required for correcting chromatic aberration. In order to obtain more favorable characteristics, it is more preferable that the second positive lens satisfies Conditional Expression (21-1).

$$1.65 < Np < 1.75 \quad (21\text{-}1)$$

By satisfying Conditional Expression (22), there are advantages in correcting lateral chromatic aberration and longitudinal chromatic aberration. In order to obtain more favorable characteristics, it is more preferable that the second positive lens satisfies Conditional Expression (22-1).

$$45 < \nu p < 55 \quad (22\text{-}1)$$

By not allowing the corresponding value of Conditional Expression (23) to be equal to or greater than the upper limit thereof, the temperature correction effect is prevented from becoming excessively weak. Therefore, it is possible to suppress the amount of focus movement relative to the temperature change.

It is preferable that the second positive lens further satisfies Conditional Expression (23-1). By not allowing the corresponding value of Conditional Expression (23-1) to be equal to or less than the lower limit thereof, the amount of focus movement relative to the temperature change is prevented from becoming excessively large. Therefore, it is possible to suppress excessive correction of the focus movement during the temperature change. In order to obtain more favorable characteristics, it is more preferable that the second positive lens satisfies Conditional Expression (23-2), and it is yet more preferable that the second positive lens satisfies Conditional Expression (23-3).

$$-4\times10^{-6} < dNp/dT < 3.5\times10^{-6} \quad (23\text{-}1)$$

$$-3\times10^{-6} < dNp/dT < 2\times10^{-6} \quad (23\text{-}2)$$

$$-2\times10^{-6} < dNp/dT < 0\times10^{-6} \quad (23\text{-}3)$$

Further, it is preferable that the imaging lens according to the second embodiment includes at least one negative lens which satisfies Conditional Expressions (24), (25), and (26). Here, a symbol is defined as follows for the negative lens which is included in the imaging lens. It is assumed that a refractive index of the negative lens at the d line is Nn. It is assumed that an Abbe number of the negative lens based on the d line is νn. It is assumed that a temperature coefficient of the refractive index of the negative lens at 50° C. at the d line is dNn/dT. It is assumed that a unit of dNn/dT is ° $C.^{-1}$.

$$1.55 < Nn < 1.9 \quad (24)$$

$$35 < \nu n < 65 \quad (25)$$

-continued $$4\times10^{-6}<dNn/dT \tag{26}$$

By including the negative lens which satisfies Conditional Expressions (24), (25), and (26) in the imaging lens, it is possible to satisfactorily correct chromatic aberration and focus movement during the temperature change. In particular, by combining the negative lens which satisfies Conditional Expressions (24), (25), and (26) and the second positive lens which satisfies Conditional Expressions (21), (22), and (23), chromatic aberration and the focus movement during the temperature change can be more satisfactorily corrected. That is, it is possible to achieve favorable chromatic aberration performance and favorable temperature characteristics. Thereby, it is easy to realize an imaging lens which is configured to be compact and lightweight and keeps favorable optical performance. Hereinafter, a negative lens, which satisfies Conditional Expressions (24), (25), and (26), is referred to as a first negative lens.

By not allowing the corresponding value of Conditional Expression (24) to be equal to or less than the lower limit thereof, it is easy to ensure a refractive power sufficient for obtaining the temperature correction effect. By not allowing the corresponding value of Conditional Expression (24) to be equal to or greater than the upper limit thereof, the refractive index is prevented from becoming excessively high. Therefore, it is easy to ensure the Abbe number required for correcting chromatic aberration. In order to obtain more favorable characteristics, it is more preferable that the first negative lens satisfies Conditional Expression (24-1).

$$1.6<Nn<1.85 \tag{24-1}$$

By satisfying Conditional Expression (25), there is an advantage in correcting longitudinal chromatic aberration. In order to obtain more favorable characteristics, it is more preferable that the first negative lens satisfies Conditional Expression (25-1).

$$40<\nu n<60 \tag{25-1}$$

By not allowing the corresponding value of Conditional Expression (26) to be equal to or less than the lower limit thereof, the temperature correction effect is prevented from becoming excessively weak. Therefore, it is possible to suppress the amount of focus movement relative to the temperature change.

It is preferable that the first negative lens further satisfies Conditional Expression (26-1). By not allowing the corresponding value of Conditional Expression (26-1) to be equal to or greater than the upper limit thereof, the amount of focus movement relative to the temperature change is prevented from becoming excessively large. Therefore, it is possible to suppress excessive correction of the focus movement during the temperature change. In order to obtain more favorable characteristics, it is more preferable that the first negative lens satisfies Conditional Expression (26-2), and it is yet more preferable that the first negative lens satisfies Conditional Expression (26-3).

$$4\times10^{-6}<dNn/dT<16\times10^{-6} \tag{26-1}$$

$$5\times10^{-6}<dNn/dT<14\times10^{-6} \tag{26-2}$$

$$6\times10^{-6}<dNn/dT<12\times10^{-6} \tag{26-3}$$

Further, in a case where the imaging lens according to the second embodiment includes at least one specific lens which satisfies Conditional Expression (27), it is preferable that at least one of the specific lenses satisfies Conditional Expression (28). Here, it is assumed that an Abbe number of the lens, which is included in the imaging lens, based on the d line is νd. It is assumed that a partial dispersion ratio of the lens, which is included in the imaging lens, between the g line and the F line is θgF.

$$60<\nu d \tag{27}$$

$$0.6<\theta gF+0.001618\times\nu d<0.686 \tag{28}$$

Assuming that refractive indexes for the g line, F line, and C line of a certain lens are Ng, NF, and NC, respectively, and the partial dispersion ratio thereof between the g line and F line of the lens is θgF, θgF is defined by the following expression.

$$\theta gF=(Ng-NF)/(NF-NC)$$

By satisfying Conditional Expressions (27) and (28), it is possible to satisfactorily correct chromatic aberration while avoiding the use of an expensive optical material having large anomalous dispersibility in a low dispersion manner.

Conditional Expression (27) means a low dispersion material. By not allowing the corresponding value of Conditional Expression (27) to be equal to or less than the lower limit thereof, it is easy to correct chromatic aberration. It is preferable that the specific lens further satisfies Conditional Expression (27-1). By not allowing the corresponding value of Conditional Expression (27-1) to be equal to or greater than the upper limit thereof, it is possible to avoid using an expensive material having high anomalous dispersibility. As a result, there is an advantage in achieving reduction in costs.

$$60<\nu d<80 \tag{27-1}$$

By not allowing the corresponding value of Conditional Expression (28) to be equal to or less than the lower limit thereof, it is possible to ensure appropriate anomalous dispersibility. As a result, there is an advantage in correcting chromatic aberration. By not allowing the corresponding value of Conditional Expression (28) to be equal to or greater than the upper limit thereof, it is possible to avoid using an expensive material having high anomalous dispersibility. As a result, there is an advantage in achieving reduction in costs. In order to obtain more favorable characteristics, it is more preferable that the specific lens satisfies Conditional Expression (28-1), and it is yet more preferable that the specific lens satisfies Conditional Expression (28-2).

$$0.61 < \theta gF + 0.001618 \times \nu d < 0.676 \quad (28\text{-}1)$$

$$0.62 < \theta gF + 0.001618 \times \nu d < 0.666 \quad (28\text{-}2)$$

The imaging lens according to the second embodiment is configured to include at least one second positive lens and at least one first negative lens. In such a configuration, in a case where the imaging lens further includes at least one specific lens, it is preferable that at least one of the specific lenses satisfies Conditional Expression (28). In such a case, it is possible to more satisfactorily correct chromatic aberration and focus movement during temperature change.

The above-mentioned preferred configurations and available configurations according to the second embodiment may be optionally combined, and it is preferable to selectively adopt the configurations in accordance with required specifications. The conditional expressions that the imaging lens preferably satisfies are not limited to the conditional expressions described in the form of the expression, and the lower limit and the upper limit are selected from the preferable and more preferably listed conditional expressions. The conditional expressions may include all conditional expressions obtained through optional combinations.

The example shown in FIG. 1 is an example, and various modifications can be made without departing from the scope of the technique of the embodiment of the present disclosure. For example, the number of lenses included in each lens group may be different from the number of the example of FIG. 1. Further, the imaging lens according to the first embodiment may have the configuration of the second embodiment and preferable and possible configurations according to the second embodiment. Similarly, the imaging lens according to the second embodiment may have the configuration of the first embodiment and preferable and possible configurations according to the first embodiment.

In the imaging lens according to the present disclosure, any lens surface may be aspherical in order to improve a degree of freedom in design and to satisfactorily correct aberrations. The aspherical surface may be formed through grinding or molding. Further, a compound aspherical lens may be used as a lens having an aspherical surface.

In the imaging lens of the present disclosure, in order to correct chromatic aberration, any one of the lens groups may be configured to have a refractive index distribution lens such as a gradient index lens (GRIN) lens or a diffractive optical element.

A configuration may be made such that the entire imaging lens moves integrally during focusing. In such a case, the mechanical structure is simplified. Therefore, performance deterioration due to disturbance such as vibration can be reduced. In the present specification, the expression "moved integrally" means that the lenses are moved simultaneously by the same amount in the same direction.

The imaging lens may be provided with an antireflection film in order to keep the transmittance in a wide wavelength region. The antireflection film may be used, which suppresses reflection in the entire wavelength region to be used, or may be used, which suppresses reflection in some wavelength regions by selecting the wavelength regions to be used. The antireflection film may use a special coating in which a nano-level structure is formed on the lens surface in a moth-eye shape and is configured to suppress reflection.

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, constituent elements do not necessarily have a common configuration.

Example 1

FIG. 1 is a cross-sectional view of a configuration of an imaging lens according to Example 1, and an illustration method and a configuration thereof are as described above. Therefore, some description is not repeated herein. The imaging lens according to Example 1 consists of, in order from the object side to the image side, a first lens group G1 that has a positive refractive power, an aperture stop St, and a second lens group G2 that has a negative refractive power.

Table 1 shows basic lens data of the imaging lens according to Example 1. The table of basic lens data will be described as follows. The "Sn" column shows surface numbers in a case where the surface closest to the object side is the first surface and the number is increased one by one toward the image side. The "R" column shows a curvature radius of each surface. The "D" column shows a surface spacing between each surface and the surface adjacent to the image side on the optical axis. The "Nd" column shows a refractive index of each constituent element at the d line. The "νd" column shows an Abbe number of each constituent element based on the d line. The "θgF" column shows a partial dispersion ratio of each constituent element between the g line and the F line. The "dN/dT" column shows a value obtained by multiplying a temperature coefficient of a refractive index of each constituent element at the d line at 50° C. by $10^6$.

In the table of the basic lens data, the sign of the curvature radius of the surface convex toward the object side is positive, and the sign of the curvature radius of the surface convex toward the image side is negative. In a cell of a surface number of a surface corresponding to the aperture stop St, the surface number and a term of (St) are noted. The table of basic lens data also shows the optical member PP. A value at the bottom cell of the column of D in the table indicates a spacing between the image plane Sim and the surface closest to the image side in the table.

Table 2 shows a specification of the imaging lens according to Example 1. The table of specification shows the focal length f, the back focal length Bf, the F number FNo., and the maximum total angle of view 2ω, based on the d line. [°] in the column of the maximum total angle of view indicates the unit is degrees. Tables 1 and 2 show values in a state where the infinite distance object is in focus.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | νd | θgF | dN/dT |
|---|---|---|---|---|---|---|
| 1 | 8.8495 | 0.9998 | 1.84666 | 23.78 | 0.62054 | 1.5 |
| 2 | 4.6897 | 1.0832 | | | | |

TABLE 1-continued

| Example 1 | | | | | | |
|---|---|---|---|---|---|---|
| Sn | R | D | Nd | νd | θgF | dN/dT |
| 3 | 11.2206 | 0.9998 | 1.83481 | 42.74 | 0.56490 | 5.1 |
| 4 | 5.4071 | 1.1273 | | | | |
| 5 | −36.5540 | 1.0098 | 1.49700 | 81.54 | 0.53748 | −6.4 |
| 6 | 5.4240 | 2.9602 | 1.89190 | 37.13 | 0.57813 | 5.3 |
| 7 | −15.3513 | 0.0998 | | | | |
| 8 | 26.2012 | 0.9998 | 1.80440 | 39.58 | 0.57623 | 1.6 |
| 9 | 3.7356 | 0.3369 | | | | |
| 10 | 7.6924 | 1.8038 | 1.89286 | 20.36 | 0.63944 | 1.3 |
| 11 | ∞ | 1.2935 | | | | |
| 12(St) | ∞ | 0.0998 | | | | |
| 13 | 16.6504 | 2.2359 | 1.77250 | 49.60 | 0.55212 | 4.7 |
| 14 | −5.6626 | 1.0550 | | | | |
| 15 | −14.4570 | 0.9999 | 1.89286 | 20.36 | 0.63944 | 1.3 |
| 16 | 7.1738 | 0.2369 | | | | |
| 17 | 16.3518 | 4.4954 | 1.49700 | 81.54 | 0.53748 | −6.4 |
| 18 | −3.9283 | 0.7498 | 1.89286 | 20.36 | 0.63944 | 1.3 |
| 19 | −5.8624 | 2.2519 | | | | |
| 20 | 20.6611 | 2.2314 | 1.95906 | 17.47 | 0.65993 | 4.3 |
| 21 | −63.2423 | 1.0000 | | | | |
| 22 | ∞ | 1.0000 | 1.51633 | 64.14 | 0.53531 | 2.8 |
| 23 | ∞ | 4.8742 | | | | |

TABLE 2

| Example 1 | |
|---|---|
| f | 6.27 |
| Bf | 6.53 |
| FNo. | 5.60 |
| 2ω[°] | 73.4 |

Figure 3:
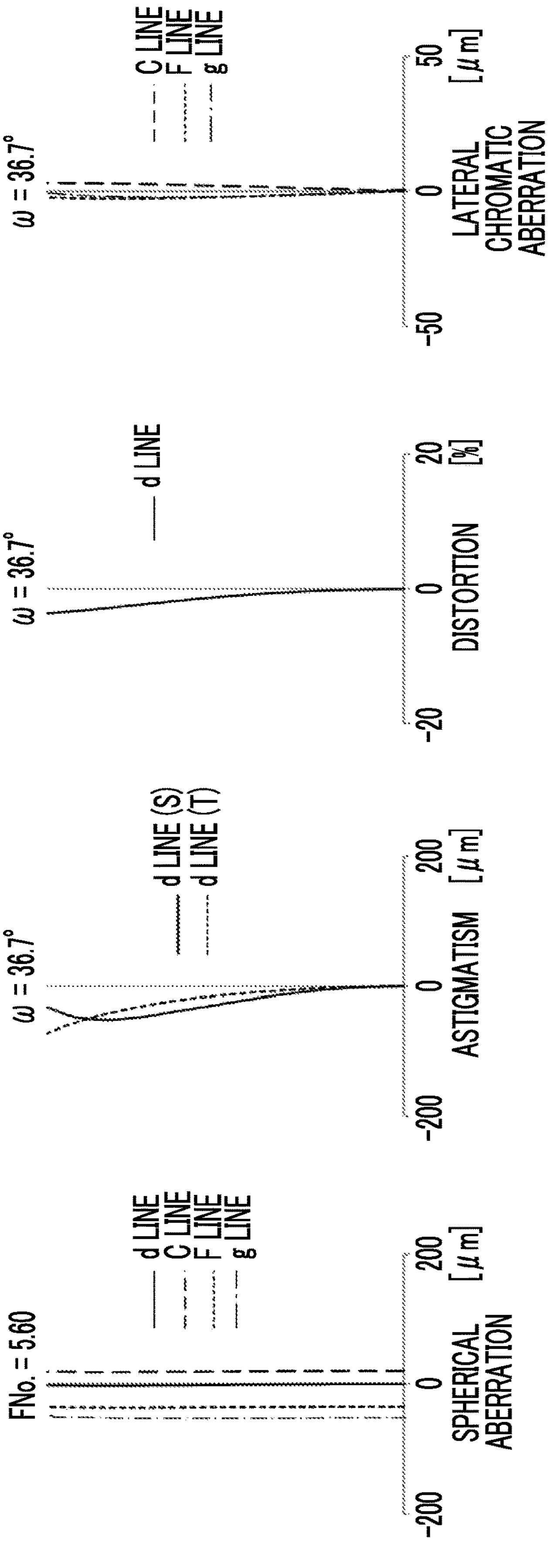
FIG. 3 is a diagram showing aberrations of the imaging lens according to Example 1.

FIG. 3 shows aberration diagrams of the imaging lens according to Example 1 in a state where the infinite distance object is in focus. FIG. 3 shows spherical aberration, astigmatism, distortion, and lateral chromatic aberration, in order from the left side. In the spherical aberration diagram, aberrations at the d line, the C line, the F line, and the g line are indicated by the solid line, the long broken line, the short broken line, and the chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, the F line, and the g line are respectively indicated by the long broken line, the short broken line, and the chain line. In the spherical aberration diagram, a value of the F number is shown after "FNo.=". In other aberration diagrams, the value of the maximum half angle of view is shown after "ω=".

Symbols, meanings, description methods, and illustration methods of the respective data pieces according to Example 1 are basically similar to those in the following examples unless otherwise specified. Therefore, in the following description, repeated description will not be given.

Example 2

Figure 4:
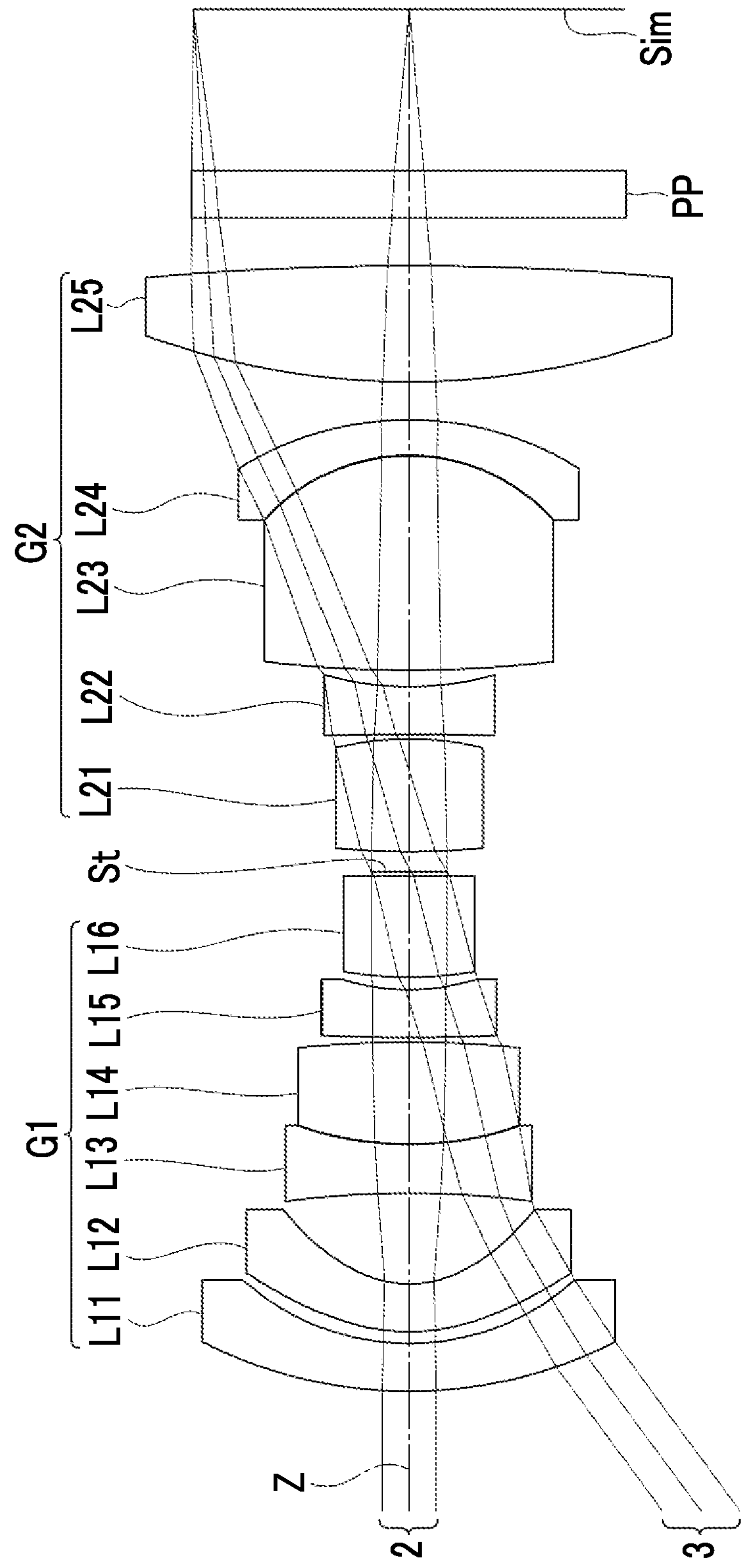
FIG. 4 is a cross-sectional view showing a configuration and luminous flux of an imaging lens according to Example 2.

FIG. 4 shows a cross-sectional view of a configuration and luminous flux of the imaging lens according to Example 2. The imaging lens according to Example 2 consists of, in order from the object side to the image side, a first lens group G1 that has a positive refractive power, an aperture stop St, and a second lens group G2 that has a positive refractive power. The first lens group G1 consists of six lenses L11 to L16 in order from the object side to the image side. The second lens group G2 consists of five lenses L21 to L25, in order from the object side to the image side.

Figure 5:
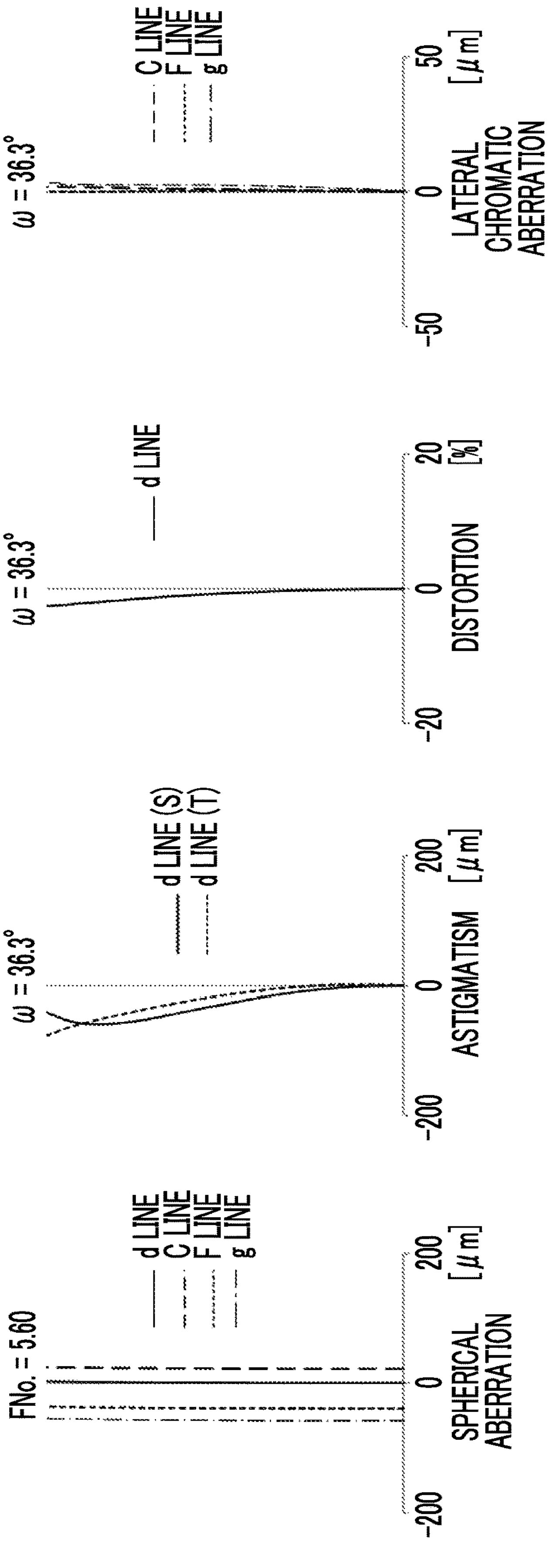
FIG. 5 is a diagram showing aberrations of the imaging lens according to Example 2.

Regarding the imaging lens according to Example 2, Table 3 shows basic lens data, Table 4 shows specification, and Table 5 shows aspherical coefficients thereof, and FIG. 5 shows aberration diagrams.

In basic lens data, a reference sign * is attached to surface numbers of aspherical surfaces, and numerical values of the paraxial curvature radius are written into the column of the curvature radius of the aspherical surface. In Table 5, the row of Sn shows surface numbers of the aspherical surfaces, and the rows of KA and Am show numerical values of the aspherical coefficients for each aspherical surface. It should be noted that m of Am is an integer of 3 or more and 20 or less (m=3, 4, 5, . . . , and 20). The "E±n" (n: an integer) in numerical values of the aspherical coefficients of Table 5 indicates "$\times 10^{\pm n}$". KA and Am are the aspherical coefficients in the aspherical surface expression represented by the following expression.

$$Zd = C \times h^2/\{1 + (1 - KA \times C^2 \times h^2)^{1/2}\} + \sum Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

The above-mentioned notation method of the aspherical coefficient is the same for examples having other aspherical surfaces.

TABLE 3

| Example 2 | | | | | | |
|---|---|---|---|---|---|---|
| Sn | R | D | Nd | νd | θgF | dN/dT |
| 1 | 9.5156 | 1.0000 | 1.51633 | 64.14 | 0.53531 | 2.8 |
| 2 | 5.1659 | 0.2500 | | | | |
| *3 | 4.1279 | 1.0002 | 1.51633 | 64.06 | 0.53345 | 4.8 |
| *4 | 2.2837 | 1.9030 | | | | |
| 5 | −19.3306 | 1.0098 | 1.43875 | 94.66 | 0.53402 | −6.5 |
| 6 | 6.9425 | 2.1446 | 1.90525 | 35.04 | 0.58486 | 5.7 |
| 7 | −22.2642 | 0.1000 | | | | |
| 8 | 40.5993 | 1.0000 | 1.59551 | 39.24 | 0.58043 | 2.2 |
| 9 | 4.6713 | 0.2630 | | | | |
| 10 | 7.8846 | 2.1133 | 1.95375 | 32.32 | 0.59056 | 4.4 |
| 11 | ∞ | 0.1001 | | | | |
| 12(St) | ∞ | 0.4191 | | | | |
| 13 | 15.9567 | 2.3703 | 1.71299 | 53.87 | 0.54587 | 4.3 |
| 14 | −6.5586 | 0.0999 | | | | |
| 15 | −54.9608 | 0.9999 | 1.89286 | 20.36 | 0.63944 | 1.3 |
| 16 | 6.6087 | 0.3433 | | | | |
| 17 | 24.7972 | 4.5080 | 1.49700 | 81.54 | 0.53748 | −6.4 |
| 18 | −4.0340 | 0.7498 | 1.89286 | 20.36 | 0.63944 | 1.3 |
| 19 | −6.6989 | 0.7790 | | | | |
| 20 | 16.1016 | 2.4329 | 1.95906 | 17.47 | 0.65993 | 4.3 |
| 21 | −60.3974 | 1.0000 | | | | |
| 22 | ∞ | 1.0000 | 1.51633 | 64.14 | 0.53531 | 2.8 |
| 23 | ∞ | 3.3876 | | | | |

TABLE 4

| Example 2 | |
|---|---|
| f | 6.29 |
| Bf | 5.05 |
| FNo. | 5.60 |
| 2ω[°] | 72.6 |

TABLE 5

| Example 2 | | |
|---|---|---|
| Sn | 3 | 4 |
| KA | 0.0000000E+00 | 0.0000000E+00 |
| A3 | −1.5987212E−18 | −3.1263880E−17 |
| A4 | −1.6858806E−03 | 6.6026666E−04 |
| A5 | 1.8019786E−04 | 1.9642132E−04 |
| A6 | −9.7623796E−06 | 3.8672113E−05 |
| A7 | −1.8753117E−06 | −9.6943542E−06 |
| A8 | 2.2582364E−07 | −6.0189559E−07 |
| A9 | 9.3158281E−09 | 5.9549702E−08 |
| A10 | −1.6957002E−09 | 4.0553065E−09 |
| A11 | −3.0409698E−11 | −2.1777701E−10 |
| A12 | 6.8745736E−12 | −1.5509264E−11 |
| A13 | 6.3385513E−14 | 4.9811150E−13 |
| A14 | −1.6466085E−14 | 3.5825001E−14 |
| A15 | −8.1640098E−17 | −6.9478428E−16 |
| A16 | 2.3307265E−17 | −4.9531964E−17 |
| A17 | 5.9544377E−20 | 5.3940382E−19 |
| A18 | −1.8042887E−20 | 3.7780891E−20 |
| A19 | −1.8932964E−23 | −1.7836713E−22 |
| A20 | 5.8914214E−24 | −1.2237431E−23 |

Example 3

Figure 6:
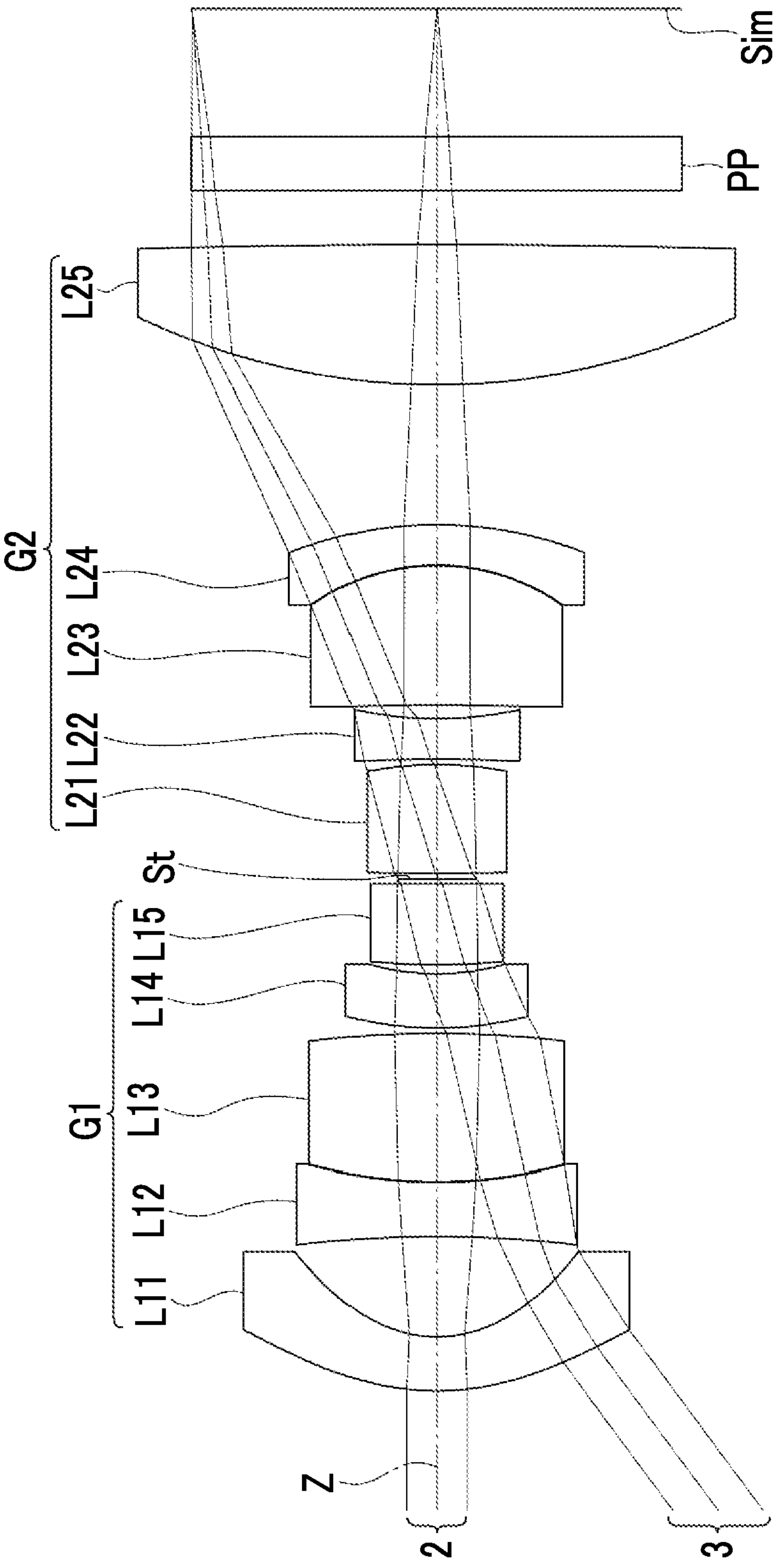
FIG. 6 is a cross-sectional view showing a configuration and luminous flux of an imaging lens according to Example 3.

FIG. 6 shows a cross-sectional view of a configuration and luminous flux of the imaging lens according to Example 3. The imaging lens according to Example 3 consists of, in order from the object side to the image side, a first lens group G1 that has a positive refractive power, an aperture stop St, and a second lens group G2 that has a positive refractive power. The first lens group G1 consists of five lenses L11 to L15, in order from the object side to the image side. The second lens group G2 consists of five lenses L21 to L25, in order from the object side to the image side.

Figure 7:
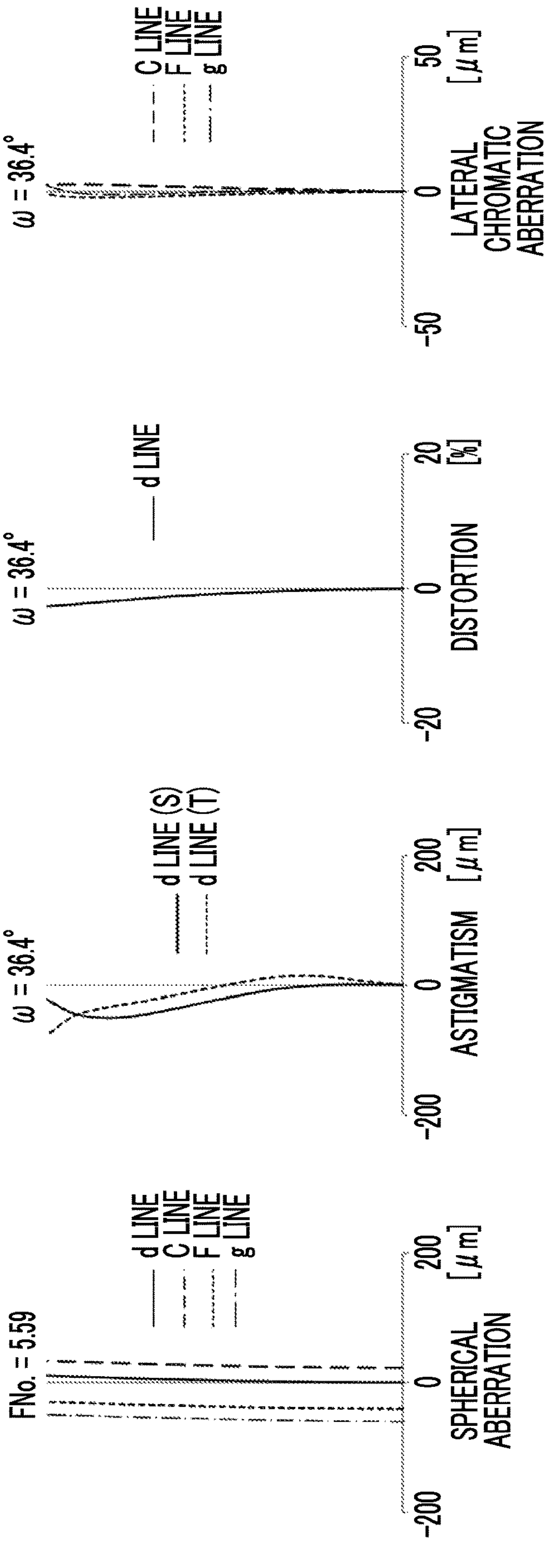
FIG. 7 is a diagram showing aberrations of the imaging lens according to Example 3.

Regarding the imaging lens according to Example 3, Table 6 shows basic lens data, Table 7 shows specification, and Table 8 shows aspherical coefficients thereof, and FIG. 7 shows aberration diagrams.

TABLE 6

| Example 3 | | | | | | |
|---|---|---|---|---|---|---|
| Sn | R | D | Nd | νd | θgF | dN/dT |
| *1 | 4.7561 | 0.9998 | 1.76450 | 49.10 | 0.55289 | 7.5 |
| *2 | 2.3207 | 1.8517 | | | | |
| 3 | −21.5327 | 1.0098 | 1.43875 | 94.66 | 0.53402 | −6.5 |
| 4 | 8.8335 | 2.7316 | 2.00100 | 29.14 | 0.59974 | 4.5 |
| 5 | −19.5444 | 0.1000 | | | | |
| 6 | 6.4997 | 0.9998 | 1.51823 | 58.90 | 0.54567 | 0.8 |
| 7 | 4.3774 | 0.1682 | | | | |
| 8 | 11.8373 | 1.4966 | 2.00100 | 29.14 | 0.59974 | 4.5 |
| 9 | ∞ | 0.0998 | | | | |
| 10(St) | ∞ | 0.1000 | | | | |
| 11 | 48.0246 | 2.0085 | 1.77250 | 49.60 | 0.55212 | 4.7 |
| 12 | −6.5147 | 0.1000 | | | | |
| 13 | −27.3917 | 0.7498 | 1.95906 | 17.47 | 0.65993 | 4.3 |
| 14 | 7.1141 | 0.2484 | | | | |
| 15 | −48.9174 | 2.5882 | 1.69680 | 55.53 | 0.54341 | 4.2 |

TABLE 6-continued

| Example 3 | | | | | | |
|---|---|---|---|---|---|---|
| Sn | R | D | Nd | νd | θgF | dN/dT |
| 16 | −4.0103 | 0.7501 | 1.89286 | 20.36 | 0.63944 | 1.3 |
| 17 | −7.3993 | 2.5791 | | | | |
| 18 | 12.7892 | 2.5839 | 1.95906 | 17.47 | 0.65993 | 4.3 |
| 19 | −194.3602 | 1.0000 | | | | |
| 20 | ∞ | 1.0000 | 1.51633 | 64.14 | 0.53531 | 2.8 |
| 21 | ∞ | 2.3645 | | | | |

TABLE 7

| Example 3 | |
|---|---|
| f | 6.26 |
| Bf | 4.02 |
| FNo. | 5.59 |
| 2ω[°] | 72.8 |

TABLE 8

| Example3 | | |
|---|---|---|
| Sn | 1 | 2 |
| KA | 0.0000000E+00 | 0.0000000E+00 |
| A3 | −4.0012438E−17 | −2.5721647E−16 |
| A4 | −1.4063586E−03 | 2.4985704E−03 |
| A5 | 9.2715249E−05 | −2.4813024E−04 |
| A6 | −2.2715378E−05 | 1.1655798E−04 |
| A7 | 2.1194175E−06 | −9.2038915E−06 |
| A8 | 3.6953823E−07 | −1.4430699E−06 |
| A9 | −7.6548683E−09 | 5.0026340E−08 |
| A10 | −2.5802761E−09 | 8.9459093E−09 |
| A11 | 2.0559507E−11 | −1.8789823E−10 |
| A12 | 1.0147976E−11 | −3.2810252E−11 |
| A13 | −3.3954051E−14 | 4.3855529E−13 |
| A14 | −2.3904321E−14 | 7.3935876E−14 |
| A15 | 2.9702714E−17 | −6.0734311E−16 |
| A16 | 3.3456716E−17 | −1.0053359E−16 |
| A17 | −9.1638706E−21 | 4.5061310E−19 |
| A18 | −2.5669637E−20 | 7.5719655E−20 |
| A19 | −1.6949606E−24 | −1.3741597E−22 |
| A20 | 8.3162598E−24 | −2.4268766E−23 |

Example 4

Figure 8:
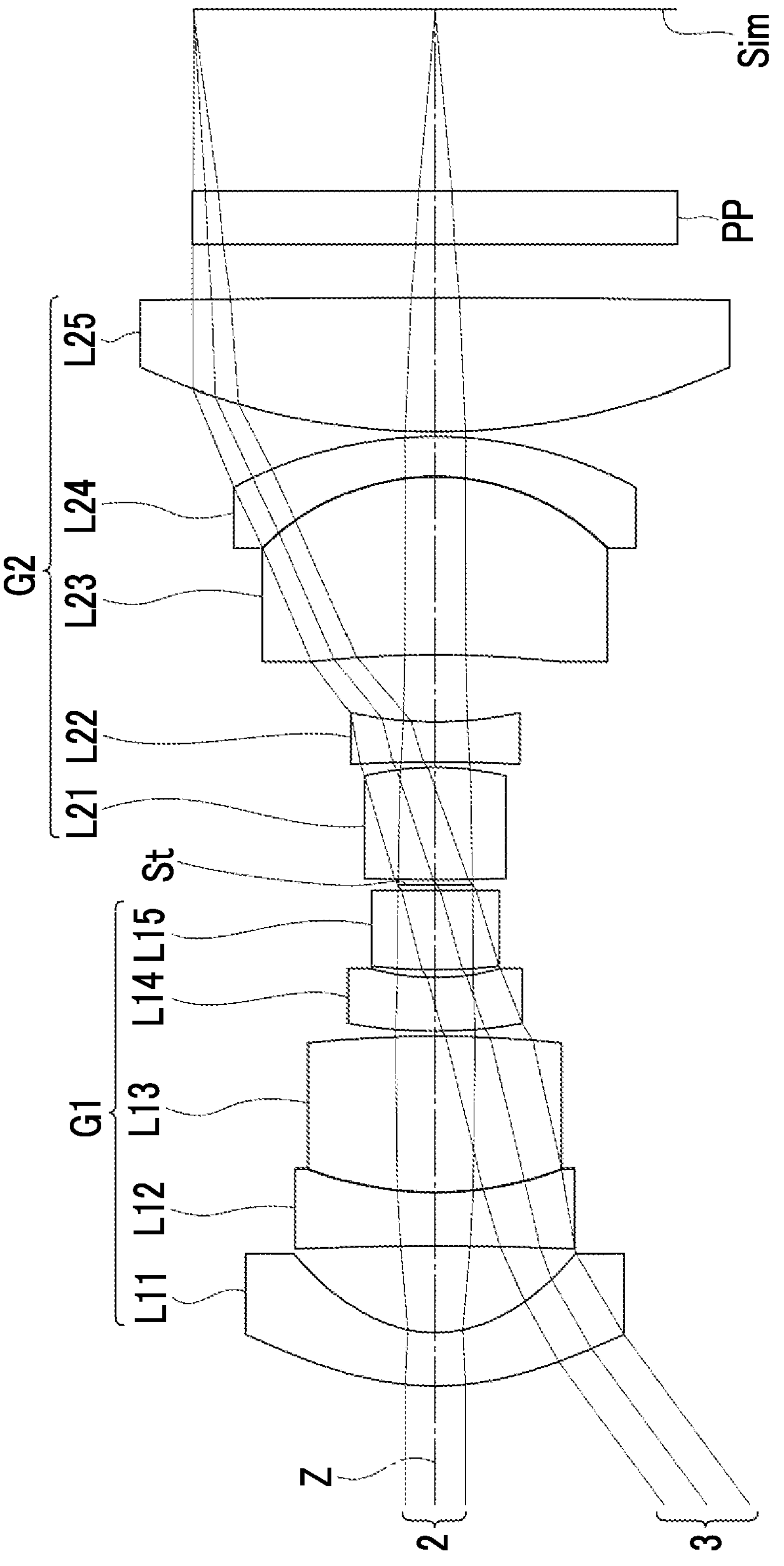
FIG. 8 is a cross-sectional view showing a configuration and luminous flux of an imaging lens according to Example 4.

FIG. 8 shows a cross-sectional view of a configuration and luminous flux of the imaging lens according to Example 4. The imaging lens according to Example 4 consists of, in order from the object side to the image side, a first lens group G1 that has a positive refractive power, an aperture stop St, and a second lens group G2 that has a positive refractive power. The first lens group G1 consists of five lenses L11 to L15, in order from the object side to the image side. The second lens group G2 consists of five lenses L21 to L25, in order from the object side to the image side.

Figure 9:
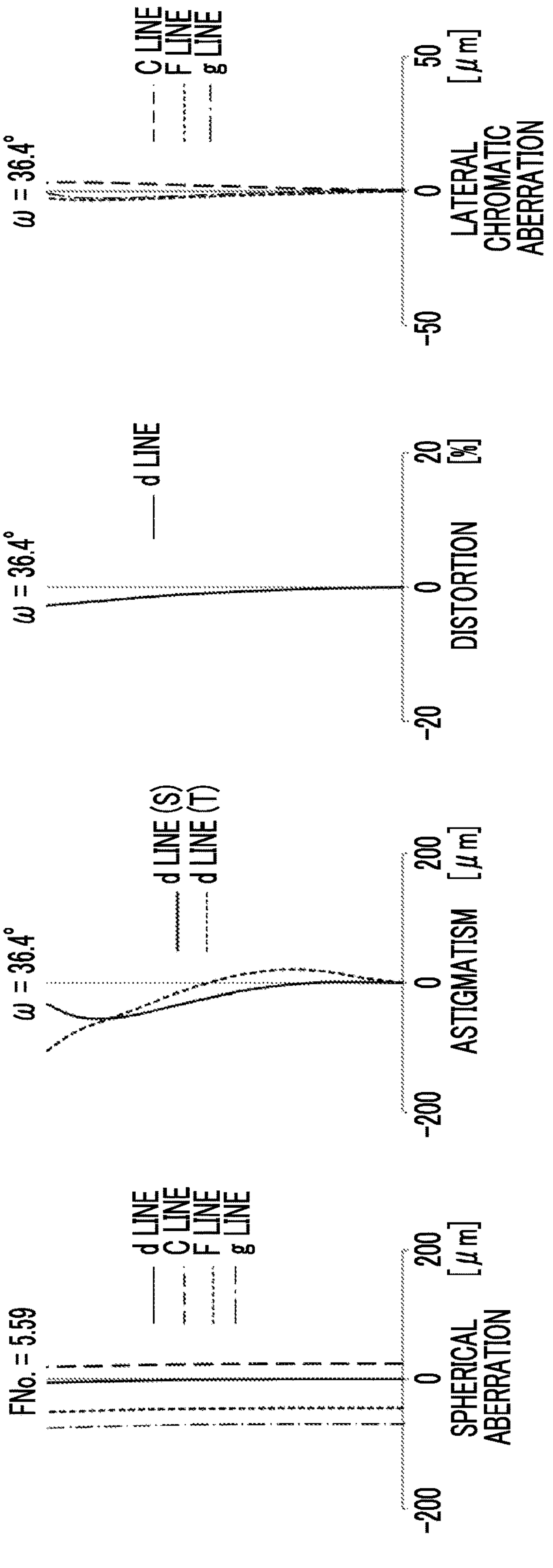
FIG. 9 is a diagram showing aberrations of the imaging lens according to Example 4.

Regarding the imaging lens according to Example 4, Table 9 shows basic lens data, Table 10 shows specification, and Table 11 shows aspherical coefficients thereof, and FIG. 9 shows aberration diagrams.

TABLE 9

| Example 4 | | | | | | |
|---|---|---|---|---|---|---|
| Sn | R | D | Nd | νd | θgF | dN/dT |
| *1 | 5.3435 | 1.0002 | 1.76450 | 49.10 | 0.55289 | 7.5 |
| *2 | 2.4686 | 1.6171 | | | | |
| 3 | −64.0782 | 1.0098 | 1.43875 | 94.66 | 0.53402 | −6.5 |
| 4 | 6.6035 | 2.8977 | 2.00100 | 29.14 | 0.59974 | 4.5 |
| 5 | −22.3682 | 0.0998 | | | | |
| 6 | 9.4359 | 0.9998 | 1.80518 | 25.42 | 0.61616 | 1.3 |
| 7 | 4.4564 | 0.1432 | | | | |
| 8 | 9.7304 | 1.4911 | 2.00100 | 29.14 | 0.59974 | 4.5 |
| 9 | ∞ | 0.0998 | | | | |
| 10(St) | ∞ | 0.0998 | | | | |
| 11 | 32.0987 | 2.1011 | 1.72916 | 54.68 | 0.54451 | 4 |
| 12 | −5.4526 | 0.1001 | | | | |
| 13 | −28.2581 | 0.7498 | 1.95906 | 17.47 | 0.65993 | 4.3 |
| 14 | 7.5389 | 1.2589 | | | | |
| 15 | −20.5644 | 3.3273 | 1.72916 | 54.68 | 0.54451 | 4 |
| 16 | −4.5441 | 0.7498 | 1.89286 | 20.36 | 0.63944 | 1.3 |
| 17 | −7.8724 | 0.1000 | | | | |
| 18 | 13.2951 | 2.4843 | 1.95906 | 17.47 | 0.65993 | 4.3 |
| 19 | −297.9213 | 1.0000 | | | | |
| 20 | ∞ | 1.0000 | 1.51633 | 64.14 | 0.53531 | 2.8 |
| 21 | ∞ | 3.3983 | | | | |

TABLE 10

| Example 4 | |
|---|---|
| f | 6.29 |
| Bf | 5.06 |
| FNo. | 5.59 |
| 2ω[°] | 72.8 |

TABLE 11

| Example 4 | | |
|---|---|---|
| Sn | 1 | 2 |
| KA | 0.0000000E+00 | 0.0000000E+00 |
| A3 | −2.7711167E−17 | −1.7195134E−16 |
| A4 | −1.3252968E−03 | 2.4700645E−03 |
| A5 | 2.9673563E−05 | −3.6667835E−04 |
| A6 | −1.7033513E−05 | 9.7408610E−05 |
| A7 | 2.1785158E−06 | −1.3180785E−05 |
| A8 | 3.1389094E−07 | −1.2208678E−06 |
| A9 | −9.0719392E−09 | 6.4068048E−08 |
| A10 | −2.2726979E−09 | 7.5889999E−09 |
| A11 | 2.7146075E−11 | −2.2482109E−10 |
| A12 | 9.1014580E−12 | −2.7815817E−11 |
| A13 | −5.2859070E−14 | 5.1151435E−13 |
| A14 | −2.1669838E−14 | 6.2565538E−14 |
| A15 | 6.0389928E−17 | −7.0293404E−16 |
| A16 | 3.0536131E−17 | −8.4868993E−17 |
| A17 | −3.5507619E−20 | 5.2368515E−19 |
| A18 | −2.3532564E−20 | 6.3759239E−20 |
| A19 | 7.6349263E−24 | −1.6098434E−22 |
| A20 | 7.6457313E−24 | −2.0387059E−23 |

Example 5

Figure 10:
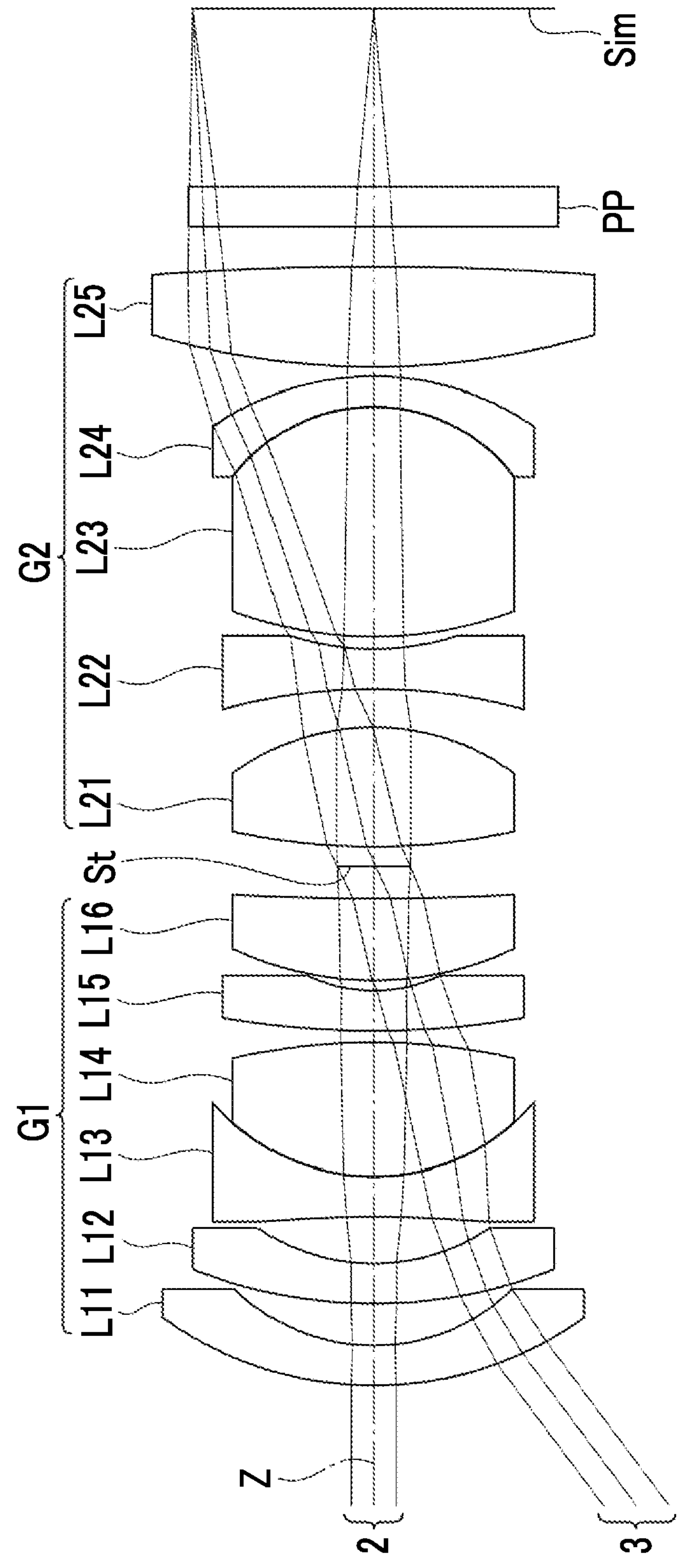
FIG. 10 is a cross-sectional view showing a configuration and luminous flux of an imaging lens according to Example 5.

FIG. 10 shows a cross-sectional view of a configuration and luminous flux of the imaging lens according to Example 5. The imaging lens according to Example 5 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 11:
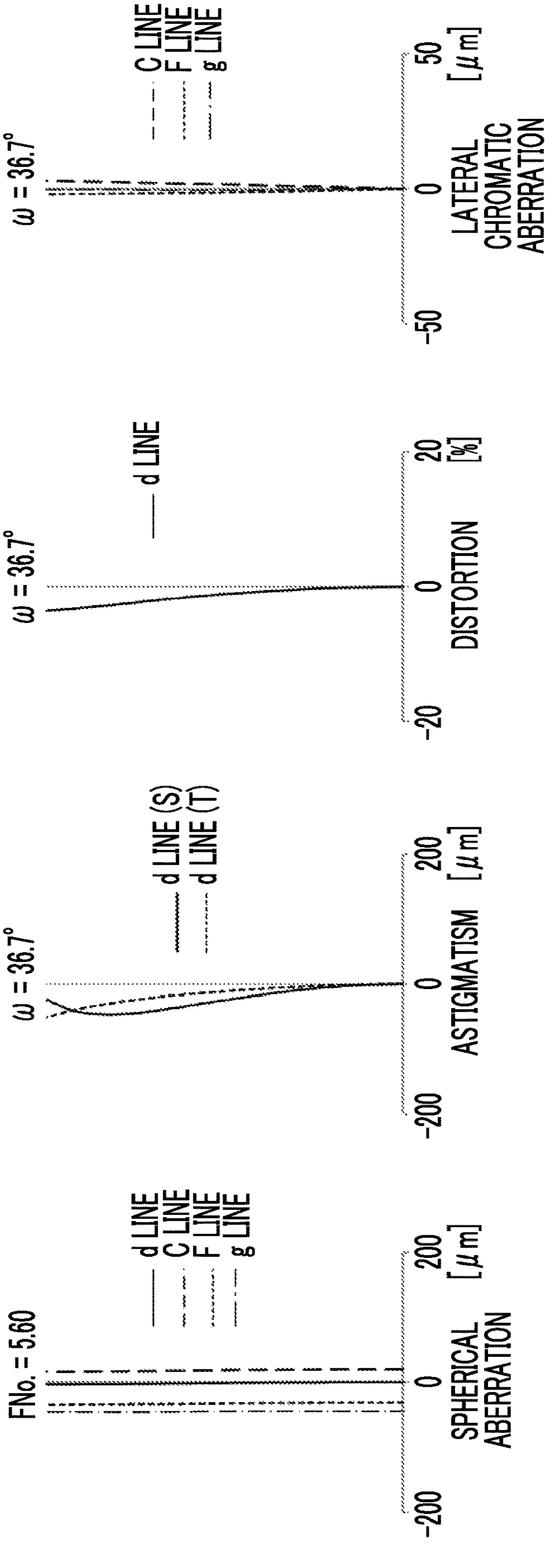
FIG. 11 is a diagram showing aberrations of the imaging lens according to Example 5.

Regarding the imaging lens according to Example 5, Table 12 shows basic lens data, Table 13 shows specifications, and FIG. 11 shows aberration diagrams.

TABLE 12

| Example 5 | | | | | | |
|---|---|---|---|---|---|---|
| Sn | R | D | Nd | νd | θgF | dN/dT |
| 1 | 8.9692 | 0.9998 | 1.84666 | 23.78 | 0.62054 | 1.5 |
| 2 | 4.9528 | 1.0469 | | | | |
| 3 | 12.2218 | 0.9998 | 1.83481 | 42.74 | 0.56490 | 5.1 |
| 4 | 5.1113 | 1.1612 | | | | |
| 5 | −33.9622 | 1.0102 | 1.49700 | 81.54 | 0.53748 | −6.4 |
| 6 | 5.2598 | 3.3392 | 1.89190 | 37.13 | 0.57813 | 5.3 |
| 7 | −15.6290 | 0.2901 | | | | |
| 8 | 22.0313 | 0.9999 | 1.69895 | 30.13 | 0.60298 | 3.7 |
| 9 | 3.8168 | 0.2557 | | | | |
| 10 | 8.0629 | 2.0573 | 1.89286 | 20.36 | 0.63944 | 1.3 |
| 11 | 66.7109 | 0.7931 | | | | |
| 12(St) | ∞ | 0.4999 | | | | |
| 13 | 16.2556 | 2.9857 | 1.80400 | 46.53 | 0.55775 | 4.5 |
| 14 | −5.8824 | 0.9611 | | | | |
| 15 | −13.8293 | 1.0000 | 1.85896 | 22.73 | 0.62844 | 2.1 |
| 16 | 6.7839 | 0.3092 | | | | |
| 17 | 9.9851 | 5.7409 | 1.49700 | 81.54 | 0.53748 | −6.4 |
| 18 | −4.3747 | 0.7502 | 1.89286 | 20.36 | 0.63944 | 1.3 |
| 19 | −7.0771 | 0.2327 | | | | |
| 20 | 19.2912 | 2.5013 | 1.95906 | 17.47 | 0.65993 | 4.3 |
| 21 | −75.3266 | 1.0000 | | | | |
| 22 | ∞ | 1.0000 | 1.51633 | 64.14 | 0.53531 | 2.8 |
| 23 | ∞ | 4.4554 | | | | |

TABLE 13

| Example 5 | |
|---|---|
| f | 6.26 |
| Bf | 6.11 |
| FNo. | 5.60 |
| 2ω[°] | 73.4 |

Example 6

Figure 12:
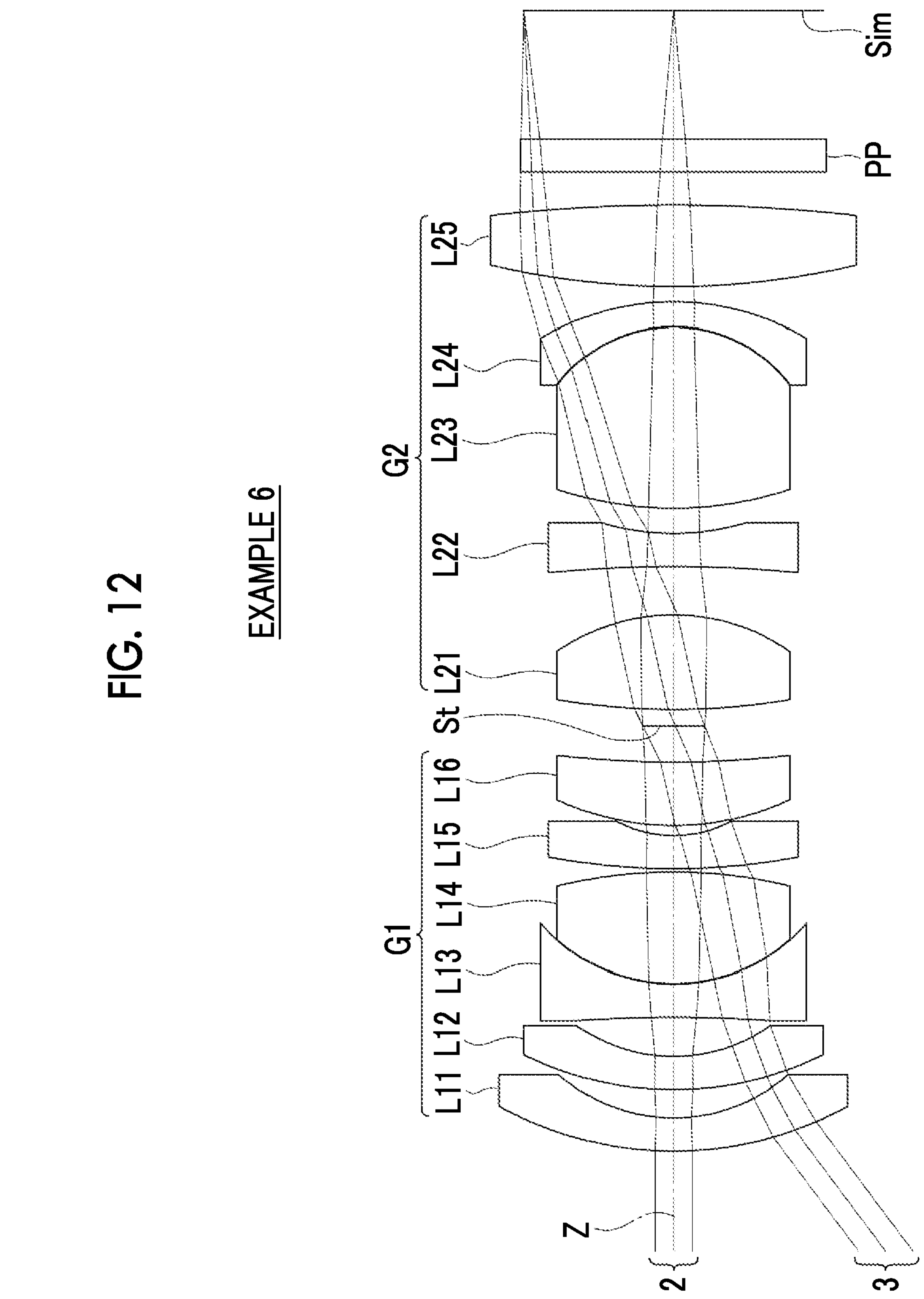
FIG. 12 is a cross-sectional view showing a configuration and luminous flux of an imaging lens according to Example 6.

FIG. 12 shows a cross-sectional view of a configuration and luminous flux of the imaging lens according to Example 6. The imaging lens according to Example 6 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 13:
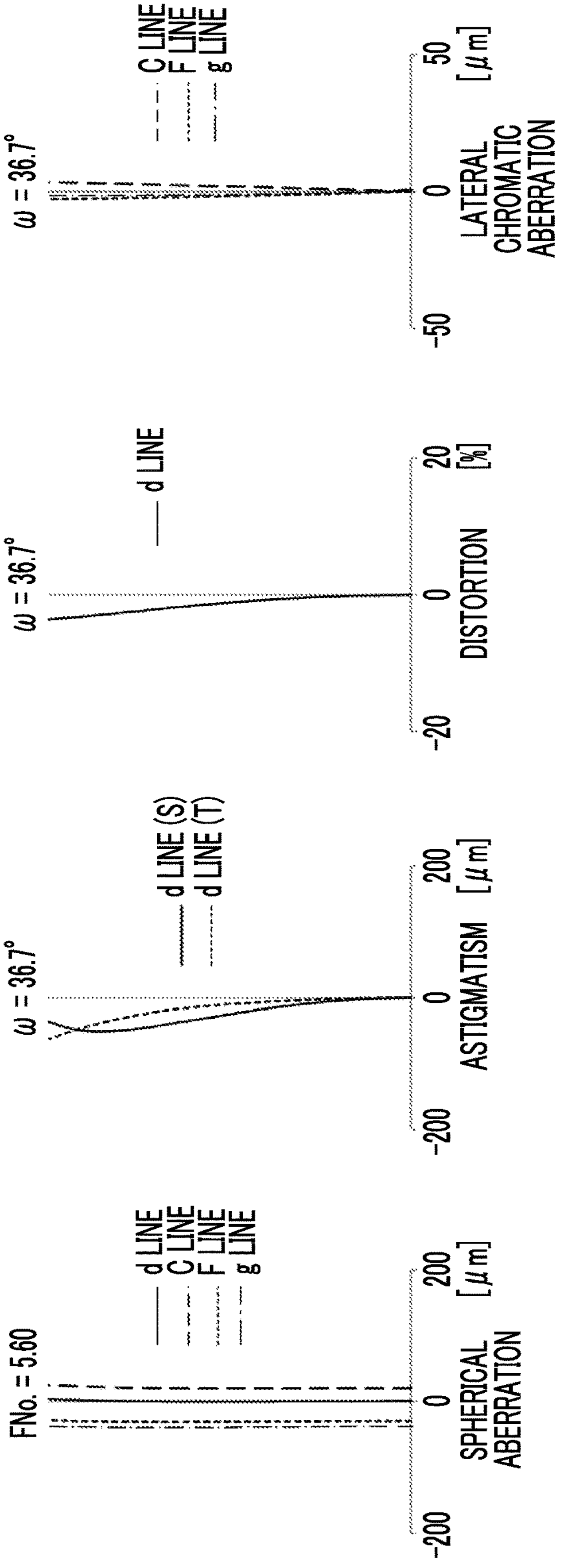
FIG. 13 is a diagram showing aberrations of the imaging lens according to Example 6.

Regarding the imaging lens according to Example 6, Table 14 shows basic lens data, Table 15 shows specifications, and FIG. 13 shows aberration diagrams.

TABLE 14

| Example 6 | | | | | | |
|---|---|---|---|---|---|---|
| Sn | R | D | Nd | νd | θgF | dN/dT |
| 1 | 10.8573 | 0.9998 | 1.84666 | 23.78 | 0.62054 | 1.5 |
| 2 | 5.1869 | 0.8581 | | | | |
| 3 | 10.1943 | 0.9998 | 1.83481 | 42.74 | 0.56490 | 5.1 |
| 4 | 5.0234 | 1.1790 | | | | |
| 5 | −40.6330 | 1.0102 | 1.49700 | 81.54 | 0.53748 | −6.4 |

TABLE 14-continued

| Example 6 | | | | | | |
|---|---|---|---|---|---|---|
| Sn | R | D | Nd | νd | θgF | dN/dT |
| 6 | 5.3251 | 3.3578 | 1.89190 | 37.13 | 0.57813 | 5.3 |
| 7 | −14.6356 | 0.0998 | | | | |
| 8 | 20.0768 | 0.9999 | 1.69895 | 30.13 | 0.60298 | 3.7 |
| 9 | 3.6793 | 0.3038 | | | | |
| 10 | 8.2921 | 1.9191 | 1.89286 | 20.36 | 0.63944 | 1.3 |
| 11 | 29.9238 | 1.0869 | | | | |
| 12(St) | ∞ | 0.4998 | | | | |
| 13 | 20.5518 | 2.8535 | 1.80400 | 46.53 | 0.55775 | 4.5 |
| 14 | −6.1019 | 1.4645 | | | | |
| 15 | −38.2796 | 0.9998 | 1.85896 | 22.73 | 0.62844 | 2.1 |
| 16 | 7.4766 | 0.7632 | | | | |
| 17 | 11.0670 | 5.4626 | 1.49700 | 81.54 | 0.53748 | −6.4 |
| 18 | −4.3750 | 0.7501 | 1.89286 | 20.36 | 0.63944 | 1.3 |
| 19 | −7.8773 | 0.4586 | | | | |
| 20 | 23.6538 | 2.4553 | 1.95906 | 17.47 | 0.65993 | 4.3 |
| 21 | −47.7742 | 1.0000 | | | | |
| 22 | ∞ | 1.0000 | 1.51633 | 64.14 | 0.53531 | 2.8 |
| 23 | ∞ | 3.8711 | | | | |

TABLE 15

| Example 6 | |
|---|---|
| f | 6.26 |
| Bf | 5.53 |
| FNo. | 5.60 |
| 2ω[°] | 73.4 |

Example 7

Figure 14:
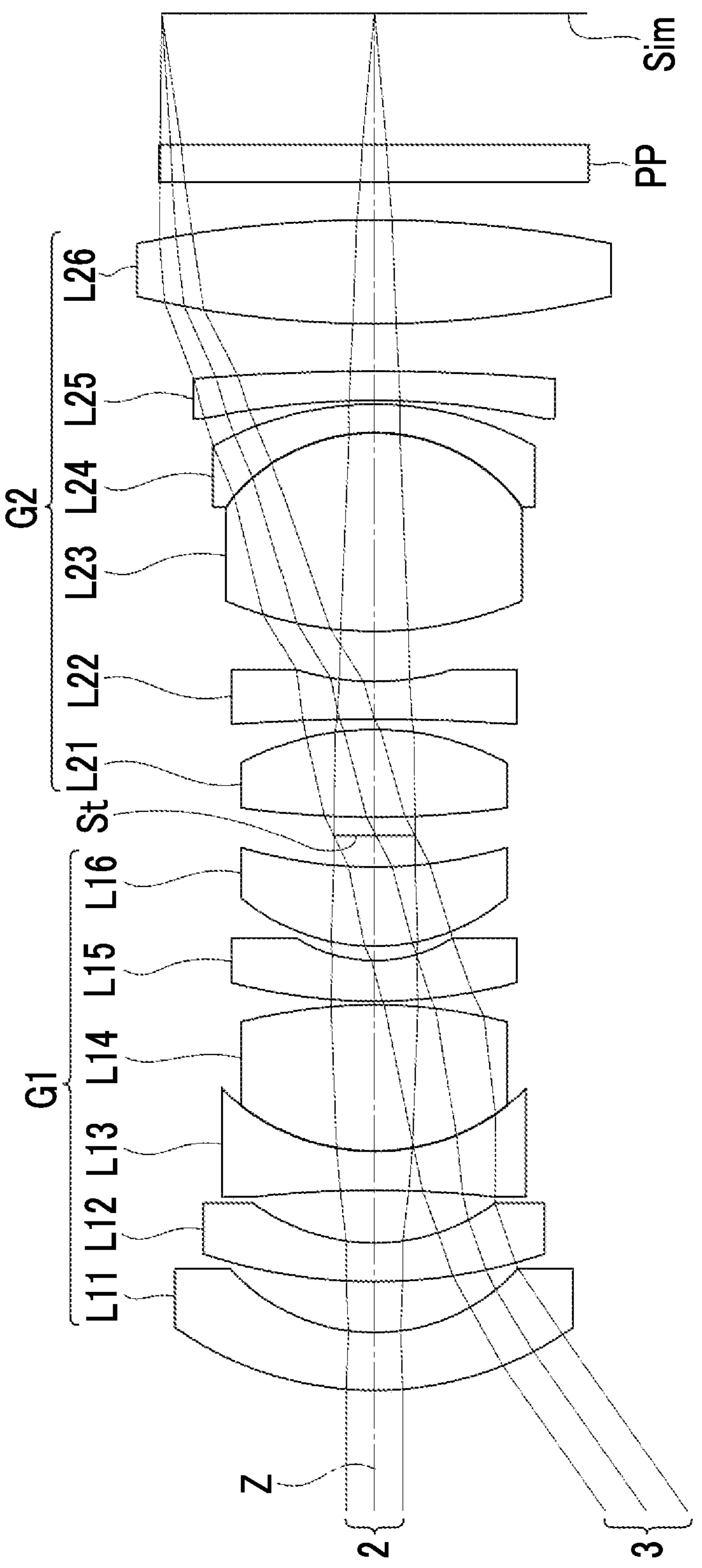
FIG. 14 is a cross-sectional view showing a configuration and luminous flux of an imaging lens according to Example 7.

FIG. 14 shows a cross-sectional view of a configuration and luminous flux of the imaging lens according to Example 7. The imaging lens according to Example 7 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of six lenses L21 to L26, in order from the object side to the image side.

Figure 15:
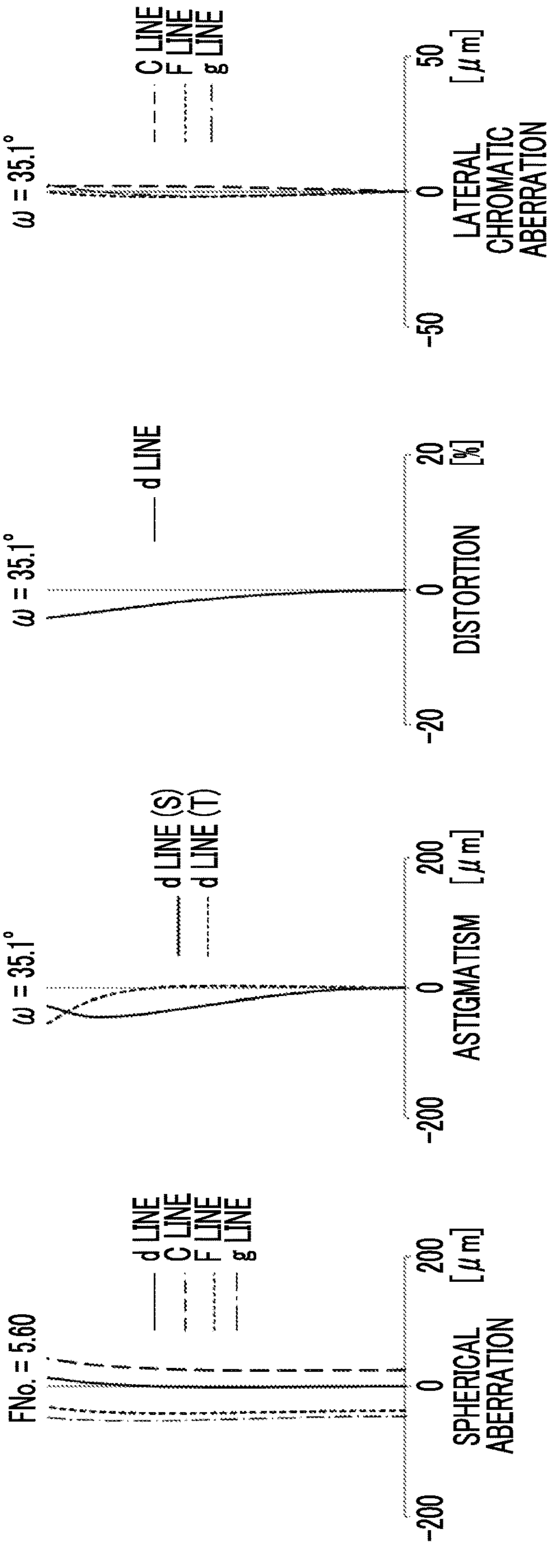
FIG. 15 is a diagram showing aberrations of the imaging lens according to Example 7.

Regarding the imaging lens according to Example 7, Table 16 shows basic lens data, Table 17 shows specifications, and FIG. 15 shows aberration diagrams.

TABLE 16

| Example 7 | | | | | | |
|---|---|---|---|---|---|---|
| Sn | R | D | Nd | νd | θgF | dN/dT |
| 1 | 9.1049 | 1.5282 | 1.80000 | 29.84 | 0.60178 | 4.4 |
| 2 | 5.0862 | 1.3486 | | | | |
| 3 | 14.2315 | 1.0216 | 1.85150 | 40.78 | 0.56958 | 5.4 |
| 4 | 5.3320 | 1.3911 | | | | |
| 5 | −28.9136 | 1.0102 | 1.53172 | 48.84 | 0.56309 | 1.9 |
| 6 | 5.6532 | 3.8739 | 1.89190 | 37.13 | 0.57813 | 5.3 |
| 7 | −13.8150 | 0.0999 | | | | |
| 8 | 14.7104 | 1.0726 | 1.54814 | 45.78 | 0.56859 | 1.8 |
| 9 | 3.8882 | 0.3796 | | | | |
| 10 | 5.4348 | 2.0933 | 1.89190 | 37.13 | 0.57813 | 5.3 |
| 11 | 12.0792 | 0.8291 | | | | |
| 12(St) | ∞ | 0.5002 | | | | |
| 13 | 25.1857 | 2.3148 | 1.75500 | 52.32 | 0.54757 | 4.3 |
| 14 | −7.3626 | 0.2712 | | | | |
| 15 | −52.0177 | 0.9998 | 1.78472 | 25.68 | 0.61621 | 1.7 |
| 16 | 7.1312 | 1.3234 | | | | |
| 17 | 9.8296 | 5.2600 | 1.43875 | 94.66 | 0.53402 | −6.5 |

TABLE 16-continued

| Example 7 | | | | | | |
|---|---|---|---|---|---|---|
| Sn | R | D | Nd | νd | θgF | dN/dT |
| 18 | −4.8512 | 0.7502 | 1.89286 | 20.36 | 0.63944 | 1.3 |
| 19 | −8.6635 | 0.0998 | | | | |
| 20 | −21.2181 | 0.7500 | 1.49700 | 81.54 | 0.53748 | −6.4 |
| 21 | −56.4302 | 1.2573 | | | | |
| 22 | 27.4346 | 2.7409 | 1.92286 | 18.90 | 0.64960 | 2.3 |
| 23 | −31.4612 | 1.0000 | | | | |
| 24 | ∞ | 1.0000 | 1.51633 | 64.14 | 0.53531 | 2.8 |
| 25 | ∞ | 3.4756 | | | | |

TABLE 17

| Example 7 | |
|---|---|
| f | 8.32 |
| Bf | 5.14 |
| FNo. | 5.60 |
| 2ω[°] | 70.2 |

Example 8

Figure 16:
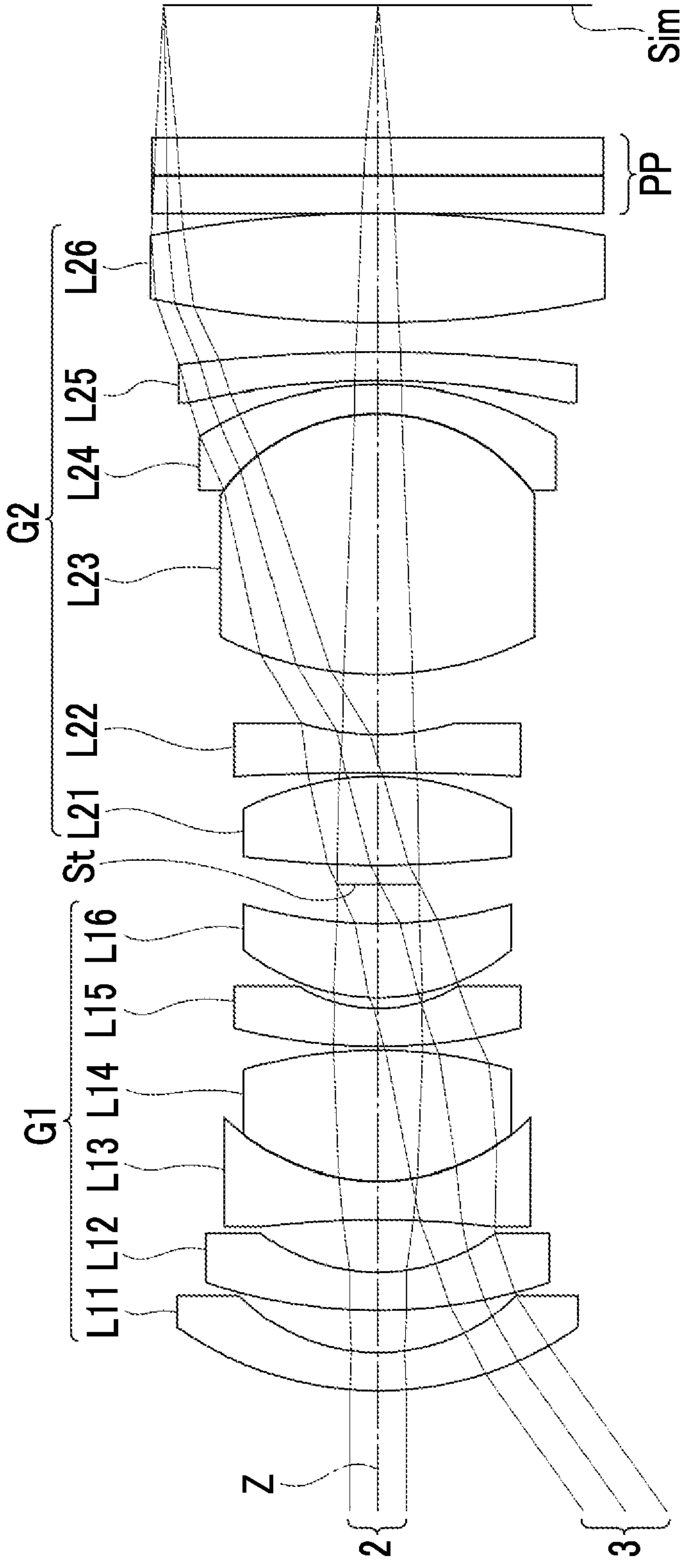
FIG. 16 is a cross-sectional view showing a configuration and luminous flux of an imaging lens according to Example 8.

FIG. 16 shows a cross-sectional view of a configuration and luminous flux of the imaging lens according to Example 8. The imaging lens according to Example 8 consists of, in order from the object side to the image side, a first lens group G1 that has a positive refractive power, an aperture stop St, and a second lens group G2 that has a positive refractive power. The first lens group G1 consists of six lenses L11 to L16 in order from the object side to the image side. The second lens group G2 consists of six lenses L21 to L26, in order from the object side to the image side.

Figure 17:
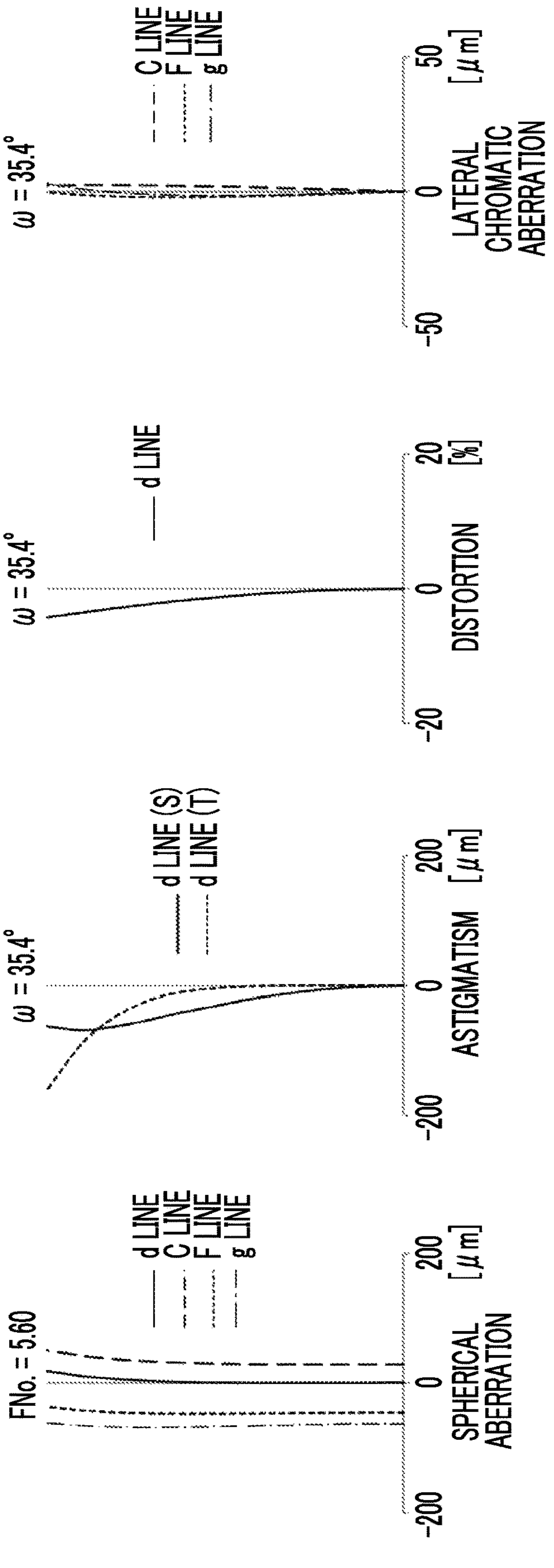
FIG. 17 is a diagram showing aberrations of the imaging lens according to Example 8.

Regarding the imaging lens according to Example 8, Table 18 shows basic lens data, Table 19 shows specifications, and FIG. 17 shows aberration diagrams.

TABLE 18

| Example 8 | | | | | | |
|---|---|---|---|---|---|---|
| Sn | R | D | Nd | νd | θgF | dN/dT |
| 1 | 9.0965 | 0.9998 | 1.85478 | 24.80 | 0.61232 | 4.4 |
| 2 | 5.1448 | 1.1153 | | | | |
| 3 | 14.1546 | 1.0002 | 1.85150 | 40.78 | 0.56958 | 5.4 |
| 4 | 5.1248 | 1.3805 | | | | |
| 5 | −25.4822 | 1.0101 | 1.53172 | 48.84 | 0.56309 | 1.9 |
| 6 | 5.6775 | 3.4337 | 1.89190 | 37.13 | 0.57813 | 5.3 |
| 7 | −12.3436 | 0.0998 | | | | |
| 8 | 14.9133 | 0.9998 | 1.56732 | 42.82 | 0.57309 | 2.9 |
| 9 | 4.0452 | 0.2824 | | | | |
| 10 | 5.5021 | 1.9488 | 1.95375 | 32.32 | 0.59056 | 4.4 |
| 11 | 12.3319 | 1.0330 | | | | |
| 12(St) | ∞ | 0.4998 | | | | |
| 13 | 27.0512 | 2.3447 | 1.75500 | 52.32 | 0.54757 | 4.3 |
| 14 | −7.6511 | 0.1001 | | | | |
| 15 | −69.1813 | 1.0001 | 1.80518 | 25.42 | 0.61616 | 1.3 |
| 16 | 6.8786 | 1.5855 | | | | |
| 17 | 9.1019 | 6.8574 | 1.43875 | 94.66 | 0.53402 | −6.5 |
| 18 | −5.0449 | 0.7502 | 1.94595 | 17.98 | 0.65460 | 4.5 |
| 19 | −8.8673 | 0.1001 | | | | |
| 20 | −22.2572 | 0.7498 | 1.49700 | 81.54 | 0.53748 | −6.4 |
| 21 | −40.5002 | 0.7771 | | | | |
| 22 | 28.1326 | 2.8730 | 1.94595 | 17.98 | 0.65460 | 4.5 |
| 23 | −30.5728 | 0.0000 | | | | |
| 24 | ∞ | 1.0000 | 1.51633 | 64.14 | 0.53531 | 2.8 |
| 25 | ∞ | 1.0000 | 1.51633 | 64.14 | 0.53531 | 2.8 |
| 26 | ∞ | 3.4865 | | | | |

TABLE 19

| Example 8 | |
|---|---|
| f | 8.22 |
| Bf | 4.81 |
| FNo. | 5.60 |
| 2ω[°] | 70.8 |

Example 9

Figure 18:
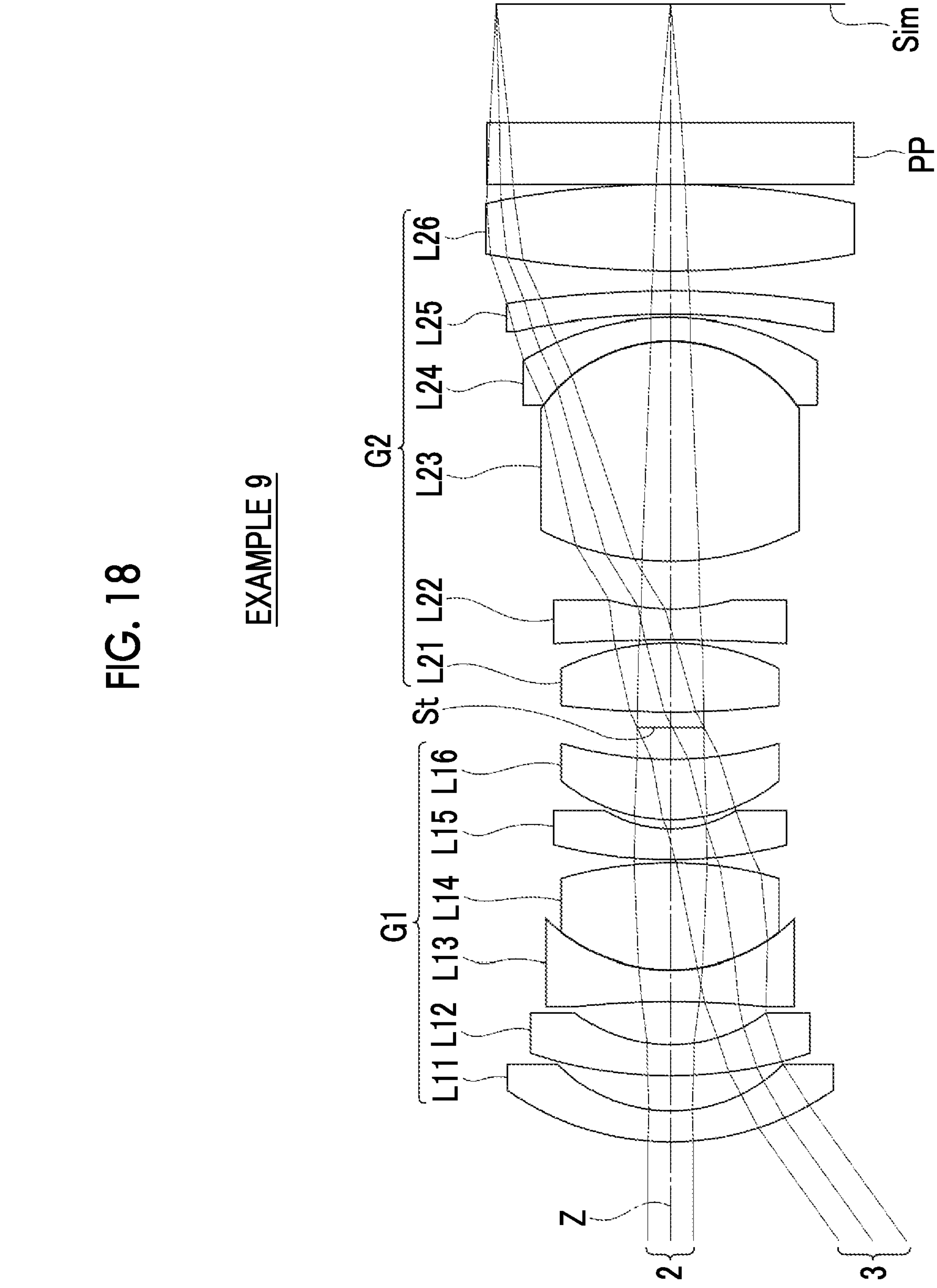
FIG. 18 is a cross-sectional view showing a configuration and luminous flux of an imaging lens according to Example 9.

FIG. 18 shows a cross-sectional view of a configuration and luminous flux of the imaging lens according to Example 9. The imaging lens according to Example 9 consists of, in order from the object side to the image side, a first lens group G1 that has a positive refractive power, an aperture stop St, and a second lens group G2 that has a positive refractive power. The first lens group G1 consists of six lenses L11 to L16 in order from the object side to the image side. The second lens group G2 consists of six lenses L21 to L26, in order from the object side to the image side.

Figure 19:
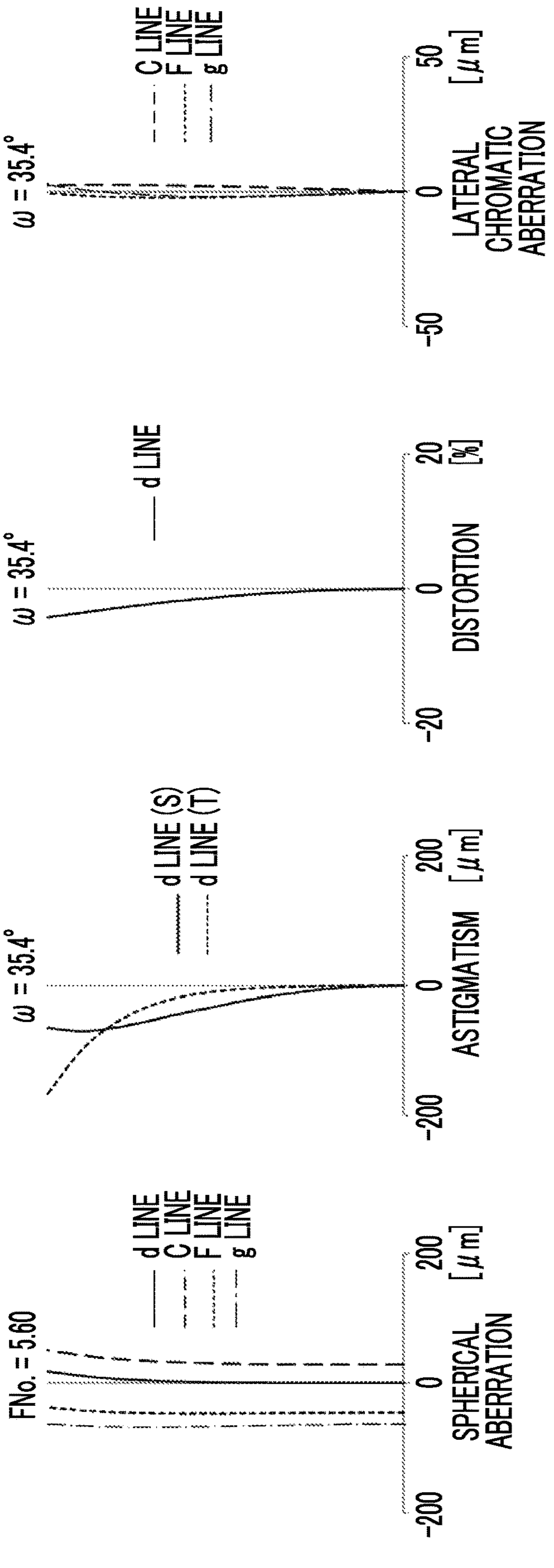
FIG. 19 is a diagram showing aberrations of the imaging lens according to Example 9.

Regarding the imaging lens according to Example 9, Table 20 shows basic lens data, Table 21 shows specifications, and FIG. 19 shows aberration diagrams.

TABLE 20

Example 9

| Sn | R | D | Nd | νd | θgF | dN/dT |
|---|---|---|---|---|---|---|
| 1 | 9.0998 | 0.9999 | 1.85478 | 24.80 | 0.61232 | 4.4 |
| 2 | 5.1326 | 1.1394 | | | | |
| 3 | 14.3241 | 1.0002 | 1.85150 | 40.78 | 0.56958 | 5.4 |
| 4 | 5.1176 | 1.3922 | | | | |
| 5 | −27.8278 | 1.0101 | 1.53172 | 48.84 | 0.56309 | 1.9 |
| 6 | 5.6606 | 3.4601 | 1.89190 | 37.13 | 0.57813 | 5.3 |
| 7 | −12.3368 | 0.0998 | | | | |
| 8 | 14.8803 | 0.9998 | 1.56732 | 42.82 | 0.57309 | 2.9 |
| 9 | 4.0891 | 0.2963 | | | | |
| 10 | 5.5237 | 1.9495 | 1.95375 | 32.32 | 0.59056 | 4.4 |
| 11 | 12.1670 | 1.0264 | | | | |
| 12(St) | ∞ | 0.4998 | | | | |
| 13 | 28.7989 | 2.2417 | 1.75500 | 52.32 | 0.54757 | 4.3 |
| 14 | −7.8263 | 0.1001 | | | | |
| 15 | −59.0524 | 1.0001 | 1.80518 | 25.42 | 0.61616 | 1.3 |
| 16 | 7.0041 | 1.5402 | | | | |
| 17 | 9.2035 | 7.1204 | 1.43875 | 94.66 | 0.53402 | −6.5 |
| 18 | −5.0594 | 0.7502 | 1.94595 | 17.98 | 0.65460 | 4.5 |
| 19 | −8.7848 | 0.1001 | | | | |
| 20 | −23.3588 | 0.7498 | 1.49700 | 81.54 | 0.53748 | −6.4 |
| 21 | −34.3122 | 0.6462 | | | | |
| 22 | 32.3761 | 2.7987 | 1.94595 | 17.98 | 0.65460 | 4.5 |
| 23 | −28.8505 | 0.0000 | | | | |
| 24 | ∞ | 2.0000 | 1.51633 | 64.14 | 0.53531 | 2.8 |
| 25 | ∞ | 3.8354 | | | | |

TABLE 21

| Example 9 | |
|---|---|
| f | 8.22 |
| Bf | 5.15 |
| FNo. | 5.60 |
| 2ω[°] | 70.8 |

Example 10

Figure 20:
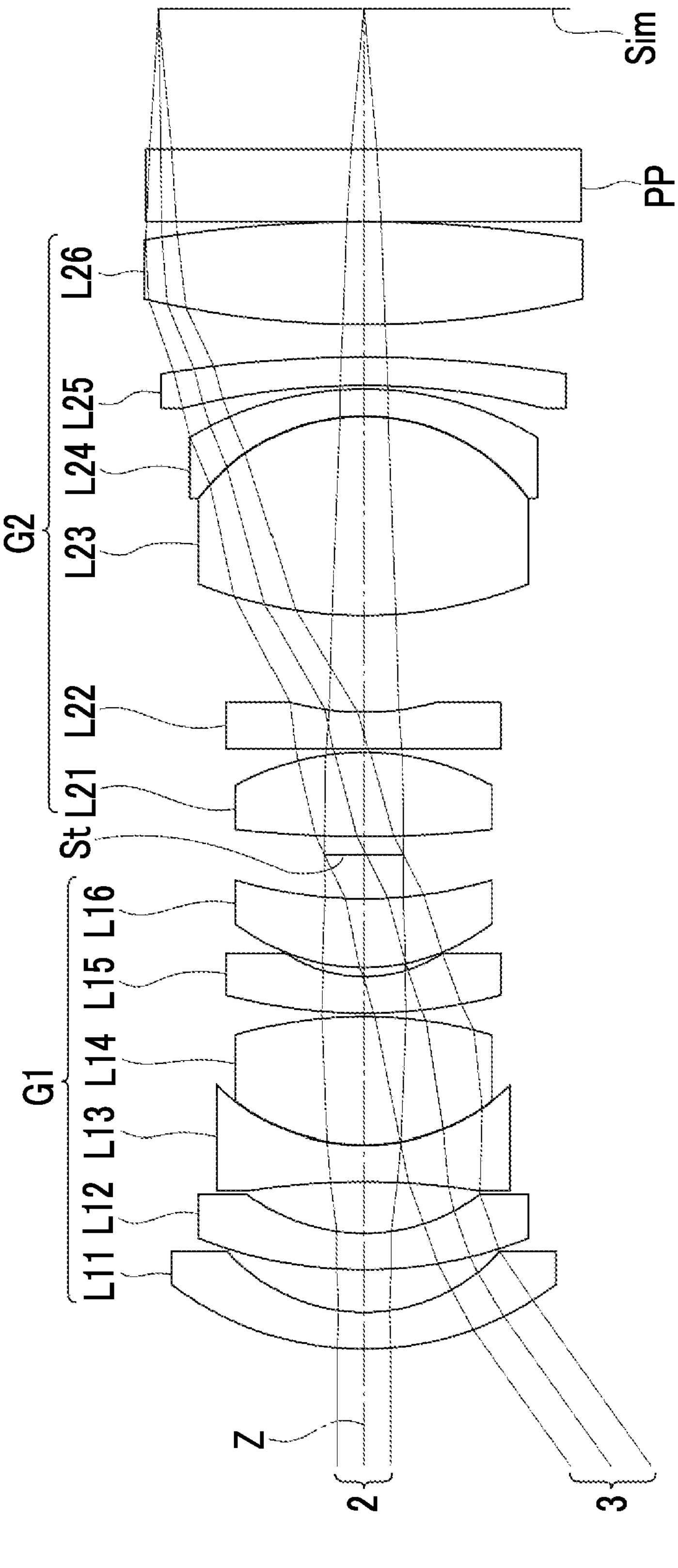
FIG. 20 is a cross-sectional view showing a configuration and luminous flux of an imaging lens according to Example 10.

FIG. 20 shows a cross-sectional view of a configuration and luminous flux of the imaging lens according to Example 10. The imaging lens according to Example 10 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of six lenses L21 to L26, in order from the object side to the image side.

Figure 21:
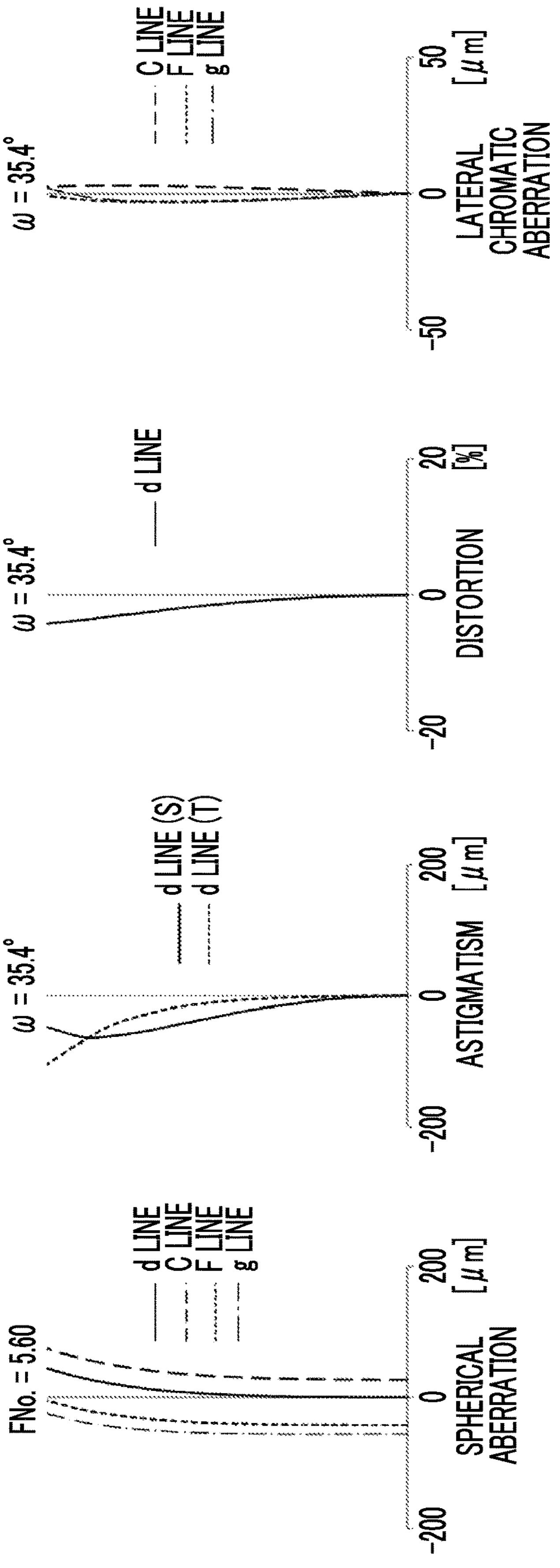
FIG. 21 is a diagram showing aberrations of the imaging lens according to Example 10.

Regarding the imaging lens according to Example 10, Table 22 shows basic lens data, Table 23 shows specifications, and FIG. 21 shows aberration diagrams.

TABLE 22

Example 10

| Sn | R | D | Nd | νd | θgF | dN/dT |
|---|---|---|---|---|---|---|
| 1 | 8.6720 | 1.0075 | 1.85478 | 24.80 | 0.61232 | 4.4 |
| 2 | 4.9567 | 1.1703 | | | | |
| 3 | 12.2517 | 1.0002 | 1.85150 | 40.78 | 0.56958 | 5.4 |
| 4 | 5.2603 | 1.4075 | | | | |
| 5 | −20.3539 | 1.0101 | 1.53172 | 48.84 | 0.56309 | 1.9 |
| 6 | 5.7458 | 3.5082 | 1.89190 | 37.13 | 0.57813 | 5.3 |
| 7 | −12.5565 | 0.0998 | | | | |
| 8 | 14.3596 | 0.9998 | 1.56732 | 42.82 | 0.57309 | 2.9 |
| 9 | 3.9194 | 0.2482 | | | | |
| 10 | 5.6596 | 1.8957 | 1.95375 | 32.32 | 0.59056 | 4.4 |
| 11 | 12.1285 | 1.2072 | | | | |
| 12(St) | ∞ | 0.4998 | | | | |
| 13 | 30.6099 | 2.3132 | 1.75500 | 52.32 | 0.54757 | 4.3 |
| 14 | −7.1680 | 0.1000 | | | | |
| 15 | ∞ | 1.0001 | 1.80518 | 25.42 | 0.61616 | 1.3 |
| 16 | 7.3768 | 2.6680 | | | | |
| 17 | 12.3007 | 5.4697 | 1.43875 | 94.66 | 0.53402 | −6.5 |
| 18 | −5.6242 | 0.7498 | 1.94595 | 17.98 | 0.65460 | 4.5 |
| 19 | −9.1013 | 0.0998 | | | | |
| 20 | −19.7792 | 0.7498 | 1.94595 | 17.98 | 0.65460 | 4.5 |
| 21 | −33.4034 | 0.8956 | | | | |
| 22 | 25.7206 | 2.8218 | 1.94595 | 17.98 | 0.65460 | 4.5 |
| 23 | −36.0906 | 0.0000 | | | | |
| 24 | ∞ | 2.0000 | 1.51633 | 64.14 | 0.53531 | 2.8 |
| 25 | ∞ | 3.8526 | | | | |

TABLE 23

| Example 10 | |
|---|---|
| f | 8.22 |
| Bf | 5.17 |
| FNo. | 5.60 |
| 2ω[°] | 70.8 |

Example 11

Figure 22:
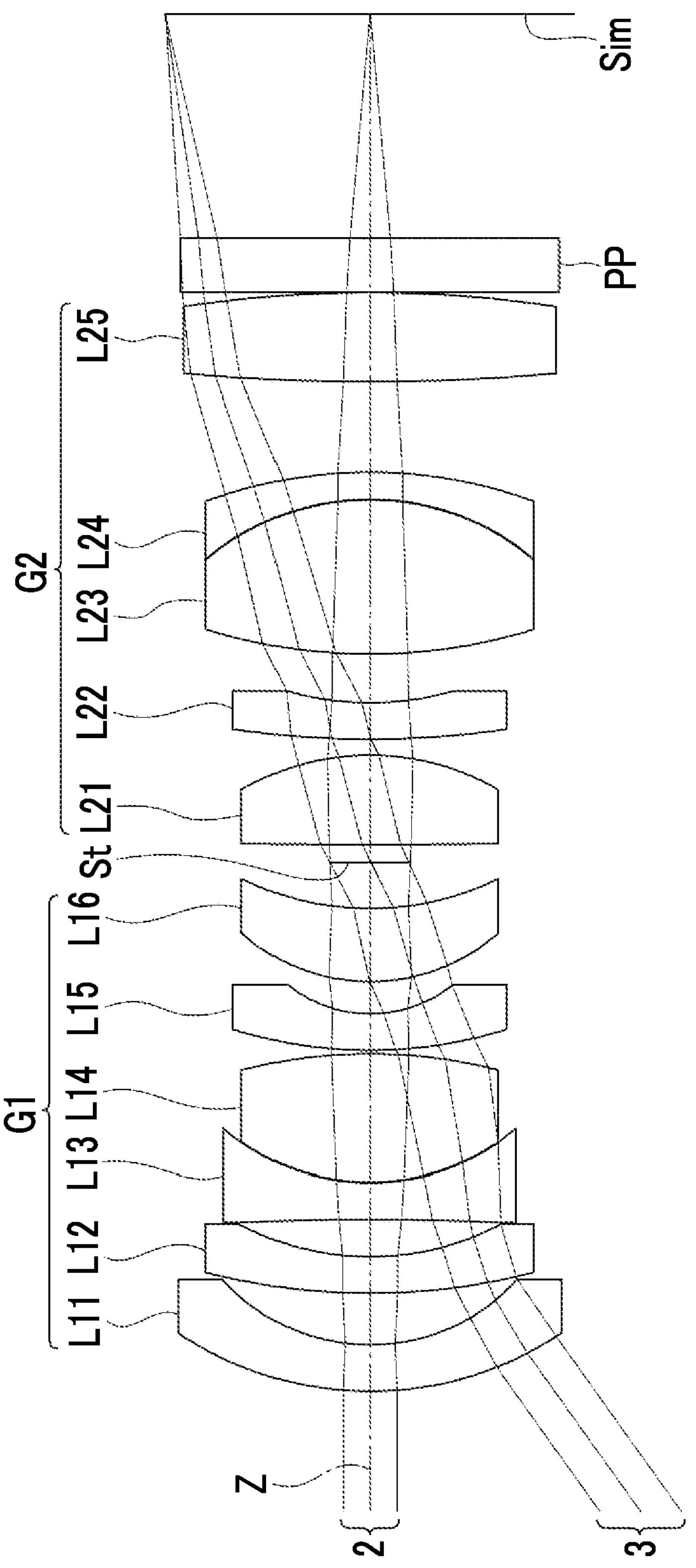
FIG. 22 is a cross-sectional view showing a configuration and luminous flux of an imaging lens according to Example 11.

FIG. 22 shows a cross-sectional view of a configuration and luminous flux of the imaging lens according to Example 11. The imaging lens according to Example 11 consists refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 23:
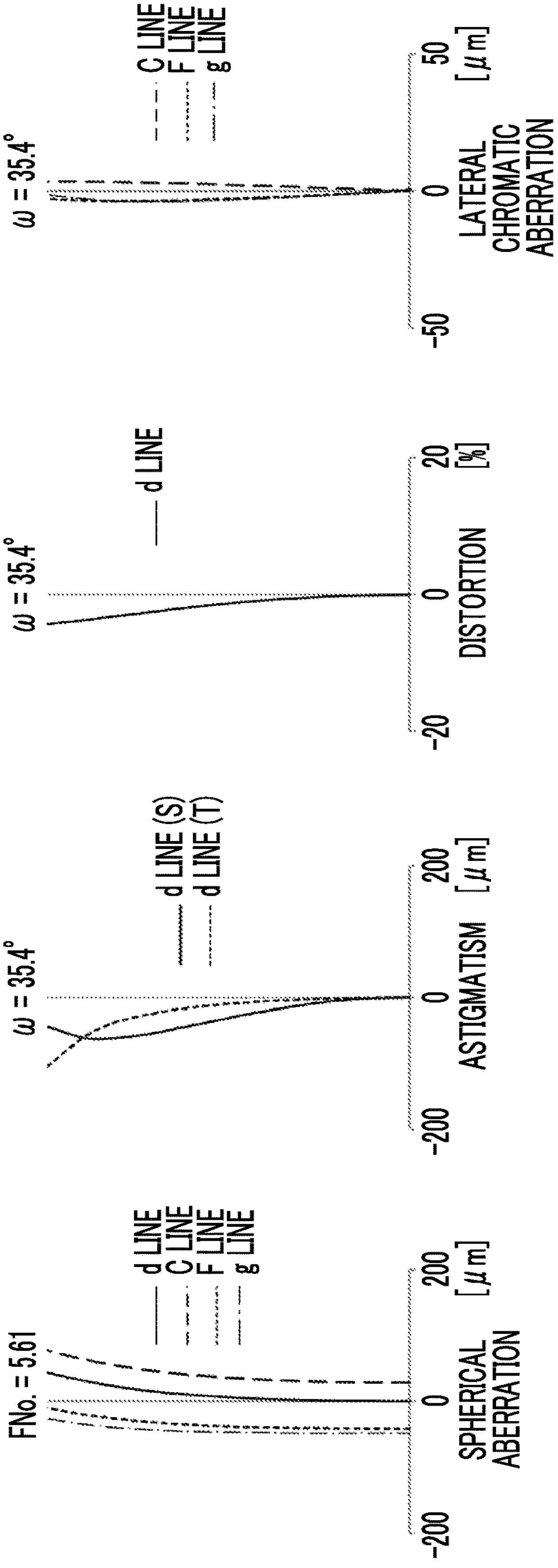
FIG. 23 is a diagram showing aberrations of the imaging lens according to Example 11.

Regarding the imaging lens according to Example 11, Table 24 shows basic lens data, Table 25 shows specifications, and FIG. 23 shows aberration diagrams.

TABLE 24

| Example 11 | | | | | | |
|---|---|---|---|---|---|---|
| Sn | R | D | Nd | νd | θgF | dN/dT |
| 1 | 9.4445 | 1.2741 | 1.95375 | 32.32 | 0.59056 | 4.4 |
| 2 | 5.4447 | 1.4197 | | | | |
| 3 | 17.9765 | 1.0000 | 1.95375 | 32.32 | 0.59056 | 4.4 |
| 4 | 7.5935 | 1.0201 | | | | |
| 5 | −76.7417 | 1.0098 | 1.59522 | 67.73 | 0.54426 | −6.1 |
| 6 | 6.1781 | 3.5243 | 1.85150 | 40.78 | 0.56958 | 5.4 |
| 7 | −14.2078 | 0.0999 | | | | |
| 8 | 12.5020 | 1.0002 | 1.49700 | 81.54 | 0.53748 | −6.4 |
| 9 | 3.6118 | 0.8849 | | | | |
| 10 | 5.2994 | 2.0074 | 1.85150 | 40.78 | 0.56958 | 5.4 |
| 11 | 7.9428 | 1.2550 | | | | |
| 12(St) | ∞ | 0.4998 | | | | |
| 13 | 232.0857 | 2.4626 | 1.72916 | 54.68 | 0.54451 | 4 |
| 14 | −7.0088 | 0.4415 | | | | |
| 15 | 25.7620 | 0.9998 | 1.80809 | 22.76 | 0.63073 | −0.1 |
| 16 | 8.1509 | 1.3376 | | | | |
| 17 | 15.2772 | 4.2508 | 1.49700 | 81.54 | 0.53748 | −6.4 |
| 18 | −6.9194 | 0.7498 | 1.89286 | 20.36 | 0.63944 | 1.3 |
| 19 | −13.0367 | 2.4647 | | | | |
| 20 | 58.1807 | 2.4449 | 1.89286 | 20.36 | 0.63944 | 1.3 |
| 21 | −33.9170 | 0.0000 | | | | |
| 22 | ∞ | 1.5000 | 1.51633 | 64.14 | 0.53531 | 2.8 |
| 23 | ∞ | 6.1598 | | | | |

TABLE 25

| Example 11 | |
|---|---|
| f | 8.23 |
| Bf | 7.15 |
| FNo. | 5.61 |
| 2ω[°] | 70.8 |

Example 12

Figure 24:
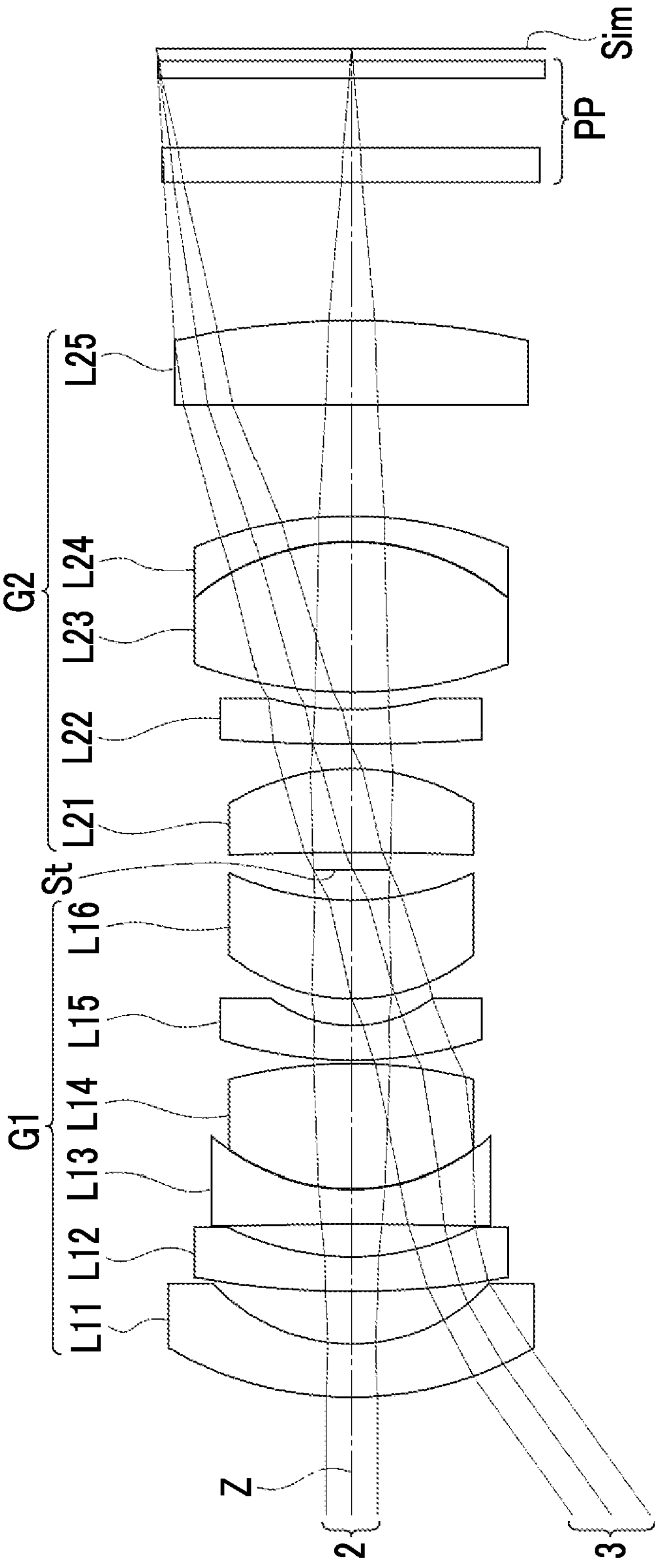
FIG. 24 is a cross-sectional view showing a configuration and luminous flux of an imaging lens according to Example 12.

FIG. 24 shows a cross-sectional view of a configuration and luminous flux of the imaging lens according to Example 12. The imaging lens according to Example 12 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 25:
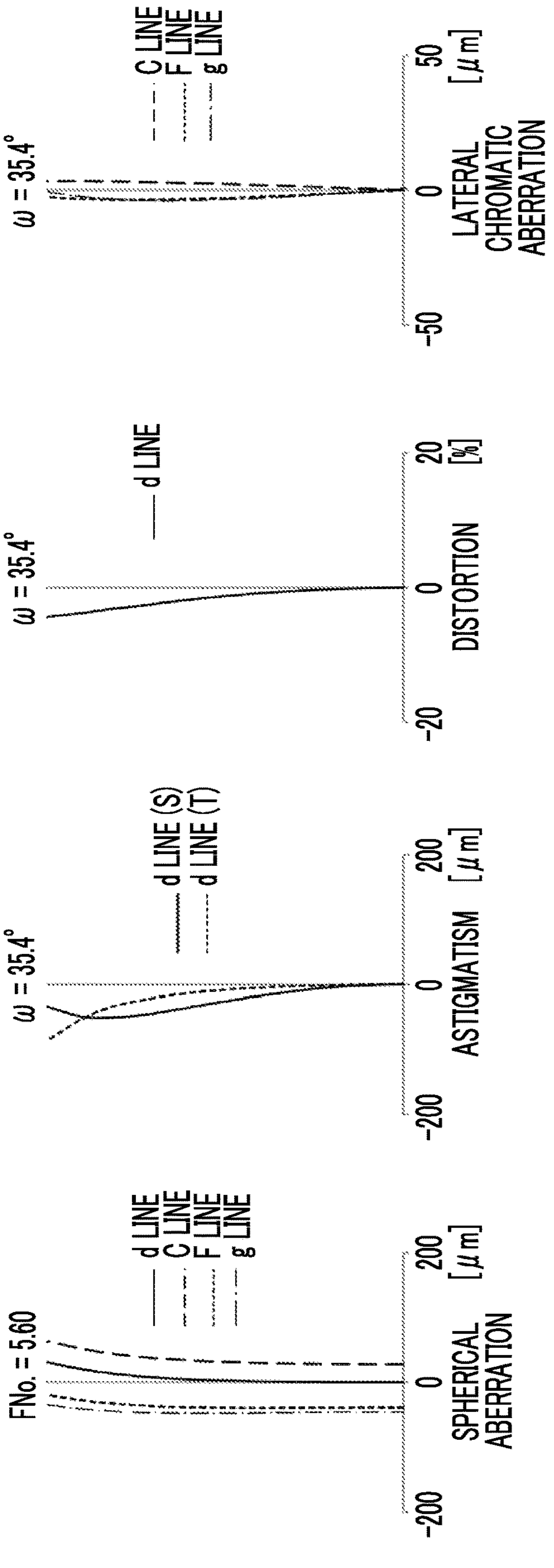
FIG. 25 is a diagram showing aberrations of the imaging lens according to Example 12.

Regarding the imaging lens according to Example 12, Table 26 shows basic lens data, Table 27 shows specifications, and FIG. 25 shows aberration diagrams.

TABLE 26

| Example 12 | | | | | | |
|---|---|---|---|---|---|---|
| Sn | R | D | Nd | νd | θgF | dN/dT |
| 1 | 10.4399 | 1.5357 | 1.90366 | 31.34 | 0.59636 | 5 |
| 2 | 5.3606 | 1.5166 | | | | |
| 3 | 25.0814 | 0.9998 | 1.83481 | 42.74 | 0.56490 | 5.1 |
| 4 | 7.8088 | 0.9351 | | | | |
| 5 | −128.6083 | 1.0098 | 1.59522 | 67.73 | 0.54426 | −6.1 |
| 6 | 6.0426 | 3.6101 | 1.83481 | 42.74 | 0.56490 | 5.1 |
| 7 | −13.7780 | 0.0998 | | | | |
| 8 | 12.1010 | 1.0000 | 1.49700 | 81.54 | 0.53748 | −6.4 |
| 9 | 3.8146 | 0.7700 | | | | |
| 10 | 5.4961 | 2.8446 | 1.80440 | 39.58 | 0.57623 | 1.6 |
| 11 | 8.1488 | 0.8771 | | | | |
| 12(St) | ∞ | 0.5001 | | | | |

TABLE 26-continued

| Example 12 | | | | | | |
|---|---|---|---|---|---|---|
| Sn | R | D | Nd | νd | θgF | dN/dT |
| 13 | −79.9994 | 2.4253 | 1.72916 | 54.68 | 0.54451 | 4 |
| 14 | −6.6111 | 0.7110 | | | | |
| 15 | 50.6792 | 0.9998 | 1.80809 | 22.76 | 0.63073 | −0.1 |
| 16 | 8.9499 | 0.5001 | | | | |
| 17 | 12.8929 | 4.3404 | 1.49700 | 81.54 | 0.53748 | −6.4 |
| 18 | −7.0602 | 0.7499 | 1.89286 | 20.36 | 0.63944 | 1.3 |
| 19 | −11.5877 | 3.2020 | | | | |
| 20 | ∞ | 2.4122 | 1.89286 | 20.36 | 0.63944 | 1.3 |
| 21 | −22.5663 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3552 | | | | |

TABLE 27

| Example 12 | |
|---|---|
| f | 8.23 |
| Bf | 7.34 |
| FNo. | 5.60 |
| 2ω[°] | 70.8 |

Example 13

Figure 26:
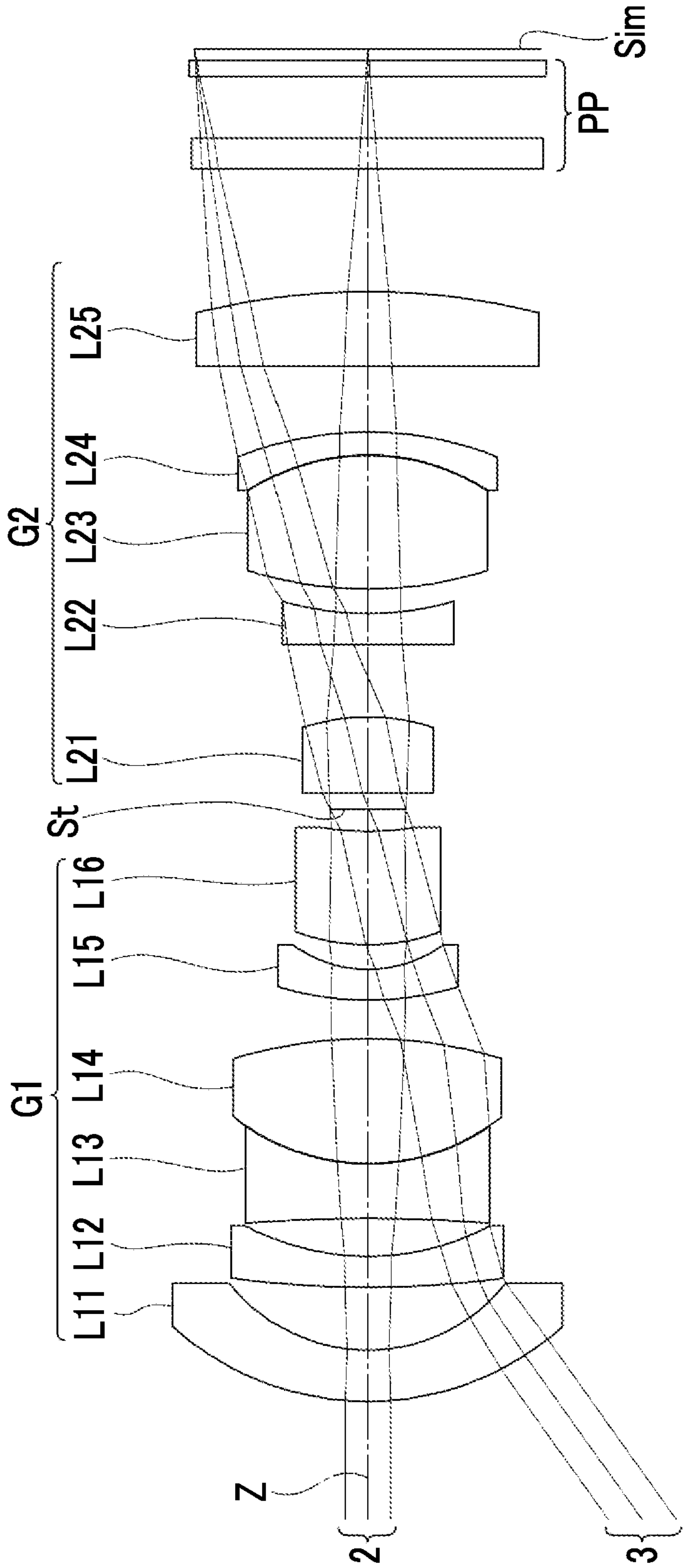
FIG. 26 is a cross-sectional view showing a configuration and luminous flux of an imaging lens according to Example 13.

FIG. 26 shows a cross-sectional view of a configuration and luminous flux of the imaging lens according to Example 13. The imaging lens according to Example 13 consists refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 27:
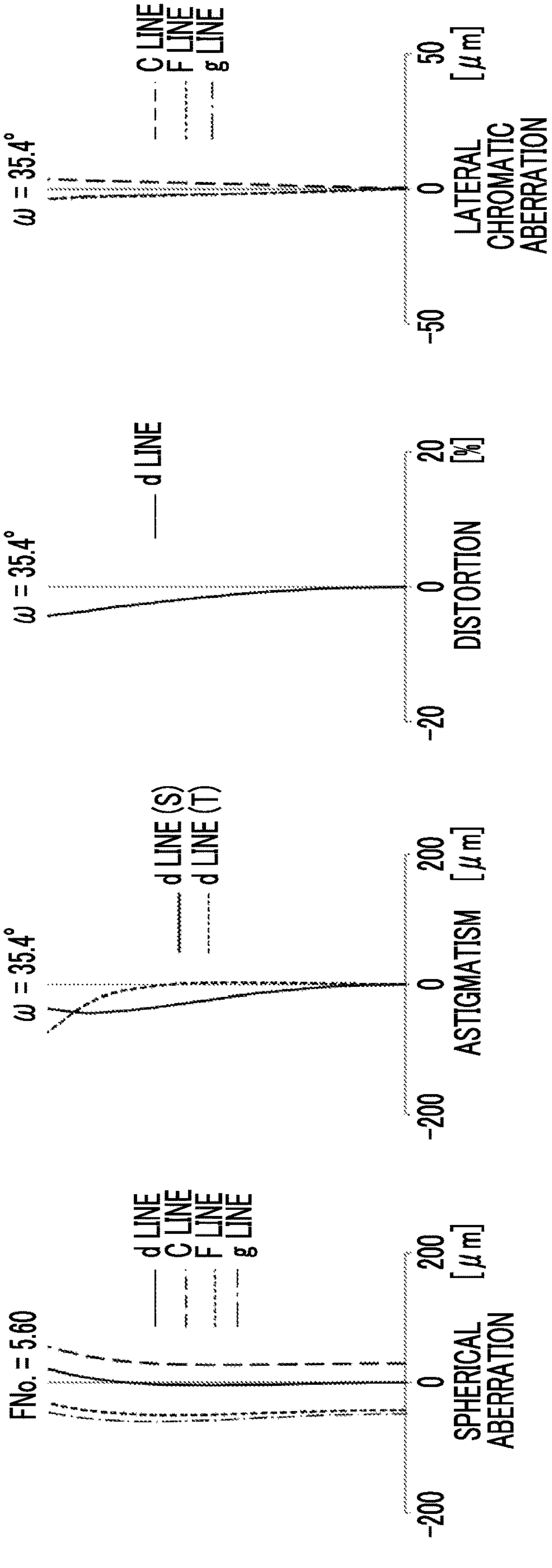
FIG. 27 is a diagram showing aberrations of the imaging lens according to Example 13.

Regarding the imaging lens according to Example 13, Table 28 shows basic lens data, Table 29 shows specifications, and FIG. 27 shows aberration diagrams.

TABLE 28

| Example 13 | | | | | | |
|---|---|---|---|---|---|---|
| Sn | R | D | Nd | νd | θgF | dN/dT |
| 1 | 9.4112 | 1.6644 | 1.89286 | 20.36 | 0.63944 | 1.3 |
| 2 | 5.6664 | 2.0420 | | | | |
| 3 | 33.4153 | 0.9999 | 1.90366 | 31.34 | 0.59636 | 5 |
| 4 | 8.3568 | 1.2281 | | | | |
| 5 | −51.5641 | 1.7450 | 1.61800 | 63.32 | 0.54271 | −0.7 |
| 6 | 6.8569 | 4.0666 | 1.80400 | 46.53 | 0.55775 | 4.5 |
| 7 | −14.6457 | 1.2485 | | | | |
| 8 | 9.9604 | 0.9998 | 1.49700 | 81.54 | 0.53748 | −6.4 |
| 9 | 4.1088 | 0.8001 | | | | |
| 10 | 6.7383 | 3.6900 | 1.71736 | 29.52 | 0.60483 | 2.8 |
| 11 | 9.3501 | 0.7297 | | | | |
| 12(St) | ∞ | 0.4998 | | | | |
| 13 | ∞ | 2.4780 | 1.75500 | 52.32 | 0.54757 | 4.3 |
| 14 | −6.7509 | 2.3537 | | | | |
| 15 | ∞ | 0.9998 | 1.80518 | 25.42 | 0.61616 | 1.3 |
| 16 | 9.7538 | 0.7998 | | | | |
| 17 | 12.8123 | 4.3490 | 1.49700 | 81.54 | 0.53748 | −6.4 |
| 18 | −7.0746 | 0.7498 | 1.80518 | 25.42 | 0.61616 | 1.3 |
| 19 | −11.2523 | 2.1126 | | | | |

TABLE 28-continued

| Example 13 | | | | | | |
|---|---|---|---|---|---|---|
| Sn | R | D | Nd | νd | θgF | dN/dT |
| 20 | ∞ | 2.4107 | 1.62041 | 60.29 | 0.54266 | 2 |
| 21 | −22.6096 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3786 | | | | |

TABLE 29

| Example 13 | |
|---|---|
| f | 8.22 |
| Bf | 7.37 |
| FNo. | 5.60 |
| 2ω[°] | 70.8 |

Example 14

Figure 28:
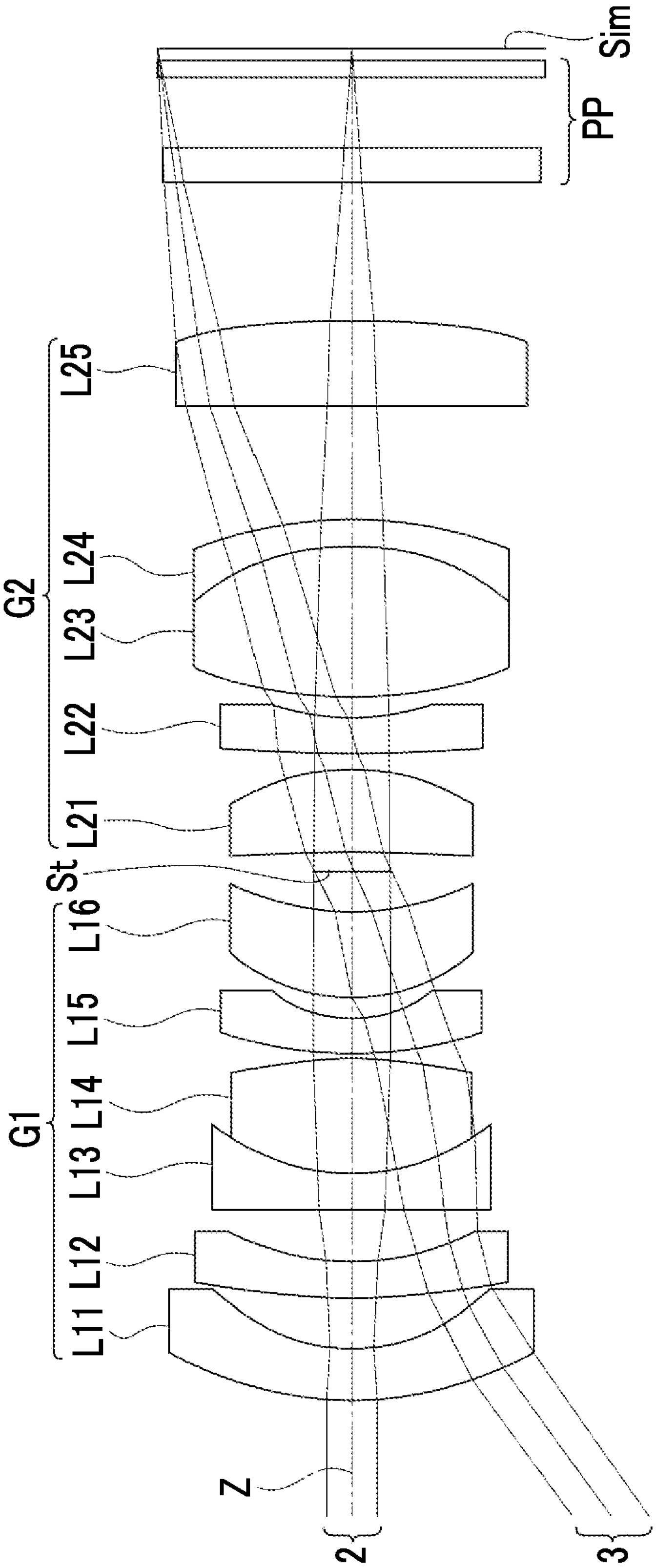
FIG. 28 is a cross-sectional view showing a configuration and luminous flux of an imaging lens according to Example 14.

FIG. 28 shows a cross-sectional view of a configuration and luminous flux of the imaging lens according to Example 14. The imaging lens according to Example 14 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 29:
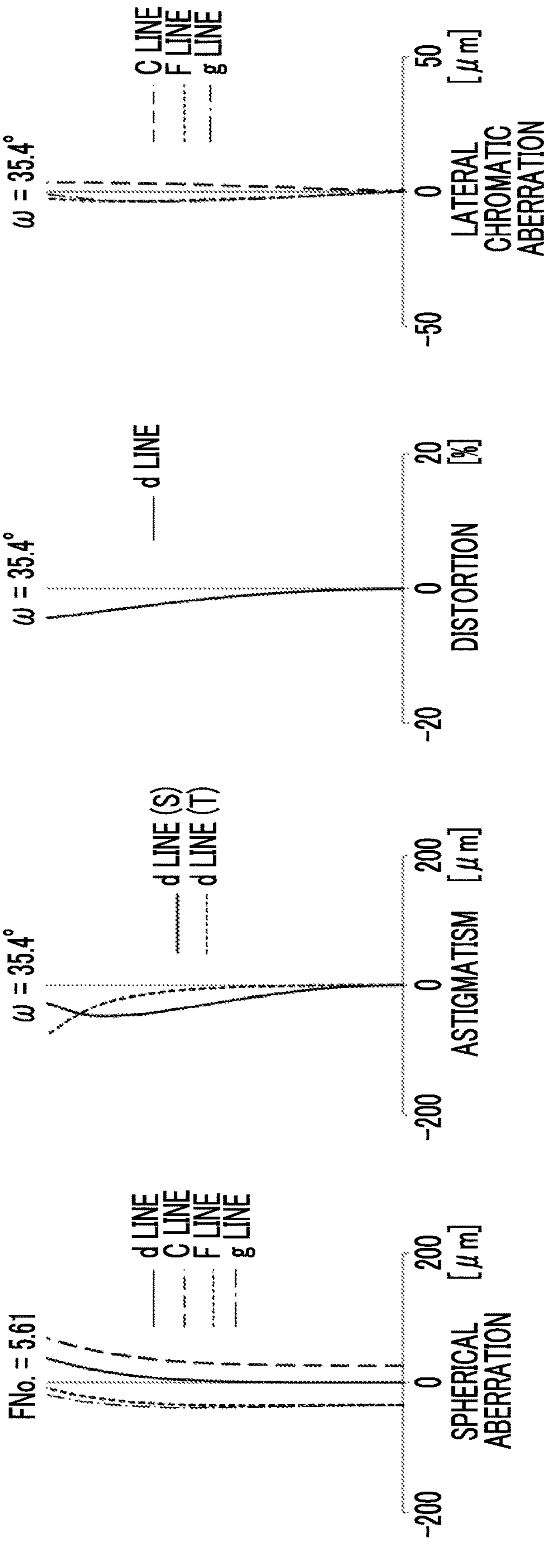
FIG. 29 is a diagram showing aberrations of the imaging lens according to Example 14.

Regarding the imaging lens according to Example 14, Table 30 shows basic lens data, Table 31 shows specifications, and FIG. 29 shows aberration diagrams.

TABLE 30

| Example 14 | | | | | | |
|---|---|---|---|---|---|---|
| Sn | R | D | Nd | νd | θgF | dN/dT |
| 1 | 10.6742 | 1.4669 | 1.90366 | 31.34 | 0.59636 | 5 |
| 2 | 5.4650 | 1.5178 | | | | |
| 3 | 26.3763 | 0.9998 | 1.83481 | 42.74 | 0.56490 | 5.1 |
| 4 | 7.9086 | 1.5039 | | | | |
| 5 | ∞ | 1.0098 | 1.59522 | 67.73 | 0.54426 | −6.1 |
| 6 | 6.4572 | 3.3806 | 1.83481 | 42.74 | 0.56490 | 5.1 |
| 7 | −13.3974 | 0.0999 | | | | |
| 8 | 12.1424 | 1.0000 | 1.49700 | 81.54 | 0.53748 | −6.4 |
| 9 | 3.7528 | 0.5855 | | | | |
| 10 | 5.3881 | 2.4982 | 1.80440 | 39.58 | 0.57623 | 1.6 |
| 11 | 8.3634 | 1.1612 | | | | |
| 12(St) | ∞ | 0.5001 | | | | |
| 13 | −79.9993 | 2.4335 | 1.72916 | 54.68 | 0.54451 | 4 |
| 14 | −6.5640 | 0.5263 | | | | |
| 15 | 64.7984 | 0.9998 | 1.80809 | 22.76 | 0.63073 | −0.1 |
| 16 | 8.4934 | 0.5936 | | | | |
| 17 | 13.1015 | 4.3313 | 1.49700 | 81.54 | 0.53748 | −6.4 |
| 18 | −7.0425 | 0.7498 | 1.89286 | 20.36 | 0.63944 | 1.3 |
| 19 | −11.7808 | 3.2973 | | | | |
| 20 | ∞ | 2.4311 | 1.89286 | 20.36 | 0.63944 | 1.3 |
| 21 | −22.0672 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3385 | | | | |

TABLE 31

| Example 14 | |
|---|---|
| f | 8.23 |
| Bf | 7.33 |
| FNo. | 5.61 |
| 2ω[°] | 70.8 |

Example 15

Figure 30:
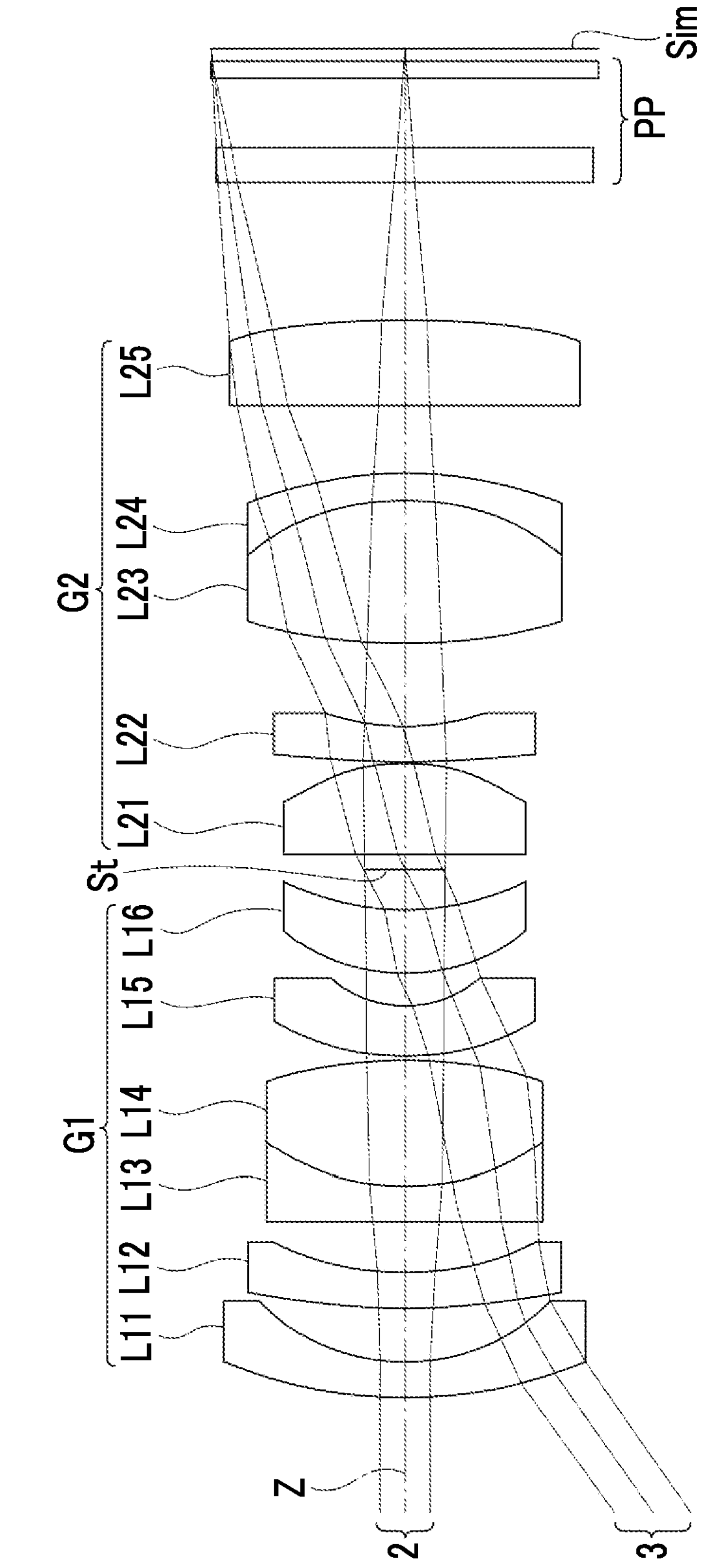
FIG. 30 is a cross-sectional view showing a configuration and luminous flux of an imaging lens according to Example 15.

FIG. 30 shows a cross-sectional view of a configuration and luminous flux of the imaging lens according to Example 15. The imaging lens according to Example 15 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 31:
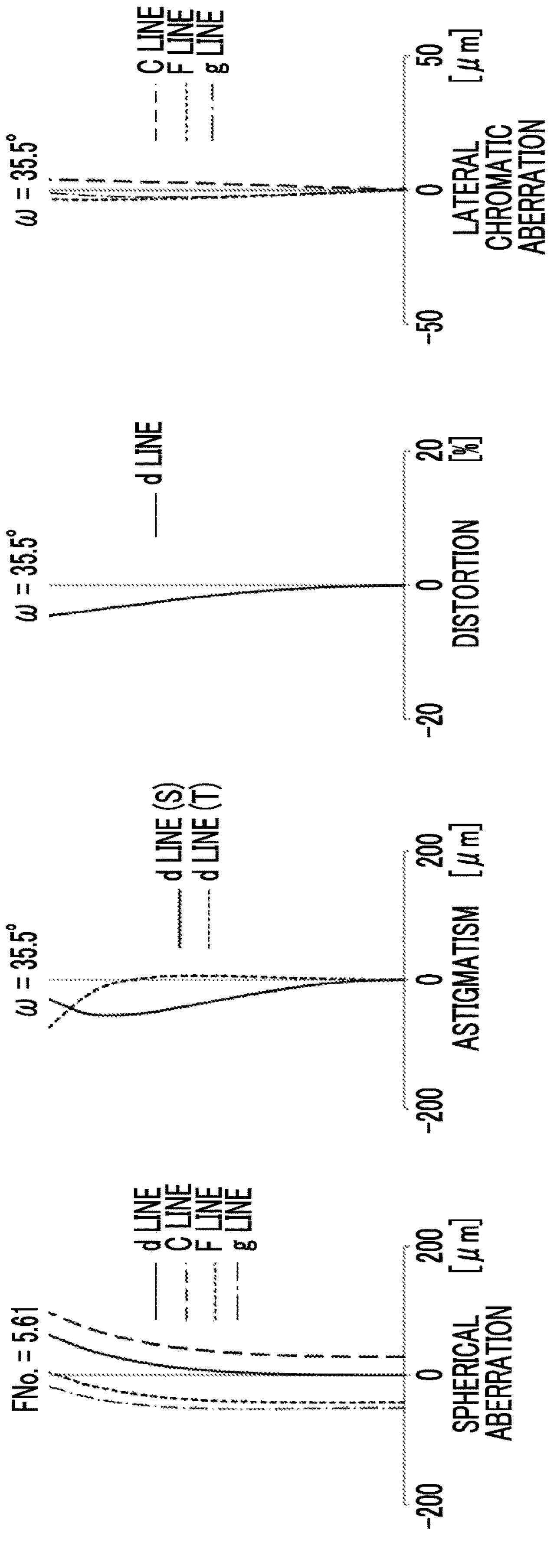
FIG. 31 is a diagram showing aberrations of the imaging lens according to Example 15.

Regarding the imaging lens according to Example 15, Table 32 shows basic lens data, Table 33 shows specifications, and FIG. 31 shows aberration diagrams.

TABLE 32

| Example 15 | | | | | | |
|---|---|---|---|---|---|---|
| Sn | R | D | Nd | νd | θgF | dN/dT |
| 1 | 14.3026 | 1.0001 | 1.80809 | 22.76 | 0.63073 | −0.1 |
| 2 | 5.9103 | 1.6293 | | | | |
| 3 | 26.4290 | 0.9998 | 1.79952 | 42.24 | 0.56758 | 10.3 |
| 4 | 9.4461 | 1.4202 | | | | |
| 5 | ∞ | 1.0098 | 1.61800 | 63.32 | 0.54271 | −0.7 |
| 6 | 6.9299 | 3.6557 | 1.83400 | 37.17 | 0.57866 | −0.1 |
| 7 | −13.6738 | 0.0998 | | | | |
| 8 | 7.2597 | 1.4739 | 1.52841 | 76.45 | 0.53954 | −6.1 |
| 9 | 3.3522 | 0.9424 | | | | |
| 10 | 5.8766 | 1.7905 | 1.83400 | 37.17 | 0.57866 | −0.1 |
| 11 | 7.7497 | 1.1185 | | | | |
| 12(St) | ∞ | 0.4998 | | | | |
| 13 | ∞ | 2.6295 | 1.69930 | 51.11 | 0.55523 | −1.2 |
| 14 | −5.8734 | 0.0998 | | | | |
| 15 | 33.6713 | 0.9998 | 1.80809 | 22.76 | 0.63073 | −0.1 |
| 16 | 7.9332 | 2.4041 | | | | |
| 17 | 16.1563 | 4.2077 | 1.49700 | 81.54 | 0.53748 | −6.4 |
| 18 | −6.7304 | 0.7498 | 1.85478 | 24.80 | 0.61232 | 4.4 |
| 19 | −12.0150 | 1.9916 | | | | |
| 20 | ∞ | 2.3550 | 1.67270 | 32.10 | 0.59891 | 3.1 |
| 21 | −23.6162 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3589 | | | | |

TABLE 33

| Example 15 | |
|---|---|
| f | 8.23 |
| Bf | 7.35 |
| FNo. | 5.61 |
| 2ω[°] | 71.0 |

Example 16

Figure 32:
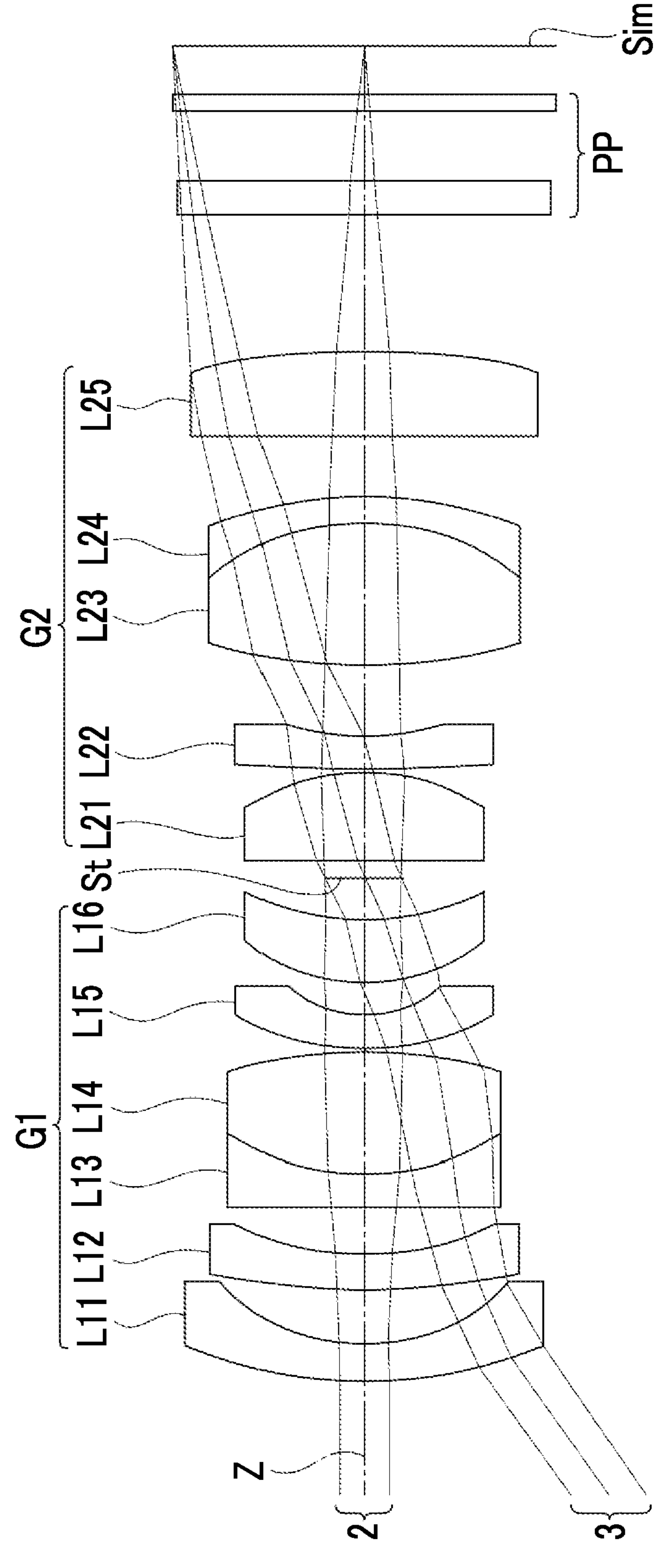
FIG. 32 is a cross-sectional view showing a configuration and luminous flux of an imaging lens according to Example 16.

FIG. 32 shows a cross-sectional view of a configuration and luminous flux of the imaging lens according to Example 16. The imaging lens according to Example 16 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 33:
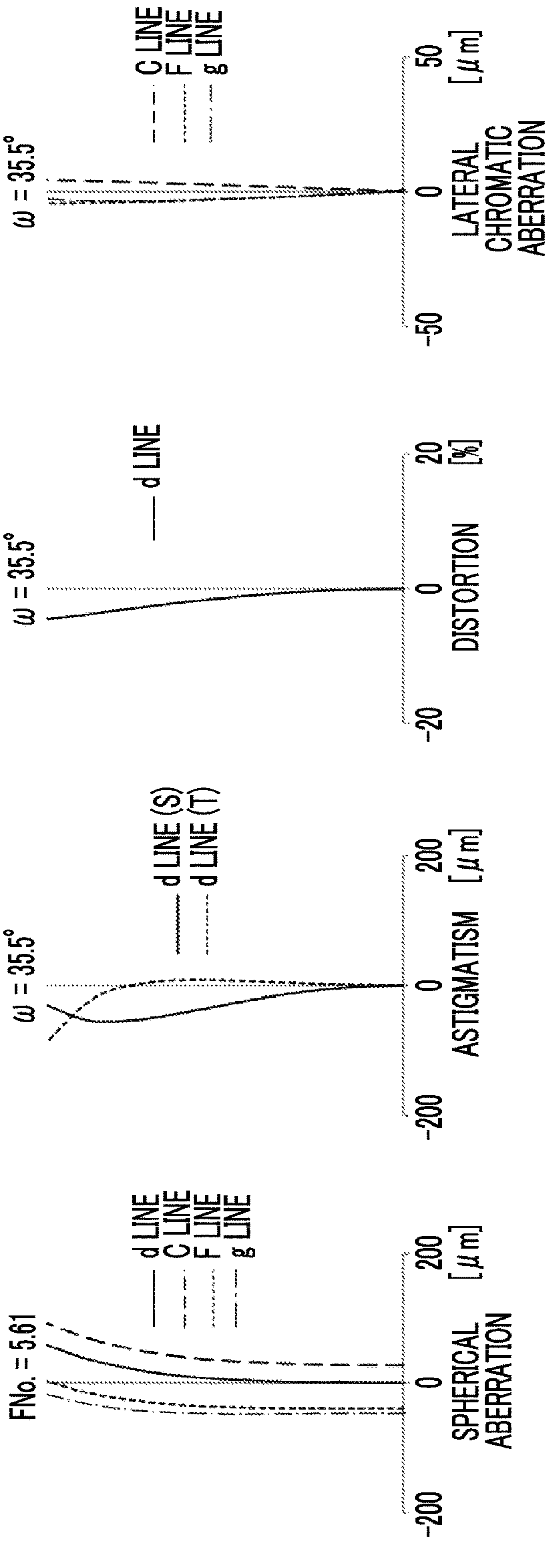
FIG. 33 is a diagram showing aberrations of the imaging lens according to Example 16.

Regarding the imaging lens according to Example 16, Table 34 shows basic lens data, Table 35 shows specifications, and FIG. 33 shows aberration diagrams.

TABLE 34

| Example 16 | | | | | | |
|---|---|---|---|---|---|---|
| Sn | R | D | Nd | νd | θgF | dN/dT |
| 1 | 14.1392 | 1.0946 | 1.80809 | 22.76 | 0.63073 | −0.1 |
| 2 | 5.8451 | 1.6121 | | | | |
| 3 | 25.5645 | 0.9998 | 1.79952 | 42.22 | 0.56727 | 6.7 |
| 4 | 8.9891 | 1.3383 | | | | |
| 5 | 77.8199 | 1.0098 | 1.52841 | 76.45 | 0.53954 | −6.1 |
| 6 | 7.2538 | 3.4655 | 1.83400 | 37.17 | 0.57866 | −0.1 |
| 7 | −14.3186 | 0.0998 | | | | |
| 8 | 7.6890 | 1.0002 | 1.52841 | 76.45 | 0.53954 | −6.1 |
| 9 | 3.3304 | 0.9741 | | | | |
| 10 | 5.7444 | 1.7813 | 1.79360 | 37.09 | 0.58284 | −0.8 |
| 11 | 7.5207 | 1.2303 | | | | |
| 12(St) | ∞ | 0.5001 | | | | |
| 13 | −116.1415 | 2.6039 | 1.69930 | 51.11 | 0.55523 | −1.2 |
| 14 | −5.8103 | 0.1002 | | | | |
| 15 | 42.3949 | 0.9998 | 1.80809 | 22.76 | 0.63073 | −0.1 |
| 16 | 8.2156 | 2.0866 | | | | |
| 17 | 17.0968 | 4.1715 | 1.55200 | 70.70 | 0.54219 | −2.8 |
| 18 | −6.8527 | 0.7498 | 2.00100 | 29.14 | 0.59974 | 4.5 |
| 19 | −12.1684 | 1.7717 | | | | |
| 20 | −179.4528 | 2.4181 | 1.69930 | 51.11 | 0.55523 | −1.2 |
| 21 | −19.4776 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 1.4015 | | | | |

TABLE 35

| Example 16 | |
|---|---|
| f | 8.23 |
| Bf | 8.39 |
| FNo. | 5.61 |
| 2ω[°] | 71.0 |

Example 17

Figure 34:
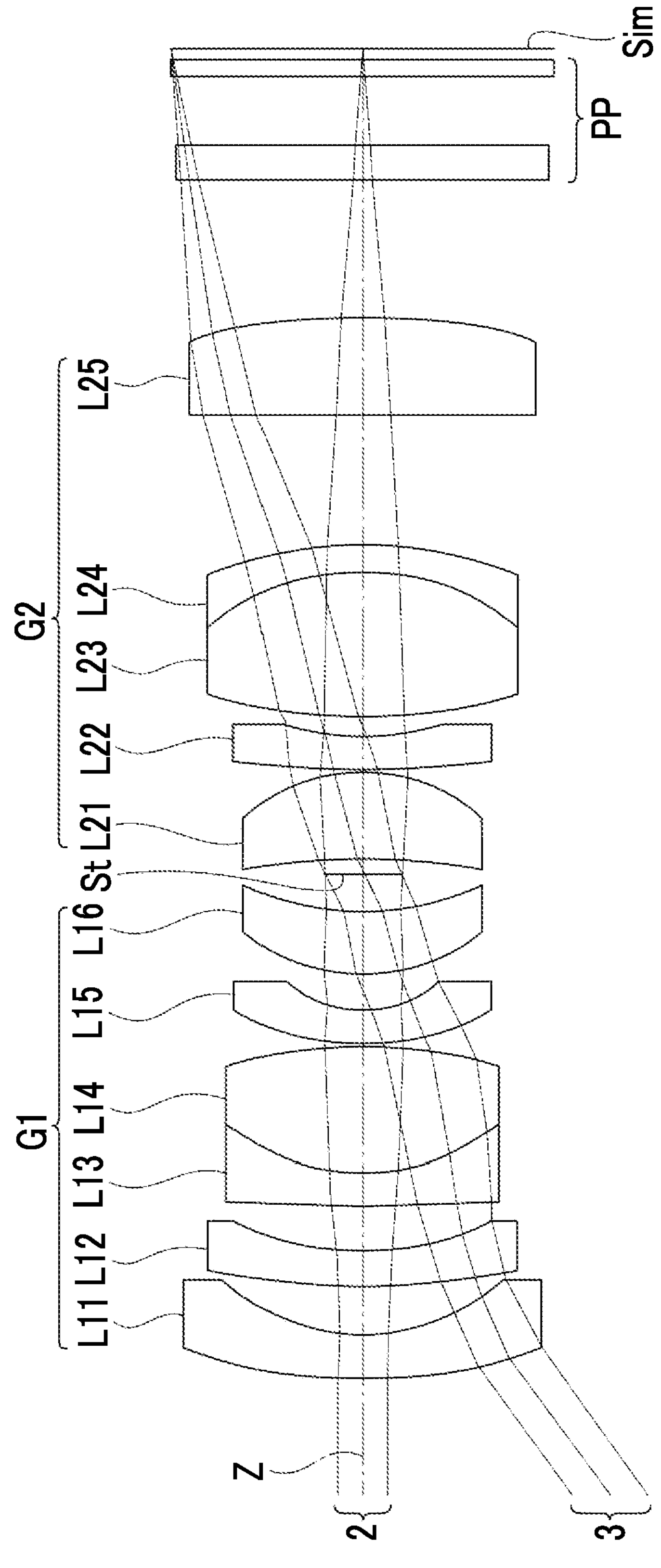
FIG. 34 is a cross-sectional view showing a configuration and luminous flux of an imaging lens according to Example 17.

FIG. 34 shows a cross-sectional view of a configuration and luminous flux of the imaging lens according to Example 17. The imaging lens according to Example 17 consists refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 35:
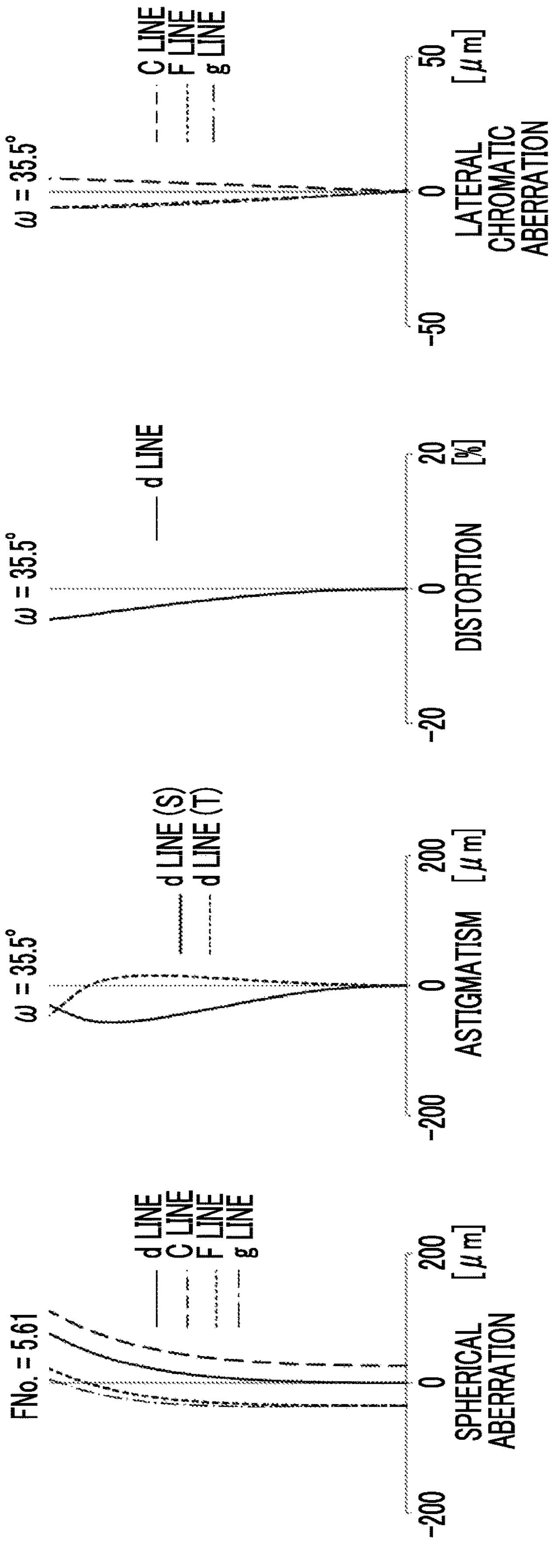
FIG. 35 is a diagram showing aberrations of the imaging lens according to Example 17.

Regarding the imaging lens according to Example 17, Table 36 shows basic lens data, Table 37 shows specifications, and FIG. 35 shows aberration diagrams.

TABLE 36

| Example 17 | | | | | | |
|---|---|---|---|---|---|---|
| Sn | R | D | Nd | νd | θgF | dN/dT |
| 1 | 14.7572 | 1.3018 | 1.85478 | 24.80 | 0.61232 | 4.4 |
| 2 | 6.1786 | 1.4509 | | | | |
| 3 | 26.9372 | 0.9998 | 1.79950 | 42.32 | 0.56564 | 8.3 |
| 4 | 8.5930 | 1.2699 | | | | |
| 5 | 42.0601 | 1.0098 | 1.65100 | 56.24 | 0.54210 | 6.7 |
| 6 | 6.4719 | 3.6282 | 1.83400 | 37.17 | 0.57866 | −0.1 |
| 7 | −13.6604 | 0.1002 | | | | |
| 8 | 7.0008 | 0.9999 | 1.52841 | 76.45 | 0.53954 | −6.1 |
| 9 | 3.1793 | 1.0544 | | | | |
| 10 | 5.8076 | 1.8628 | 1.83400 | 37.16 | 0.57759 | 7.9 |
| 11 | 7.6254 | 1.0455 | | | | |
| 12(St) | ∞ | 0.5002 | | | | |
| 13 | −18.6385 | 2.5097 | 1.69931 | 51.12 | 0.55743 | −1.4 |
| 14 | −5.1996 | 0.0998 | | | | |
| 15 | 23.3879 | 0.9998 | 1.89286 | 20.36 | 0.63944 | 1.3 |
| 16 | 8.3670 | 0.4998 | | | | |
| 17 | 15.1456 | 4.3112 | 1.49700 | 81.54 | 0.53748 | −6.4 |
| 18 | −6.6856 | 0.7498 | 1.79950 | 42.32 | 0.56564 | 8.3 |
| 19 | −13.0377 | 3.7616 | | | | |
| 20 | 86.5578 | 2.9311 | 1.49700 | 81.54 | 0.53748 | −6.4 |
| 21 | −15.9019 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3512 | | | | |

TABLE 37

| Example 17 | |
|---|---|
| f | 8.23 |
| Bf | 7.34 |
| FNo. | 5.61 |
| 2ω[°] | 71.0 |

Example 18

Figure 36:
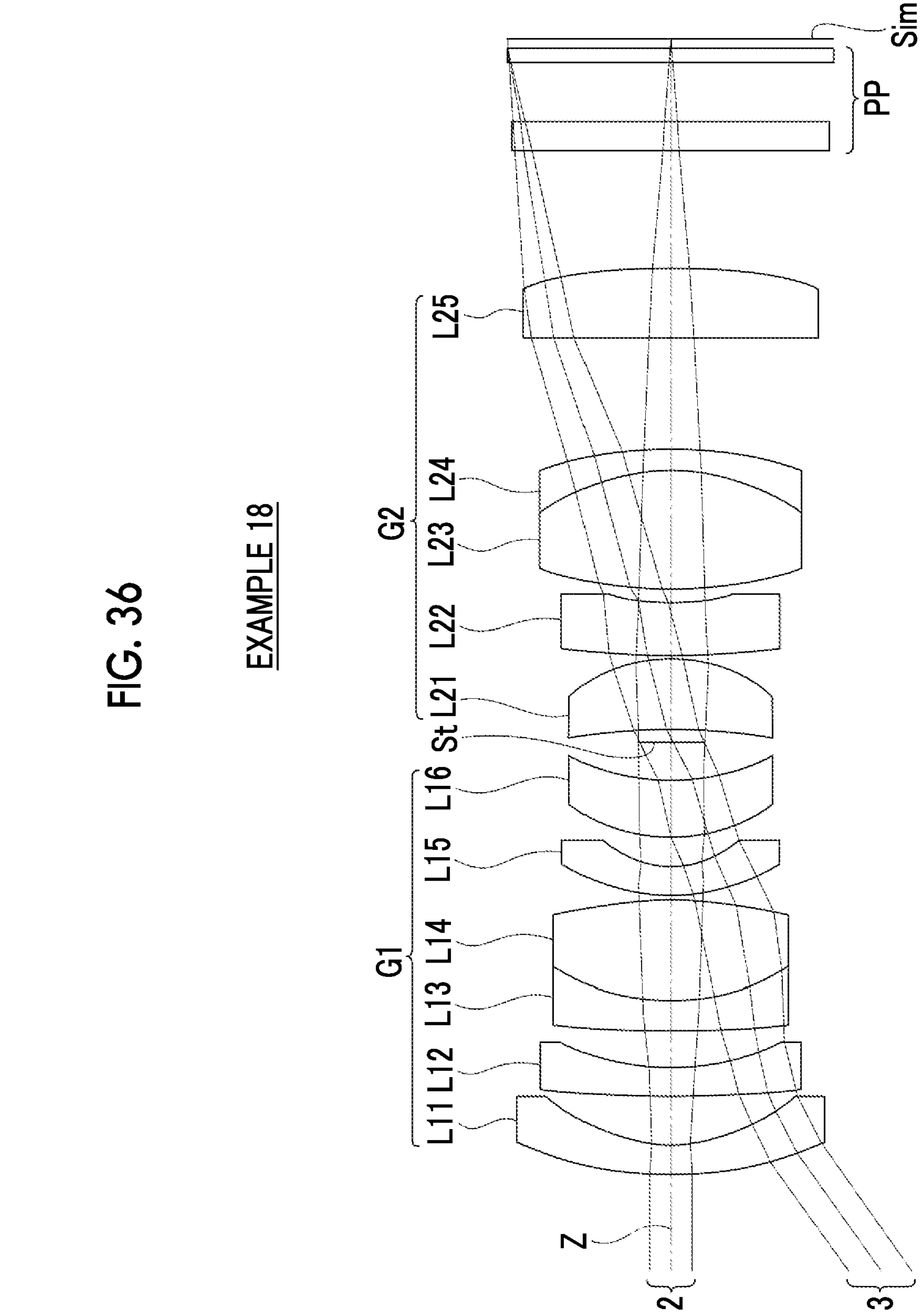
FIG. 36 is a cross-sectional view showing a configuration and luminous flux of an imaging lens according to Example 18.

FIG. 36 shows a cross-sectional view of a configuration and luminous flux of the imaging lens according to Example 18. The imaging lens according to Example 18 consists of, in order from the object side to the image side, a first lens group G1 that has a positive refractive power, an aperture stop St, and a second lens group G2 that has a negative refractive power. The first lens group G1 consists of six lenses L11 to L16 in order from the object side to the image side. The second lens group G2 consists of five lenses L21 to L25, in order from the object side to the image side.

Figure 37:
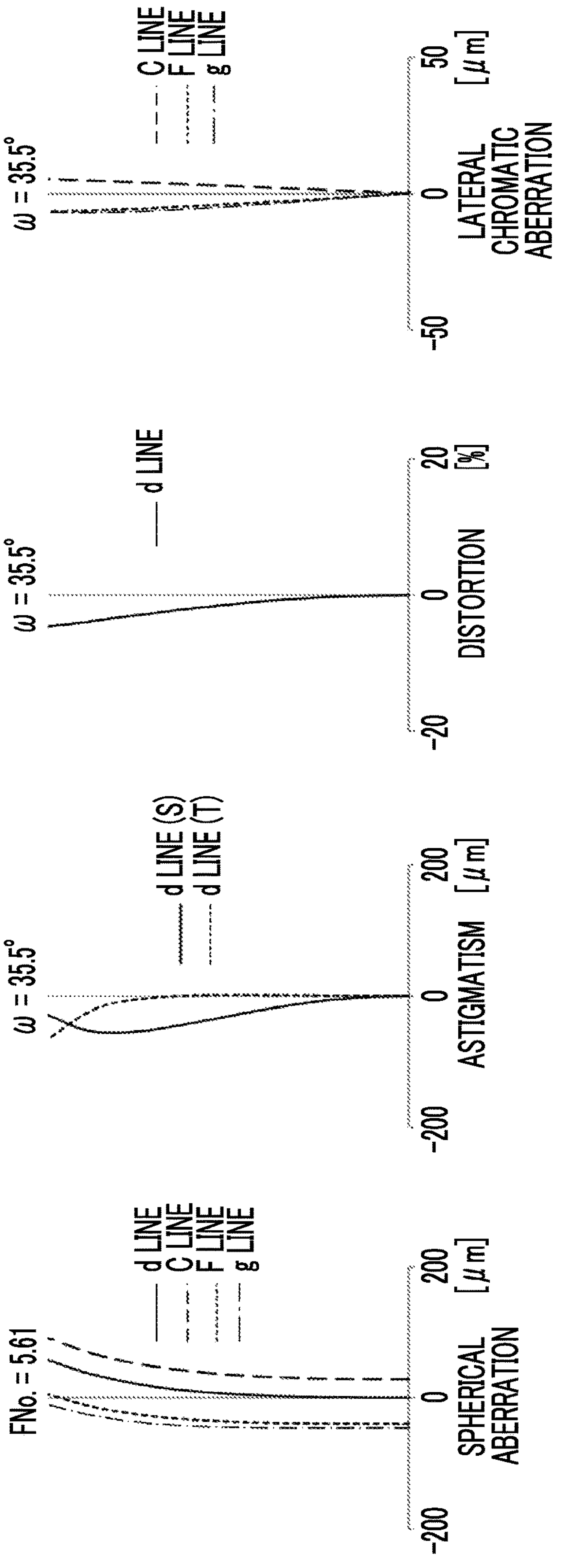
FIG. 37 is a diagram showing aberrations of the imaging lens according to Example 18.

Regarding the imaging lens according to Example 18, Table 38 shows basic lens data, Table 39 shows specifications, and FIG. 37 shows aberration diagrams.

TABLE 38

| Example 18 | | | | | | |
|---|---|---|---|---|---|---|
| Sn | R | D | Nd | νd | θgF | dN/dT |
| 1 | 13.7908 | 1.0000 | 1.85478 | 24.80 | 0.61232 | 4.4 |
| 2 | 6.2829 | 1.6931 | | | | |
| 3 | 49.8056 | 1.0002 | 1.79950 | 42.32 | 0.56564 | 8.3 |
| 4 | 9.4604 | 1.2114 | | | | |
| 5 | 42.7513 | 1.0102 | 1.61800 | 63.32 | 0.54271 | −0.7 |
| 6 | 7.4279 | 3.5203 | 1.83400 | 37.17 | 0.57866 | −0.1 |
| 7 | −14.1957 | 0.1001 | | | | |
| 8 | 7.1804 | 0.9999 | 1.52841 | 76.45 | 0.53954 | −6.1 |
| 9 | 3.4866 | 0.9765 | | | | |
| 10 | 5.9136 | 1.9661 | 1.83400 | 37.17 | 0.57866 | −0.1 |

TABLE 38-continued

| Example 18 | | | | | | |
|---|---|---|---|---|---|---|
| Sn | R | D | Nd | νd | θgF | dN/dT |
| 11 | 7.5942 | 1.3451 | | | | |
| 12(St) | ∞ | 0.4998 | | | | |
| 13 | −16.6079 | 2.3213 | 1.69931 | 51.12 | 0.55743 | −1.4 |
| 14 | −5.5862 | 0.0998 | | | | |
| 15 | 26.2286 | 1.8454 | 1.89286 | 20.36 | 0.63944 | 1.3 |
| 16 | 9.1010 | 0.4999 | | | | |
| 17 | 15.2800 | 4.0814 | 1.49700 | 81.54 | 0.53748 | −6.4 |
| 18 | −7.4686 | 0.7498 | 1.80518 | 25.42 | 0.61616 | 1.3 |
| 19 | −12.8720 | 3.7849 | | | | |
| 20 | −932.5401 | 2.3809 | 1.80440 | 39.59 | 0.57297 | 7.5 |
| 21 | −20.6233 | 4.0000 | | | | |
| 22 | ∞ | 1.0000 | 1.51680 | 64.20 | 0.53430 | 1.7 |
| 23 | ∞ | 2.0000 | | | | |
| 24 | ∞ | 0.5000 | 1.51680 | 64.20 | 0.53430 | 1.7 |
| 25 | ∞ | 0.3545 | | | | |

TABLE 39

| Example 18 | |
|---|---|
| f | 8.24 |
| Bf | 7.34 |
| FNo. | 5.61 |
| 2ω[°] | 71.0 |

Tables 40 to 44 show the corresponding values of Conditional Expressions (1) to (28) of the imaging lenses of Examples 1 to 18. However, regarding Conditional Expressions (18) to (20). the corresponding values of the positive lens (that is, the first positive lens) satisfying all of Conditional Expressions (18) to (20) are noted in the table. Regarding Conditional Expressions (21) to (23), the corresponding values of the positive lens (that is, the second positive lens) satisfying all of Conditional Expressions (21) to (23) are noted in the table. Regarding Conditional Expressions (24) to (26), the corresponding values of the negative lens (that is, the first negative lens) satisfying all of Conditional Expressions (24) to (26) are noted in the table. Regarding Conditional Expressions (27) to (28), the corresponding values of lenses satisfying all of Conditional Expressions (27) to (28) are noted in the table. In a case where there are a plurality of types of corresponding values to be written in the table in one example, the reference numerals of the corresponding lenses are written in parentheses in the column of the corresponding values. For example, the term "64.14 (L11)" in the column of Conditional Expression (27) in Example 2 indicates that the corresponding value of Conditional Expression (27) of the lens L11 is 64.14. Preferable ranges of the conditional expressions may be set by using the corresponding values of the examples shown in Tables 40 to 44 as the upper limits or the lower limits of the conditional expressions.

TABLE 40

| Expression Number | | Example 1 | Example 2 | Example 3 | Example 4 |
|---|---|---|---|---|---|
| (1) | Bf/(f × tanω) | 1.40 | 1.08 | 0.87 | 1.09 |
| (2) | f/FNo | 1.12 | 1.12 | 1.12 | 1.12 |
| (3) | (ν2cp − ν2cn) − (ν1cp − ν1cn) | 105.59 | 120.8 | 100.69 | 99.84 |
| (4) | DG12/TL | 0.041 | 0.018 | 0.008 | 0.008 |
| (5) | f/fG1 | −0.50 | 0.05 | 0.36 | 0.21 |
| (6) | f/fG2 | 0.65 | 0.72 | 0.69 | 0.77 |
| (7) | fG2/fzp | 0.59 | 0.65 | 0.72 | 0.61 |
| (8) | N1nave | 1.72616 | 1.49047 | 1.60163 | 1.60163 |
| (9) | νpave − νnave | 3.16 | −6.42 | −11.92 | −4.38 |
| (10) | TL/f | 5.36 | 4.54 | 4.02 | 4.04 |
| (11) | fG2/fG1 | −0.78 | 0.07 | 0.52 | 0.27 |
| (12) | ν1z | 20.36 | 32.32 | 29.14 | 29.14 |
| (13) | N1cp | 1.89190 | 1.90525 | 2.00100 | 2.00100 |
| (14) | dN1cp/dT | $5.3 \times 10^{-6}$ | $5.7 \times 10^{-6}$ | $4.5 \times 10^{-6}$ | $4.5 \times 10^{-6}$ |
| (15) | dN1s/dT | $1.3 \times 10^{-6}$ | $4.4 \times 10^{-6}$ | $4.5 \times 10^{-6}$ | $4.5 \times 10^{-6}$ |
| (16) | Dst/(f × tanω) | 3.07 | 2.75 | 2.53 | 2.37 |
| (17) | \|CRA\| | 3.03 | 3.31 | 3.83 | 3.64 |
| (18) | Np | 1.80440 | — | — | — |
| (19) | Np | 39.58 | — | — | — |
| (20) | dNp/dT | $1.6 \times 10^{-6}$ | — | — | — |
| (21) | Np | — | — | — | — |
| (22) | νp | — | — | — | — |
| (23) | dNp/dT | — | — | — | — |
| (24) | Nn | 1.83481 | — | 1.76450 | 1.76450 |
| (25) | νn | 42.74 | — | 49.10 | 49.10 |
| (26) | dNn/dT | $5.1 \times 10^{-6}$ | — | $7.5 \times 10^{-6}$ | $7.5 \times 10^{-6}$ |
| (27) | νd | 81.54 | 64.14(L11)<br>64.06(L12)<br>81.54(L23) | — | — |
| (28) | θgF + 0.001618 × νd | 0.669 | 0.639(L11)<br>0.637(L12)<br>0.669(L23) | — | — |

TABLE 41

| Expression Number | | Example 5 | Example 6 | Example 7 | Example 8 |
|---|---|---|---|---|---|
| (1) | Bf/(f × tanω) | 1.31 | 1.19 | 0.88 | 0.82 |
| (2) | f/FNo | 1.12 | 1.12 | 1.49 | 1.47 |
| (3) | (ν2cp − ν2cn) − (ν1cp − ν1cn) | 105.59 | 105.59 | 86.01 | 88.39 |
| (4) | DG12/TL | 0.038 | 0.047 | 0.037 | 0.043 |
| (5) | f/fG1 | −0.44 | −0.60 | −0.004 | 0.08 |
| (6) | f/fG2 | 0.67 | 0.66 | 0.70 | 0.68 |
| (7) | fG2/fzp | 0.58 | 0.56 | 0.73 | 0.77 |
| (8) | N1nave | 1.72616 | 1.72616 | 1.72774 | 1.74600 |
| (9) | νpave − νnave | 3.73 | 3.73 | 6.20 | 6.57 |
| (10) | TL/f | 5.44 | 5.44 | 4.33 | 4.35 |
| (11) | fG2/fG1 | −0.66 | −0.91 | −0.01 | 0.13 |
| (12) | ν1z | 20.36 | 20.36 | 37.13 | 32.32 |
| (13) | N1cp | 1.89190 | 1.89190 | 1.89190 | 1.89190 |
| (14) | dN1cp/dT | $5.3 \times 10^{-6}$ | $5.3 \times 10^{-6}$ | $5.3 \times 10^{-6}$ | $5.3 \times 10^{-6}$ |
| (15) | dN1s/dT | $1.3 \times 10^{-6}$ | $1.3 \times 10^{-6}$ | $5.3 \times 10^{-6}$ | $4.4 \times 10^{-6}$ |
| (16) | Dst/(f × tanω) | 3.21 | 3.37 | 2.78 | 3.02 |
| (17) | \|CRA\| | 2.84 | 2.68 | 3.70 | 0.87 |
| (18) | Np | — | — | — | — |
| (19) | νp | — | — | — | — |
| (20) | dNp/dT | — | — | — | — |
| (21) | Np | — | — | — | — |
| (22) | νp | — | — | — | — |
| (23) | dNp/dT | — | — | — | — |
| (24) | Nn | 1.83481 | 1.83481 | 1.85150 | 1.85150 |
| (25) | νn | 42.74 | 42.74 | 40.78 | 40.78 |
| (26) | dNn/dT | $5.1 \times 10^{-6}$ | $5.1 \times 10^{-6}$ | $5.4 \times 10^{-6}$ | $5.4 \times 10^{-6}$ |
| (27) | νd | 81.54 | 81.54 | 81.54 | 81.54 |
| (28) | θgF + 0.001618 × νd | 0.669 | 0.669 | 0.669 | 0.669 |

TABLE 42

| Expression Number | | Example 9 | Example 10 | Example 11 | Example 12 |
|---|---|---|---|---|---|
| (1) | Bf/(f × tanω) | 0.88 | 0.89 | 1.22 | 1.26 |
| (2) | f/FNo | 1.47 | 1.47 | 1.46 | 1.47 |
| (3) | (ν2cp − ν2cn) − (ν1cp − ν1cn) | 88.39 | 88.39 | 88.13 | 86.17 |
| | | 0.042 | 0.047 | 0.047 | 0.036 |
| (4) | DG12/TL | 0.10 | −0.03 | −0.39 | −0.43 |
| (5) | f/fG1 | 0.67 | 0.69 | 0.77 | 0.78 |
| (6) | f/fG2 | 0.74 | 0.73 | 0.44 | 0.42 |
| (7) | fG2/fzp | 1.74600 | 1.74600 | 1.83424 | 1.77790 |
| (8) | N1nave | 6.57 | 15.65 | 4.79 | 3.37 |
| (9) | νpave − νnave | 4.39 | 4.39 | 4.54 | 4.67 |
| (10) | TL/f | 0.15 | −0.05 | −0.51 | −0.56 |
| (11) | fG2/fG1 | 32.32 | 32.32 | 40.78 | 39.58 |
| (12) | ν1z | 1.89190 | 1.89190 | 1.85150 | 1.83481 |
| (13) | N1cp | $5.3 \times 10^{-6}$ | $5.3 \times 10^{-6}$ | $5.4 \times 10^{-6}$ | $5.1 \times 10^{-6}$ |
| (14) | dN1cp/dT | $4.4 \times 10^{-6}$ | $4.4 \times 10^{-6}$ | $5.4 \times 10^{-6}$ | $1.6 \times 10^{-6}$ |
| (15) | dN1s/dT | 3.00 | 2.97 | 2.69 | 2.71 |
| (16) | Dst/(f × tanω) | 1.23 | 0.66 | 8.25 | 8.22 |
| (17) | \|CRA\| | — | — | — | 1.80440 |
| (18) | Np | — | — | — | 39.58 |
| (19) | νp | — | — | — | $1.6 \times 10^{-6}$ |
| (20) | dNp/dT | — | — | — | — |
| (21) | Np | — | — | — | — |
| (22) | νp | — | — | — | — |
| (23) | dNp/dT | 1.85150 | 1.85150 | — | 1.83481 |
| (24) | Nn | 40.78 | 40.78 | — | 42.74 |
| (25) | νn | $5.4 \times 10^{-6}$ | $5.4 \times 10^{-6}$ | — | $5.1 \times 10^{-6}$ |
| (26) | dNn/dT | 81.54 | — | 67.73 (L13) | 67.73 (L13) |
| (27) | νd | | | 81.54 (L15, L23) | 81.54 (L15, L23) |
| (28) | θgF + 0.001618 × νd | 0.669 | — | 0.654 (L13) | 0.654 (L13) |
| | | | | 0.669 (L15, L23) | 0.669 (L15, L23) |

TABLE 43

| Expression Number | | Example 13 | Example 14 | Example 15 |
|---|---|---|---|---|
| (1) | Bf/(f × tanω) | 1.26 | 1.25 | 1.25 |
| (2) | f/FNo | 1.47 | 1.47 | 1.47 |
| (3) | (ν2cp − ν2cn) − (ν1cp − ν1cn) | 72.91 | 86.17 | 82.89 |
| (4) | DG12/TL | 0.028 | 0.043 | 0.042 |
| (5) | f/fG1 | −0.62 | −0.32 | −0.39 |
| (6) | f/fG2 | 0.75 | 0.74 | 0.75 |
| (7) | fG2/fzp | 0.30 | 0.45 | 0.31 |
| (8) | N1nave | 1.80484 | 1.77790 | 1.74187 |
| (9) | νpave − νnave | 12.81 | 3.37 | 5.76 |
| (10) | TL/f | 5.27 | 4.67 | 4.67 |
| (11) | fG2/fG1 | −0.83 | −0.44 | −0.52 |
| (12) | ν1z | 29.52 | 39.58 | 37.17 |
| (13) | N1cp | 1.80400 | 1.83481 | 1.83400 |
| (14) | dN1cp/dT | $4.7 \times 10^{-6}$ | $5.1 \times 10^{-6}$ | $-0.1 \times 10^{-6}$ |
| (15) | dN1s/dT | $2.8 \times 10^{-6}$ | $1.6 \times 10^{-6}$ | $-0.1 \times 10^{-6}$ |
| (16) | Dst/(f × tanω) | 2.87 | 2.71 | 2.72 |
| (17) | \|CRA\| | 8.47 | 8.21 | 8.50 |
| (18) | Np | — | 1.80440 | 1.83400 |
| (19) | νp | — | 39.58 | 37.17 |
| (20) | dNp/dT | — | $1.6 \times 10^{-6}$ | $-0.1 \times 10^{-6}$ |
| (21) | Np | — | — | 1.69930 |
| (22) | νp | — | — | 51.11 |
| (23) | dNp/dT | — | — | $-1.2 \times 10^{-6}$ |
| (24) | Nn | — | 1.83481 | 1.79952 |
| (25) | νn | — | 42.74 | 42.24 |
| (26) | dNn/dT | — | $5.1 \times 10^{-6}$ | $10.3 \times 10^{-6}$ |
| (27) | νd | 63.32 (L13) | 67.73 (L13) | 63.32(L13) |
| | | 81.54 (L15, L23) | 81.54 (L15, L23) | 76.45(L15) |
| | | 60.29 (L25) | — | 81.54(L23) |
| (28) | θgF + 0.001618 × νd | 0.645 (L13) | 0.654 (L13) | 0.645(L13) |
| | | 0.669 (L15, L23) | 0.669 (L15, L23) | 0.663(L15) |
| | | 0.640 (L25) | — | 0.669(L23) |

TABLE 44

| Expression Number | | Example 16 | Example 17 | Example 18 |
|---|---|---|---|---|
| (1) | Bf/(f × tanω) | 1.43 | 1.25 | 1.25 |
| (2) | f/FNo | 1.47 | 1.47 | 1.47 |
| (3) | (ν2cp − ν2cn) − (ν1cp − ν1cn) | 80.84 | 58.29 | 82.27 |
| (4) | DG12/TL | 0.045 | 0.040 | 0.048 |
| (5) | f/fG1 | −0.39 | −0.44 | −0.36 |
| (6) | f/fG2 | 0.76 | 0.77 | 0.75 |
| (7) | fG2/fzp | 0.35 | 0.39 | 0.42 |
| (8) | N1nave | 1.71201 | 1.76843 | 1.75743 |
| (9) | νpave − νnave | 4.47 | 13.96 | 7.21 |
| (10) | TL/f | 4.67 | 4.67 | 4.67 |
| (11) | fG2/fG1 | −0.52 | −0.57 | −0.48 |
| (12) | ν1z | 37.09 | 37.16 | 37.17 |
| (13) | N1cp | 1.83400 | 1.83400 | 1.83400 |
| (14) | dN1cp/dT | $-0.1 \times 10^{-6}$ | $-0.1 \times 10^{-6}$ | $-0.1 \times 10^{-6}$ |
| (15) | dN1s/dT | $-0.8 \times 10^{-6}$ | $7.9 \times 10^{-6}$ | $-0.1 \times 10^{-6}$ |
| (16) | Dst/(f × tanω) | 2.62 | 2.79 | 2.77 |
| (17) | \|CRA\| | 8.46 | 8.83 | 8.68 |
| (18) | Np | 1.83400 (L14) | 1.83400 | 1.83400 |
| | | 1.79360 (L16) | — | — |
| (19) | νp | 37.17 (L14) | 37.17 | 37.17 |
| | | 37.09 (L16) | — | — |
| (20) | dNp/dT | $-0.1 \times 10^{-6}$ (L14) | $-0.1 \times 10^{-6}$ | $-0.1 \times 10^{-6}$ |
| | | $-0.8 \times 10^{-6}$ (L16) | — | — |
| (21) | Np | 1.69930 | 1.69931 | 1.69931 |
| (22) | νp | 51.11 | 51.12 | 51.12 |
| (23) | dNp/dT | $-1.2 \times 10^{-6}$ | $-1.4 \times 10^{-6}$ | $-1.4 \times 10^{-6}$ |
| (24) | Nn | 1.79952 | 1.79950 (L12, L24) | 1.79950 |
| | | — | 1.65100 (L13) | — |
| (25) | νn | 42.22 | 42.32 (L12, L24) | 42.32 |
| | | — | 56.24 (L13) | — |
| (26) | dNn/dT | $6.7 \times 10^{-6}$ | $8.3 \times 10^{-6}$ (L12, L24) | $8.3 \times 10^{-6}$ |
| | | — | $6.7 \times 10^{-6}$ (L13) | — |
| (27) | νd | 76.45 (L13, L15) | 76.45 (L15) | 63.32(L13) |
| | | 70.70 (L23) | 81.54 (L23, L25) | 76.45(L15) |
| | | — | — | 81.54(L23) |

TABLE 44-continued

| Expression Number | | Example 16 | Example 17 | Example 18 |
|---|---|---|---|---|
| (28) | θgF + 0.001618 × νd | 0.663 (L13, L15)<br>0.657 (L23)<br>— | 0.663 (L15)<br>0.669 (L23, L25)<br>— | 0.645(L13)<br>0.663(L15)<br>0.669(L23) |

Figure 38:
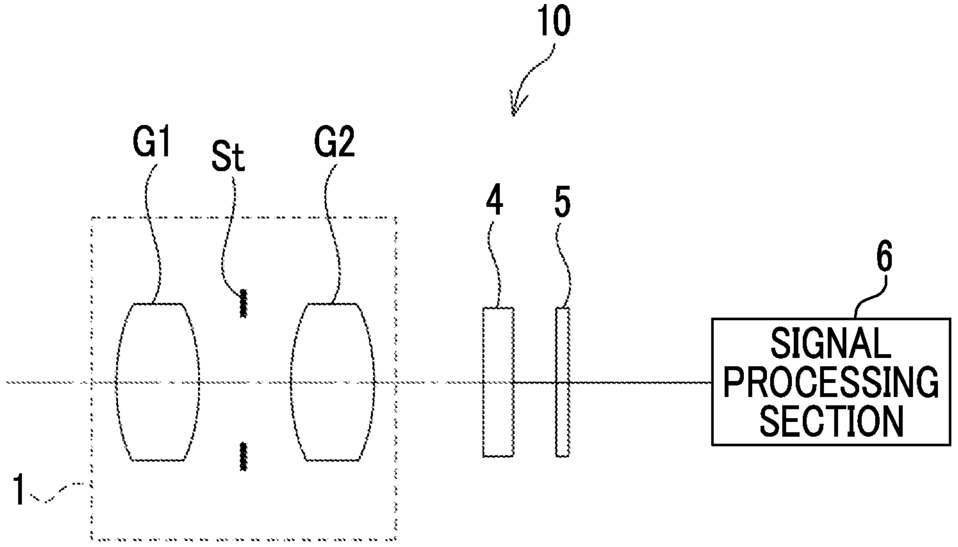
FIG. 38 is a schematic configuration diagram of an imaging apparatus according to an embodiment.

Next, an imaging apparatus according to an embodiment of the present disclosure will be described. FIG. 38 shows a schematic configuration diagram of an imaging apparatus 10 using the imaging lens 1 according to the embodiment of the present disclosure as the imaging apparatus according to the embodiment of the present disclosure. Examples of the imaging apparatus 10 include a factory automation (FA) camera, a machine vision (MV) camera, a digital camera, a surveillance camera, an in-vehicle camera, and a cinema camera.

The imaging apparatus 10 includes an imaging lens 1, a filter 4 disposed on the image side of the imaging lens 1, an imaging element 5, and a signal processing section 6 that performs arithmetic processing on an output signal from the imaging element 5. FIG. 38 conceptually shows the first lens group G1, the aperture stop St, and the second lens group G2 included in the imaging lens 1. The imaging element 5 captures an image of a subject formed by the imaging lens 1 and converts the image into an electrical signal, and for example, a complementary metal-oxide semiconductor (CMOS) sensor, a charge coupled device (CCD) sensor, or the like can be used. The imaging element 5 is disposed such that the imaging surface thereof coincides with the image plane of the imaging lens 1.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Although the aberration diagrams of the above-mentioned examples show a range of the wavelength from the g line to the C line. However, the technique of the present disclosure is not limited to the wavelength range, and is also applicable to an imaging lens having an enlarged or reduced wavelength range.

FIG. 38 shows only one imaging element. However, the imaging apparatus according to the present disclosure may be configured to comprise a plurality of imaging elements. The imaging apparatus according to the present disclosure may be configured such that a spectroscopic prism and/or a dichroic mirror is inserted at any position on the optical axis of the optical system to branch the light for each wavelength and capture an image with different imaging elements. The imaging apparatus according to the present disclosure may be configured to limit the wavelength range of light by inserting a bandpass filter at any location on the optical axis of the optical system.

The imaging apparatus according to the present disclosure is not limited to a camera corresponding to the visible range. The technique of the present disclosure is also applicable to a visible range camera, a short wave infra-red (SWIR) range camera, a multispectral camera, a hyperspectral camera, a thermography camera, and the like.

Regarding the above-mentioned embodiments and examples, the following Supplementary Notes will be further disclosed.

Supplementary Note 1

An imaging lens consisting of, in order from an object side to an image side:

a first lens group that has a refractive power;

a stop; and a second lens group that has a positive refractive power, wherein the first lens group includes, successively in order from a position closest to the object side to the image side, a negative meniscus lens and a negative lens, and assuming that a back focal length of a whole system in terms of an air-equivalent distance in a state where an infinite distance object is in focus is Bf, a focal length of the whole system in a state where the infinite distance object is in focus is f, a maximum half angle of view in a state where the infinite distance object is in focus is ω, Conditional Expression (1) is satisfied, which is represented by $$0.3 < Bf/(f \times \tan\omega) < 1.75. \quad (1)$$

Supplementary Note 2

The imaging lens according to Supplementary Note 1, wherein assuming that a unit of f is millimeter, and an F number of the whole system in a state where the infinite distance object is in focus is FNo., Conditional Expression (2) is satisfied, which is represented by $$0.6 < f/FNo < 4.3. \quad (2)$$

Supplementary Note 3

The imaging lens according to Supplementary Note 1 or 2, wherein the first lens group includes a cemented lens consisting of one positive lens and one negative lens, the second lens group includes a cemented lens consisting of one positive lens and one negative lens, and assuming that an Abbe number of the positive lens of the cemented lens of the first lens group based on a d line is ν1cp, an Abbe number of the negative lens of the cemented lens of the first lens group based on the d line is ν1cn, an Abbe number of the positive lens of the cemented lens of the second lens group based on the d line is ν2cp, and an Abbe number of the negative lens of the cemented lens of the second lens group based on the d line is ν2cn, Conditional Expression (3) is satisfied, which is represented by $$52 < (\nu 2cp - \nu 2cn) - (\nu 1cp - \nu 1cn) < 170. \quad (3)$$

Supplementary Note 4

The imaging lens according to any one of Supplementary Notes 1 to 3, wherein assuming that a distance on an optical axis between a lens closest to the image side in the first lens group and a lens closest to the object side in the second lens group is DG12, and a sum of the back focal length of the whole system in terms of the air-equivalent distance and a distance on the optical axis from a lens surface closest to the object side in the first lens group to a lens surface closest to the image side in the second lens group in a state where the infinite distance object is in focus is TL, Conditional Expression (4) is satisfied, which is represented by $$0 < DG12/TL < 0.11. \quad (4)$$

Supplementary Note 5

The imaging lens according to any one of Supplementary Notes 1 to 4, wherein assuming that a focal length of the first lens group is fG1, Conditional Expression (5) is satisfied, which is represented by $$-0.8 < f/fG1 < 0.6. \quad (5)$$

Supplementary Note 6

The imaging lens according to any one of Supplementary Notes 1 to 5, wherein assuming that a focal length of the second lens group is fG2, Conditional Expression (6) is satisfied, which is represented by $$0.4 < f/fG21 < 1. \quad (6)$$

Supplementary Note 7

The imaging lens according to any one of Supplementary Notes 1 to 6, wherein the second lens group includes a positive lens at a position closest to the image side, and assuming that a focal length of the second lens group is fG2, and a focal length of the positive lens closest to the image side in the second lens group is fzp, Conditional Expression (7) is satisfied, which is represented by $$0.1 < fG2/fzp < 1. \quad (7)$$

Supplementary Note 8

The imaging lens according to any one of Supplementary Notes 1 to 7, wherein assuming that an average value of refractive indexes of all negative lenses disposed closer to the object side than a positive lens closest to the object side among positive lenses included in the imaging lens at a d line is N1nave, Conditional Expression (8) is satisfied, which is represented by $$1.43 < N1nave < 1.9. \quad (8)$$

Supplementary Note 9

The imaging lens according to any one of Supplementary Notes 1 to 8, wherein assuming that an average value of Abbe numbers of all positive lenses included in the imaging lens based on a d line is νpave, and an average value of Abbe numbers of all negative lenses included in the imaging lens based on the d line is νnave, Conditional Expression (9) is satisfied, which is represented by $$-16 < \nu pave - \nu nave < 20. \quad (9)$$

Supplementary Note 10

The imaging lens according to any one of Supplementary Notes 1 to 9, wherein assuming that a sum of the back focal length of the whole system in terms of the air-equivalent distance and a distance on an optical axis from a lens surface closest to the object side in the first lens group to a lens surface closest to the image side in the second lens group in a state where the infinite distance object is in focus is TL, Conditional Expression (10) is satisfied, which is represented by $$3 < TL/f < 6.5. \quad (10)$$

Supplementary Note 11

The imaging lens according to any one of Supplementary Notes 1 to 10, wherein assuming that a focal length of the first lens group is denoted by fG1, and a focal length of the second lens group is fG2, Conditional Expression (11) is satisfied, which is represented by $$-1.3 < fG2/fG1 < 0.9. \quad (11)$$

Supplementary Note 12

The imaging lens according to any one of Supplementary Notes 1 to 11, wherein assuming that an Abbe number of a lens closest to the image side in the first lens group based on a d line is ν1z, Conditional Expression (12) is satisfied, which is represented by $$16 < \nu 1z < 45. \tag{12}$$

Supplementary Note 13

The imaging lens according to any one of Supplementary Notes 1 to 12, wherein the first lens group includes a cemented lens consisting of one positive lens and one negative lens, assuming that a refractive index of the positive lens of the cemented lens of the first lens group at a d line is N1cp, a temperature coefficient of the refractive index of the positive lens of the cemented lens of the first lens group at 50° C. at the d line is dN1cp/dT, and a unit of dN1cp/dT is ° C.$^{-1}$, Conditional Expressions (13) and (14) are satisfied, which are represented by $$1.7 < N1cp < 2.1, \text{ and} \tag{13}$$

$$-0.5\times10^{-6} < dN1cp/dT < 6.5\times10^{-6}. \tag{14}$$

Supplementary Note 14

The imaging lens according to any one of Supplementary Notes 1 to 13, wherein a lens closest to the image side in the first lens group is a single lens that has a positive refractive power, and assuming that a temperature coefficient of a refractive index of the single lens at a d line at 50° C. is dN1s/dT, and a unit of dN1s/dT is ° C.$^{-1}$, Conditional Expression (15) is satisfied, which is represented by $$-0.5\times10^{-6} < dN1s/dT < 9\times10^{-6}. \tag{15}$$

Supplementary Note 15

The imaging lens according to any one of Supplementary Notes 1 to 14, wherein assuming that a sum of the back focal length of the whole system in terms of the air-equivalent distance and a distance on an optical axis from the stop to a lens surface closest to the image side in the second lens group in a state where the infinite distance object is in focus is Dst, Conditional Expression (16) is satisfied, which is represented by $$2 < Dst/(f\times\tan\omega) < 3.8. \tag{16}$$

Supplementary Note 16

The imaging lens according to any one of Supplementary Notes 1 to 15, wherein the first lens group consists of three or four negative lenses and two positive lenses.

Supplementary Note 17

The imaging lens according to any one of Supplementary Notes 1 to 16, wherein the second lens group consists of two or three negative lenses and three positive lenses.

Supplementary Note 18

The imaging lens according to any one of Supplementary Notes 1 to 17, wherein an absolute value of a curvature radius of an image side surface of a lens closest to the image side in the first lens group is greater than an absolute value of a curvature radius of an object side surface thereof.

Supplementary Note 19

The imaging lens according to any one of Supplementary Notes 1 to 18, wherein a positive lens, which has a larger absolute value of a curvature radius of an object side surface than an absolute value of a curvature radius of an image side surface, is disposed on the image side of the stop to be adjacent to the stop with an air spacing.

Supplementary Note 20

The imaging lens according to any one of Supplementary Notes 1 to 19, wherein assuming that an angle formed between an axis line parallel to an optical axis and a principal ray incident onto an image plane with a maximum half angle of view is CRA, and a unit of CRA is degrees, Conditional Expression (17) is satisfied, which is represented by $$0 \le |CRA| < 12. \tag{17}$$

Supplementary Note 21

An imaging lens comprising:

a plurality of lenses in combination, wherein assuming that a refractive index of a positive lens, which is included in the imaging lens, at a d line is Np, an Abbe number of the positive lens based on the d line is νp, a temperature coefficient of the refractive index of the positive lens at the d line at 50° C. is dNp/dT, and a unit of dNp/dT is ° C.$^{-1}$, the imaging lens includes at least one first positive lens that satisfies Conditional Expressions (18), (19), and (20), which are represented by $$1.72 < Np < 1.9, \tag{18}$$

$$30 < \nu p < 42, \text{ and} \tag{19}$$

$$dNp/dT < 4.3\times10^{-6}. \tag{20}$$

Supplementary Note 22

The imaging lens according to Supplementary Note 21, wherein the first positive lens, which satisfies Conditional Expressions (18), (19), and (20), satisfies Conditional Expression (20-1), which is represented by $$-3\times10^{-6} < dNp/dT < 4\times10^{-6}. \tag{20-1}$$

Supplementary Note 23

The imaging lens according to Supplementary Note 21, wherein the first positive lens, which satisfies Conditional Expressions (18), (19), and (20), satisfies Conditional Expression (20-2), which is represented by $$-3\times10^{-6} < dNp/dT < 3\times10^{-6}. \quad (20\text{-}2)$$

Supplementary Note 24

The imaging lens according to Supplementary Note 21, wherein the first positive lens, which satisfies Conditional Expressions (18), (19), and (20), satisfies Conditional Expression (20-3), which is represented by $$-2\times10^{-6} < dNp/dT < 2\times10^{-6}. \quad (20\text{-}3)$$

Supplementary Note 25

The imaging lens according to Supplementary Note 21, wherein the first positive lens, which satisfies Conditional Expressions (18), (19), and (20), satisfies Conditional Expression (20-4), which is represented by $$-2\times10^{-6} < dNp/dT < 1\times10^{-6}. \quad (20\text{-}4)$$

Supplementary Note 26

The imaging lens according to Supplementary Note 21, wherein the first positive lens, which satisfies Conditional Expressions (18), (19), and (20), satisfies Conditional Expression (20-5), which is represented by $$-1\times10^{-6} < dNp/dT < 0\times10^{-6}. \quad (20\text{-}5)$$

Supplementary Note 27

The imaging lens according to Supplementary Note 21, wherein the first positive lens, which satisfies Conditional Expressions (18), (19), and (20), satisfies Conditional Expression (20-6), which is represented by $$-0.2\times10^{-6} < dNp/dT < 0\times10^{-6}. \quad (20\text{-}6)$$

Supplementary Note 28

The imaging lens according to Supplementary Note 21, wherein the first positive lens, which satisfies Conditional Expressions (18), (19), and (20), satisfies Conditional Expression (20-7), which is represented by $$-0.9\times10^{-6} < dNp/dT < -0.7\times10^{-6}. \quad (20\text{-}7)$$

Supplementary Note 29

The imaging lens according to any one of Supplementary Notes 21 to 28, wherein the imaging lens includes at least one second positive lens that satisfies Conditional Expressions (21), (22), and (23), which are represented by $$1.6 < Np < 1.8, \quad (21)$$

$$40 < \nu p < 60, \text{ and} \quad (22)$$

$$dNp/dT < 3.5\times10^{-6} \quad (23)$$

assuming that a refractive index of a negative lens, which is included in the imaging lens, at a d line is Nn, an Abbe number of the negative lens based on the d line is νn, a temperature coefficient of the refractive index of the negative lens at 50° C. at the d line is dNn/dT, and a unit of dNn/dT is ° C.$^{-1}$, the imaging lens includes at least one negative lens that satisfies Conditional Expressions (24), (25), and (26), which are represented by $$1.55 < Nn < 1.9, \quad (24)$$

$$35 < \nu n < 65, \text{ and} \quad (25)$$

$$4\times10^{-6} < dNn/dT, \quad (26)$$

assuming that an Abbe number of a lens, which is included in the imaging lens, based on the d line is νd, and a partial dispersion ratio of the lens, which is included in the imaging lens, between a g line and an F line is θgF, the imaging lens includes at least one specific lens that satisfies Conditional Expression (27), which is represented by $$60 < \nu d, \quad (27)$$

where at least one of the specific lens satisfies Conditional Expression (28), which is represented by $$0.6 < \theta gF + 0.001618\times\nu d < 0.686. \quad (28)$$

Supplementary Note 30

An imaging apparatus comprising the imaging lens according to any one of Supplementary Notes 1 to 29.

What is claimed is:

1. An imaging lens consisting of, in order from an object side to an image side:

a first lens group that has a refractive power;

a stop; and a second lens group that has a positive refractive power, wherein the first lens group includes, successively in order from a position closest to the object side to the image side, a negative meniscus lens and a negative lens, and where a back focal length of the imaging lens in terms of an air-equivalent distance in a state where an infinite distance object is in focus is Bf, a focal length of the imaging lens in a state where the infinite distance object is in focus is f, and a maximum half angle of view in a state where the infinite distance object is in focus is ω, Conditional Expression (1) is satisfied, which is represented by $$0.3 < Bf/(f \times \tan\omega) < 1.75, \quad (1)$$

wherein the first lens group includes a cemented lens consisting of one positive lens and one negative lens, the second lens group includes a cemented lens consisting of one positive lens and one negative lens, and where an Abbe number of the positive lens of the cemented lens of the first lens group based on a d line is ν1cp, an Abbe number of the negative lens of the cemented lens of the first lens group based on the d line is ν1cn, an Abbe number of the positive lens of the cemented lens of the second lens group based on the d line is ν2cp, and an Abbe number of the negative lens of the cemented lens of the second lens group based on the d line is ν2cn, Conditional Expression (3) is satisfied, which is represented by $$52<(\nu 2cp-\nu 2cn)-(\nu 1cp-\nu 1cn)<170 \quad (3).$$

2. The imaging lens according to claim 1, wherein, where a unit of f is millimeter, and an F number of the imaging lens in a state where the infinite distance object is in focus is FNo, Conditional Expression (2) is satisfied, which is represented by $$0.6 < f/FNo < 4.3. \quad (2)$$

3. The imaging lens according to claim 1, wherein, where a distance on an optical axis between a lens closest to the image side in the first lens group and a lens closest to the object side in the second lens group is DG12, and wherein, where a sum of the back focal length of the imaging lens in terms of the air-equivalent distance and a distance on an optical axis from a lens surface closest to the object side in the first lens group to a lens surface closest to the image side in the second lens group in a state where the infinite distance object is in focus is TL, Conditional Expression (4) is satisfied, which is represented by $$0 < DG12/TL < 0.11. \quad (4)$$

4. The imaging lens according to claim 1, wherein, where a focal length of the first lens group is fG1, Conditional Expression (5) is satisfied, which is represented by $$-0.8 < f/fG1 < 0.6. \quad (5)$$

5. The imaging lens according to claim 1, wherein, where a focal length of the second lens group is fG2, Conditional Expression (6) is satisfied, which is represented by $$0.4 < f/fG2 < 1. \quad (6)$$

6. The imaging lens according to claim 1, wherein the second lens group includes a positive lens at a position closest to the image side, and where a focal length of the second lens group is fG2, and a focal length of the positive lens closest to the image side in the second lens group is fzp, Conditional Expression (7) is satisfied, which is represented by $$0.1 < fG2/fzp < 1. \quad (7)$$

7. The imaging lens according to claim 1, wherein, where an average value of refractive indexes of all negative lenses disposed closer to the object side than a positive lens closest to the object side among positive lenses included in the imaging lens at a d line is N1nave, Conditional Expression (8) is satisfied, which is represented by $$1.43 < N1nave < 1.9. \quad (8)$$

8. The imaging lens according to claim 1, wherein, where an average value of Abbe numbers of all positive lenses included in the imaging lens based on a d line is νpave, and an average value of Abbe numbers of all negative lenses included in the imaging lens based on the d line is νnave, Conditional Expression (9) is satisfied, which is represented by $$-16 < \nu pave - \nu nave < 20. \quad (9)$$

9. The imaging lens according to claim 1, wherein, where a sum of the back focal length of the imaging lens in terms of the air-equivalent distance and a distance on an optical axis from a lens surface closest to the object side in the first lens group to a lens surface closest to the image side in the second lens group in a state where the infinite distance object is in focus is TL, Conditional Expression (10) is satisfied, which is represented by $$3 < TL/f < 6.5. \quad (10)$$

10. The imaging lens according to claim 1, wherein, where a focal length of the first lens group is denoted by fG1, and a focal length of the second lens group is fG2, Conditional Expression (11) is satisfied, which is represented by $$-1.3 < fG2/fG1 < 0.9. \quad (11)$$

11. The imaging lens according to claim 1, wherein, where an Abbe number of a lens closest to the image side in the first lens group based on a d line is ν1z, Conditional Expression (12) is satisfied, which is represented by $$16 < \nu 1z < 45. \quad (12)$$

12. The imaging lens according to claim 1, wherein, where a sum of the back focal length of the imaging lens in terms of the air-equivalent distance and a distance on an optical axis from the stop to a lens surface closest to the image side in the second lens group in a state where the infinite distance object is in focus is Dst, Conditional Expression (16) is satisfied, which is represented by $$2 < Dst/(f \times \tan\omega) < 3.8. \quad (16)$$

13. The imaging lens according to claim 1, wherein the first lens group consists of three or four negative lenses and two positive lenses.

14. The imaging lens according to claim 1, wherein the second lens group consists of two or three negative lenses and three positive lenses.

15. The imaging lens according to claim 1, wherein an absolute value of a curvature radius of an image side surface of a lens closest to the image side in the first lens group is greater than an absolute value of a curvature radius of an object side surface thereof.

16. The imaging lens according to claim 1, wherein a positive lens, which has a larger absolute value of a curvature radius of an object side surface than an absolute value of a curvature radius of an image side surface, is disposed on the image side of the stop to be adjacent to the stop with an air spacing.

17. The imaging lens according to claim 1, wherein, where an angle formed between an axis line parallel to an optical axis and a principal ray incident onto an image plane with a maximum half angle of view is CRA, and a unit of CRA is degrees, Conditional Expression (17) is satisfied, which is represented by $$0 \leq |CRA| < 12. \quad (17)$$

18. An imaging apparatus comprising the imaging lens according to claim 1.

19. An imaging lens consisting of, in order from an object side to an image side:

a first lens group that has a refractive power;

a stop; and a second lens group that has a positive refractive power, wherein the first lens group includes, successively in order from a position closest to the object side to the image side, a negative meniscus lens and a negative lens, and where a back focal length of the imaging lens in terms of an air-equivalent distance in a state where an infinite distance object is in focus is Bf, a focal length of the imaging lens in a state where the infinite distance object is in focus is f, and a maximum half angle of view in a state where the infinite distance object is in focus is ω, Conditional Expression (1) is satisfied, which is represented by $$0.3 < Bf/(f \times \tan\omega) < 1.75 \quad (1),$$

wherein the first lens group includes a cemented lens consisting of one positive lens and one negative lens, and where a refractive index of the positive lens of the cemented lens of the first lens group at a d line is N1cp, a temperature coefficient of the refractive index of the positive lens of the cemented lens of the first lens group at 50° C. at the d line is dN1cp/dT, and a unit of dN1cp/dT is ° $C.^{-1}$, Conditional Expressions (13) and (14) are satisfied, which are represented by $$1.7 < N1cp < 2.1, \quad (13)$$

and $$-0.5 \times 10^{-6} < dN1cp/dT < 6.5 \times 10^{-6}. \quad (14)$$

20. An imaging lens consisting of, in order from an object side to an image side:

a first lens group that has a refractive power;

a stop; and a second lens group that has a positive refractive power, wherein the first lens group includes, successively in order from a position closest to the object side to the image side, a negative meniscus lens and a negative lens, and where a back focal length of the imaging lens in terms of an air-equivalent distance in a state where an infinite distance object is in focus is Bf, a focal length of the imaging lens in a state where the infinite distance object is in focus is f, and a maximum half angle of view in a state where the infinite distance object is in focus is ω, Conditional Expression (1) is satisfied, which is represented by $$0.3 < Bf/(f \times \tan\omega) < 1.75 \quad (1),$$

wherein a lens closest to the image side in the first lens group is a single lens that has a positive refractive power, and where a temperature coefficient of a refractive index of the single lens at a d line at 50° C. is dN1s/dT, and a unit of dN1s/dT is ° C.$^{-1}$, Conditional Expression (15) is satisfied, which is represented by $$-0.5\times10^{-6}<dN1s/dT<9\times10^{-6}. \quad (15)$$

21. An imaging lens comprising:

a plurality of lenses in combination, wherein, where a refractive index of a positive lens, which is included in the imaging lens, at a d line is Np, an Abbe number of the positive lens based on the d line is νp, a temperature coefficient of the refractive index of the positive lens at the d line at 50° C. is dNp/dT, and a unit of dNp/dT is ° C.$^{-1}$, the imaging lens includes at least one first positive lens that satisfies Conditional Expressions (18), (19), and (20), which are represented by $$1.72<Np<1.9, \quad (18)$$

$$30<\nu p<42, \quad (19)$$

and $$dNp/dT<4.3\times10^{-6}. \quad (20)$$

22. The imaging lens according to claim 21, wherein the first positive lens, which satisfies Conditional Expressions (18), (19), and (20), satisfies Conditional Expression (20-1), which is represented by $$-3\times10^{-6}<dNp/dT<4\times10^{-6}. \quad (20\text{-}1)$$

23. The imaging lens according to claim 21, wherein the first positive lens, which satisfies Conditional Expressions (18), (19), and (20), satisfies Conditional Expression (20-2), which is represented by $$-3\times10^{-6}<dNp/dT<3\times10^{-6}. \quad (20\text{-}2)$$

24. The imaging lens according to claim 21, wherein the first positive lens, which satisfies Conditional Expressions (18), (19), and (20), satisfies Conditional Expression (20-3), which is represented by $$-2\times10^{-6}<dNp/dT<2\times10^{-6}. \quad (20\text{-}3)$$

25. The imaging lens according to claim 21, wherein the first positive lens, which satisfies Conditional Expressions (18), (19), and (20), satisfies Conditional Expression (20-4), which is represented by $$-2\times10^{-6}<dNp/dT<1\times10^{-6}. \quad (20\text{-}4)$$

26. The imaging lens according to claim 21, wherein the first positive lens, which satisfies Conditional Expressions (18), (19), and (20), satisfies Conditional Expression (20-5), which is represented by $$-1\times10^{-6}<dNp/dT<0\times10^{-6}. \quad (20\text{-}5)$$

27. The imaging lens according to claim 21, wherein the first positive lens, which satisfies Conditional Expressions (18), (19), and (20), satisfies Conditional Expression (20-6), which is represented by $$-0.2\times10^{-6}<dNp/dT<0\times10^{-6}. \quad (20\text{-}6)$$

28. The imaging lens according to claim 21, wherein the first positive lens, which satisfies Conditional Expressions (18), (19), and (20), satisfies Conditional Expression (20-7), which is represented by $$-0.9\times10^{-6}<dNp/dT<-0.7\times10^{-6}. \quad (20\text{-}7)$$

29. The imaging lens according to claim 21, wherein the imaging lens includes at least one second positive lens that satisfies Conditional Expressions (21), (22), and (23), which are represented by $$1.6<Np<1.8, \quad (21)$$

$$40<\nu p<60, \quad (22)$$

and $$dNp/dT<3.5\times10^{-6}, \quad (23)$$

where a refractive index of a negative lens, which is included in the imaging lens, at a d line is Nn, an Abbe number of the negative lens based on the d line is νn, a temperature coefficient of the refractive index of the negative lens at 50° C. at the d line is dNn/dT, and a unit of dNn/dT is ° C.$^{-1}$, the imaging lens includes at least one negative lens that satisfies Conditional Expressions (24), (25), and (26), which are represented by $$1.55<Nn<1.9 \quad (24),$$

$$35<\nu n<65 \quad (25), \text{ and}$$

$$4\times10^{-6}<dNn/dT \quad (26), \text{ and}$$

where an Abbe number of a lens, which is included in the imaging lens, based on the d line is νd, and a partial dispersion ratio of the lens, which is included in the imaging lens, between a g line and an F line is θgF, in a case in which the imaging lens includes at least one specific lens that satisfies Conditional Expression (27), which is represented by $$60 < \nu d, \tag{27}$$

at least one of the at least one specific lens satisfies Conditional Expression (28), which is represented by $$0.6 < \theta gF + 0.001618 \times \nu d < 0.686. \tag{28}$$

* * * * *